US011720230B2

(12) United States Patent
Stewart

(10) Patent No.: US 11,720,230 B2
(45) Date of Patent: *Aug. 8, 2023

(54) INTERACTIVE DATA VISUALIZATION USER INTERFACE WITH HIERARCHICAL FILTERING BASED ON GESTURE LOCATION ON A CHART

(71) Applicant: Tableau Software, Inc., Seattle, WA (US)

(72) Inventor: Robin Stewart, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/478,815

(22) Filed: Sep. 17, 2021

(65) Prior Publication Data

US 2022/0004293 A1 Jan. 6, 2022

Related U.S. Application Data

(63) Continuation of application No. 16/860,969, filed on Apr. 28, 2020, now Pat. No. 11,126,327, which is a (Continued)

(51) Int. Cl.
*G06F 3/0482* (2013.01)
*G06F 3/04883* (2022.01)
(Continued)

(52) U.S. Cl.
CPC ........ *G06F 3/0482* (2013.01); *G06F 3/04842* (2013.01); *G06F 3/04845* (2013.01);
(Continued)

(58) Field of Classification Search
CPC .... G06F 3/0482; G06F 40/18; G06F 3/04842; G06F 3/04845; G06F 3/04847; G06F 3/04883; G06F 2203/04808
See application file for complete search history.

(56) References Cited

U.S. PATENT DOCUMENTS 5,414,809 A 5/1995 Hogan et al.
5,717,939 A 9/1998 Bricklin et al.
(Continued)

FOREIGN PATENT DOCUMENTS

EP 2386940 A1 11/2011

OTHER PUBLICATIONS

Stewart, Office Action, U.S. Appl. No. 14/603,312, dated Apr. 4, 2018, 12 pgs.

(Continued)

*Primary Examiner* — Kyle R Stork
(74) *Attorney, Agent, or Firm* — Morgan, Lewis & Bockius LLP

(57) ABSTRACT

A device displays a chart representing data from a dataset. The chart has a first region displaying labels corresponding to data values of a first data field, a second region displaying labels corresponding to data values of a second data field, and a third region displaying visual marks representing aggregated data corresponding to pairs of data values from the first and second data fields. In response to a user input, the device removes visual marks from the chart. When the input location is the first region, the device removes visual marks in the first chart corresponding to a first data value of the first data field. When the input location is the second region, the device removes visual marks corresponding to a second data value of the second data field. Otherwise, the device removes only one visual mark. This updates the displayed chart.

20 Claims, 67 Drawing Sheets

Related U.S. Application Data continuation of application No. 15/172,052, filed on Jun. 2, 2016, now Pat. No. 10,635,262, which is a continuation-in-part of application No. 14/603,302, filed on Jan. 22, 2015, now Pat. No. 10,706,597.

(60) Provisional application No. 62/221,084, filed on Sep. 20, 2015, provisional application No. 62/047,429, filed on Sep. 8, 2014.

(51) Int. Cl.
    *G06T 13/80*      (2011.01)
    *G06F 3/04845*    (2022.01)
    *G06F 3/04842*    (2022.01)
    *G06F 3/04847*    (2022.01)
    *G06F 40/18*      (2020.01)

(52) U.S. Cl.
    CPC ...... *G06F 3/04847* (2013.01); *G06F 3/04883* (2013.01); *G06F 40/18* (2020.01); *G06T 13/80* (2013.01); *G06F 2203/04808* (2013.01)

(56) References Cited

U.S. PATENT DOCUMENTS

| | | |
|---|---|---|
| 5,806,078 A | 9/1998 | Hug et al. |
| 5,874,965 A | 2/1999 | Takai et al. |
| 6,400,366 B1 | 6/2002 | Davies |
| 6,480,194 B1 | 11/2002 | Sang'udi et al. |
| 6,529,217 B1 | 3/2003 | Maguire, III et al. |
| 7,345,688 B2 | 3/2008 | Baudisch et al. |
| 7,420,562 B2 | 9/2008 | Shinohara et al. |
| 7,469,381 B2 | 12/2008 | Ording |
| 8,106,856 B2 | 1/2012 | Matas et al. |
| 8,527,909 B1 | 9/2013 | Mullany |
| 8,654,125 B2 | 2/2014 | Gibson |
| 8,762,867 B1 | 6/2014 | Mattos |
| 8,832,588 B1 | 9/2014 | Kerzner et al. |
| 8,836,726 B1 | 9/2014 | Schickler |
| 8,996,978 B2 | 3/2015 | Richstein et al. |
| 9,389,777 B2 | 7/2016 | Sekharan |
| 10,416,871 B2 | 9/2019 | Hou et al. |
| 2002/0024535 A1 | 2/2002 | Ueno et al. |
| 2002/0118192 A1 | 8/2002 | Couckuyt et al. |
| 2002/0129053 A1 | 9/2002 | Chan et al. |
| 2003/0030634 A1 | 2/2003 | Sang'udi et al. |
| 2005/0060647 A1 | 3/2005 | Doan et al. |
| 2006/0080594 A1 | 4/2006 | Chavoustie et al. |
| 2007/0176933 A1 | 8/2007 | Culpi et al. |
| 2007/0190924 A1 | 8/2007 | Stadheim et al. |
| 2007/0233666 A1 | 10/2007 | Carlson et al. |
| 2007/0285426 A1 | 12/2007 | Matina |
| 2008/0010670 A1 | 1/2008 | Campbell et al. |
| 2008/0046805 A1 | 2/2008 | Shewchenko et al. |
| 2008/0192056 A1 | 8/2008 | Robertson et al. |
| 2008/0195930 A1 | 8/2008 | Tolle |
| 2008/0229242 A1 | 9/2008 | Goering |
| 2009/0013287 A1 | 1/2009 | Helfman et al. |
| 2009/0135240 A1 | 5/2009 | Phaneuf et al. |
| 2009/0171606 A1 | 7/2009 | Murata et al. |
| 2009/0178007 A1 | 7/2009 | Matas et al. |
| 2009/0254557 A1 | 10/2009 | Jordan |
| 2009/0313537 A1 | 12/2009 | Fu et al. |
| 2010/0079499 A1 | 4/2010 | Scott et al. |
| 2010/0083089 A1 | 4/2010 | Rapp et al. |
| 2010/0174678 A1 | 7/2010 | Massand |
| 2010/0205520 A1 | 8/2010 | Parish et al. |
| 2010/0211920 A1 | 8/2010 | Westerman et al. |
| 2010/0214300 A1 | 8/2010 | Alsbury et al. |
| 2010/0238176 A1 | 9/2010 | Guo et al. |
| 2010/0283800 A1 | 11/2010 | Cragun et al. |
| 2011/0074710 A1 | 3/2011 | Weeldreyer et al. |
| 2011/0106791 A1 | 5/2011 | Maim |
| 2011/0115814 A1 | 5/2011 | Heimendinger et al. |
| 2011/0145689 A1 | 6/2011 | Campbell et al. |
| 2011/0154188 A1 | 6/2011 | Forstall et al. |
| 2011/0164055 A1 | 7/2011 | McCullough et al. |
| 2011/0283231 A1 | 11/2011 | Richstein et al. |
| 2012/0005045 A1 | 1/2012 | Baker |
| 2012/0013540 A1 | 1/2012 | Hogan |
| 2012/0023449 A1 | 1/2012 | Zabielski |
| 2012/0158623 A1 | 6/2012 | Bilenko et al. |
| 2012/0159380 A1 | 6/2012 | Kocienda et al. |
| 2012/0166470 A1 | 6/2012 | Baumgaertel et al. |
| 2012/0180002 A1 | 7/2012 | Campbell et al. |
| 2012/0191704 A1 | 7/2012 | Jones |
| 2012/0233573 A1 | 9/2012 | Sullivan et al. |
| 2012/0240064 A1 | 9/2012 | Ramsay et al. |
| 2012/0254783 A1 | 10/2012 | Pourshahid et al. |
| 2012/0284601 A1 | 11/2012 | Chan et al. |
| 2012/0313957 A1 | 12/2012 | Fisher et al. |
| 2012/0324357 A1 | 12/2012 | Viegers et al. |
| 2012/0324388 A1 | 12/2012 | Rao et al. |
| 2013/0009963 A1 | 1/2013 | Albrecht |
| 2013/0019205 A1 | 1/2013 | Gil et al. |
| 2013/0024803 A1 | 1/2013 | Workman et al. |
| 2013/0080884 A1 | 3/2013 | Lisse et al. |
| 2013/0111319 A1 | 5/2013 | Lin et al. |
| 2013/0111321 A1 | 5/2013 | Dorrell |
| 2013/0120267 A1 | 5/2013 | Pasquero et al. |
| 2013/0120358 A1 | 5/2013 | Fan et al. |
| 2013/0174087 A1 | 7/2013 | Chen et al. |
| 2013/0194272 A1 | 8/2013 | Hao et al. |
| 2013/0275904 A1 | 10/2013 | Bhaskaran et al. |
| 2013/0293480 A1 | 11/2013 | Kritt et al. |
| 2013/0298085 A1 | 11/2013 | Kritt et al. |
| 2013/0314341 A1 | 11/2013 | Lee et al. |
| 2013/0332810 A1 | 12/2013 | Lin et al. |
| 2013/0339903 A1 | 12/2013 | Cheng et al. |
| 2014/0049557 A1 | 2/2014 | Hou et al. |
| 2014/0053091 A1 | 2/2014 | Hou et al. |
| 2014/0068403 A1 | 3/2014 | Bhargav et al. |
| 2014/0075286 A1 | 3/2014 | Harada |
| 2014/0098020 A1 | 4/2014 | Koshi |
| 2014/0109012 A1 | 4/2014 | Choudhary et al. |
| 2014/0113268 A1 | 4/2014 | Dhasmana et al. |
| 2014/0129985 A1 | 5/2014 | Morozov et al. |
| 2014/0136939 A1 | 5/2014 | Chan et al. |
| 2014/0143738 A1 | 5/2014 | Underwood, IV et al. |
| 2014/0149947 A1 | 5/2014 | Blyumen |
| 2014/0157142 A1 | 6/2014 | Heinrich et al. |
| 2014/0181756 A1 | 6/2014 | Kuo |
| 2014/0198105 A1 | 7/2014 | Gibson et al. |
| 2014/0218383 A1 | 8/2014 | Srivastava |
| 2014/0223350 A1 | 8/2014 | Woodward |
| 2014/0247268 A1 | 9/2014 | Drucker et al. |
| 2014/0267424 A1 | 9/2014 | Benson et al. |
| 2014/0281867 A1 | 9/2014 | Vogel et al. |
| 2014/0281868 A1 | 9/2014 | Vogel et al. |
| 2014/0282124 A1 | 9/2014 | Grealish et al. |
| 2014/0282276 A1 | 9/2014 | Drucker et al. |
| 2014/0320539 A1 | 10/2014 | Hao et al. |
| 2014/0336786 A1 | 11/2014 | Asenjo et al. |
| 2014/0351732 A1 | 11/2014 | Nasraqui et al. |
| 2014/0372952 A1 | 12/2014 | Otero et al. |
| 2014/0380140 A1 | 12/2014 | Kapahi |
| 2014/0380178 A1 | 12/2014 | Kapahi |
| 2015/0007078 A1 | 1/2015 | Feng et al. |
| 2015/0015504 A1 | 1/2015 | Lee et al. |
| 2015/0026554 A1 | 1/2015 | Hogan |
| 2015/0029213 A1 | 1/2015 | Benson |
| 2015/0058801 A1 | 2/2015 | John et al. |
| 2015/0135113 A1 | 5/2015 | Sekharan |
| 2015/0169531 A1 | 6/2015 | Campbell et al. |
| 2015/0199096 A1 | 7/2015 | Kim et al. |
| 2015/0254369 A1 | 9/2015 | Hou et al. |
| 2015/0278315 A1 | 10/2015 | Baumgartner et al. |
| 2016/0004423 A1 | 1/2016 | Springer et al. |
| 2016/0055232 A1 | 2/2016 | Yang et al. |
| 2016/0070015 A1 | 3/2016 | Sastry et al. |
| 2016/0103886 A1 | 4/2016 | Prophete et al. |
| 2016/0104311 A1 | 4/2016 | Allyn |
| 2016/0154575 A1 | 6/2016 | Xie et al. |
| 2016/0188185 A1 | 6/2016 | Bous |

(56) References Cited

U.S. PATENT DOCUMENTS

2016/0224221 A1    8/2016   Liu et al.
2017/0004638 A1    1/2017   Csenteri et al.
2017/0169592 A1    6/2017   Ruble et al.

OTHER PUBLICATIONS

Stewart, Office Action, U.S. Appl. No. 14/603,302, dated Apr. 6, 2018, 17 pgs.

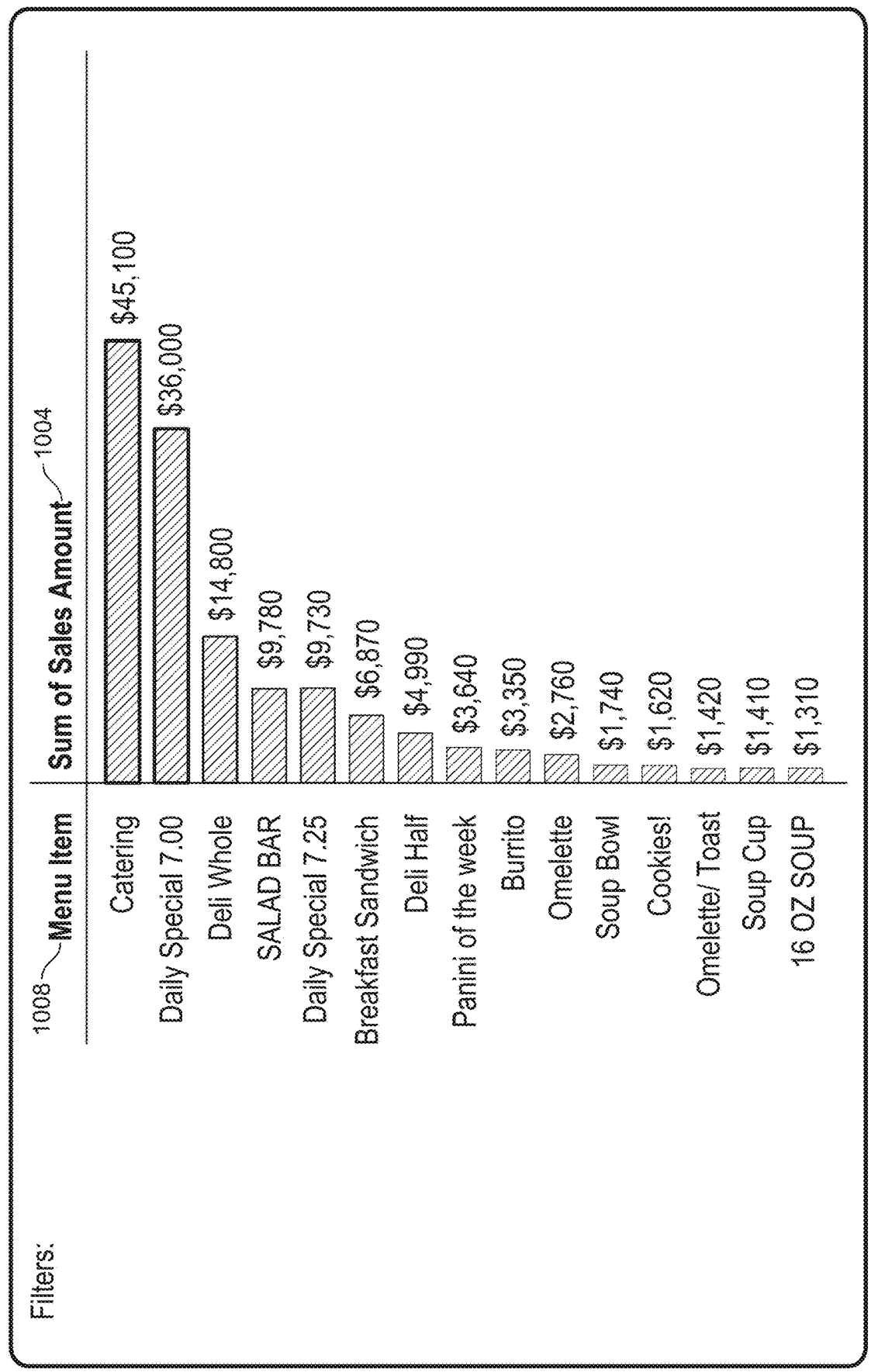

INTERACTIVE DATA VISUALIZATION USER INTERFACE WITH HIERARCHICAL FILTERING BASED ON GESTURE LOCATION ON A CHART

RELATED APPLICATIONS

This application is a continuation of U.S. patent application Ser. No. 16/860,969, filed Apr. 28, 2020, entitled "Interactive Data Visualization User Interface with Gesture-based Data Field Selection," which is a continuation of U.S. patent application Ser. No. 15/172,052, filed Jun. 2, 2016, entitled "Interactive Data Visualization User Interface with Gesture-Based Data Field Selection," now U.S. Pat. No. 10,635,262, which is a continuation-in-part of U.S. patent application Ser. No. 14/603,302, filed Jan. 22, 2015, entitled "Methods and Devices for Adjusting Chart Filters," now U.S. Pat. No. 10,706,597, which claims priority to U.S. Provisional Application No. 62/047,429, filed Sep. 8, 2014, entitled "Methods and Devices for Manipulating Graphical Views of Data," each of which is hereby incorporated by reference in its entirety. U.S. patent application Ser. No. 15/172,052 further claims priority to U.S. Provisional Application No. 62/221,084, filed Sep. 20, 2015, entitled "Interactive Data Visualization User Interface," which is hereby incorporated by reference in its entirety.

This application is related to U.S. patent application Ser. No. 15/172,076, filed Jun. 2, 2016, and U.S. patent application Ser. No. 15/172,085, filed Jun. 2, 2016, each of which is hereby incorporated by reference in its entirety.

TECHNICAL FIELD

The disclosed implementations relate generally to data visualization and more specifically to systems, methods, and user interfaces that enable a user to interactively explore and investigate a data set.

BACKGROUND

Data visualization is a powerful tool for exploring data sets. Graphical views provide user-friendly ways to visualize and interpret data. However, the task of effectively visualizing databases imposes significant demands on the human-computer interface to the visualization system, especially on a mobile device with a small screen.

As computing and networking speeds increase, data visualization that was traditionally performed on desktop computers can also be performed on portable electronic devices, such as smart phones, tablets, and laptop computers. These portable devices typically use touch-sensitive surfaces (e.g., touch screens and/or trackpads) as input devices. These portable devices typically have significantly smaller displays than desktop computers. Thus, additional challenges arise in using touch-sensitive surfaces to manipulate graphical views of data in a user-friendly manner on portable devices.

Consequently, there is a need for faster, more efficient methods and interfaces for manipulating graphical views of data. Such methods and interfaces may complement or replace conventional methods for visualizing data. Such methods and interfaces reduce the cognitive burden on a user and produce a more efficient human-machine interface. For battery-operated devices, such methods and interfaces conserve power and increase the time between battery charges.

SUMMARY

The above deficiencies and other problems associated with visualizing data are reduced or eliminated by the disclosed methods, devices, graphical user interfaces, and computer readable storage media. Various implementations of methods, devices, graphical user interfaces, and storage media within the scope of this disclosure and the appended claims each have several aspects, no single one of which is solely responsible for the attributes described herein.

Thus methods, systems, and graphical user interfaces are provided that enable users to more easily and more efficiently analyze data sets.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 10A-10C illustrate an animated transition when selecting a different dimension for an existing data visualization, in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

As portable electronic devices become more compact, and the number of functions performed by applications on any given device increase, it has become a significant challenge to design user interfaces that allow users to interact with the applications easily. This challenge is particularly significant for portable devices with smaller screens and/or limited input devices. In addition, data visualization applications need to provide user-friendly ways to explore data in order to enable a user to extract significant meaning from a particular data set. Some application designers have resorted to using complex menu systems to enable a user to perform desired functions. These conventional user interfaces often result in complicated key sequences and/or menu hierarchies that must be memorized by the user and/or that are otherwise cumbersome and/or not intuitive to use.

The methods, devices, and graphical user interfaces (GUIs) described herein make manipulation of data sets and data visualizations more efficient and intuitive for a user. In some instances, a data visualization is referred to as a "chart." A number of different intuitive user interfaces for data visualizations are described below. For example, applying a filter to a data set can be accomplished by a simple touch input on a given portion of a displayed data visualization rather than via a nested menu system.

Attention is now directed toward implementations of portable devices with touch-sensitive displays. Implementations of electronic devices and user interfaces for such devices are described. In some implementations, the device is a portable communications device, such as a mobile telephone, that also contains other functions, such as PDA and/or music player functions. Other portable electronic devices include laptops or tablet computers with touch-sensitive surfaces (e.g., touch screen displays and/or touch pads). It should also be understood that, in some implementations, the device is not a portable communications device, but is a desktop computer with a touch-sensitive surface (e.g., a touch screen display and/or a touch pad). In the discussion that follows, an electronic device that includes a display and a touch-sensitive surface is described. It should be understood, however, that the electronic device optionally includes one or more other physical user-interface devices, such as a physical keyboard, a mouse, a microphone, and/or a joystick.

Figure 1:
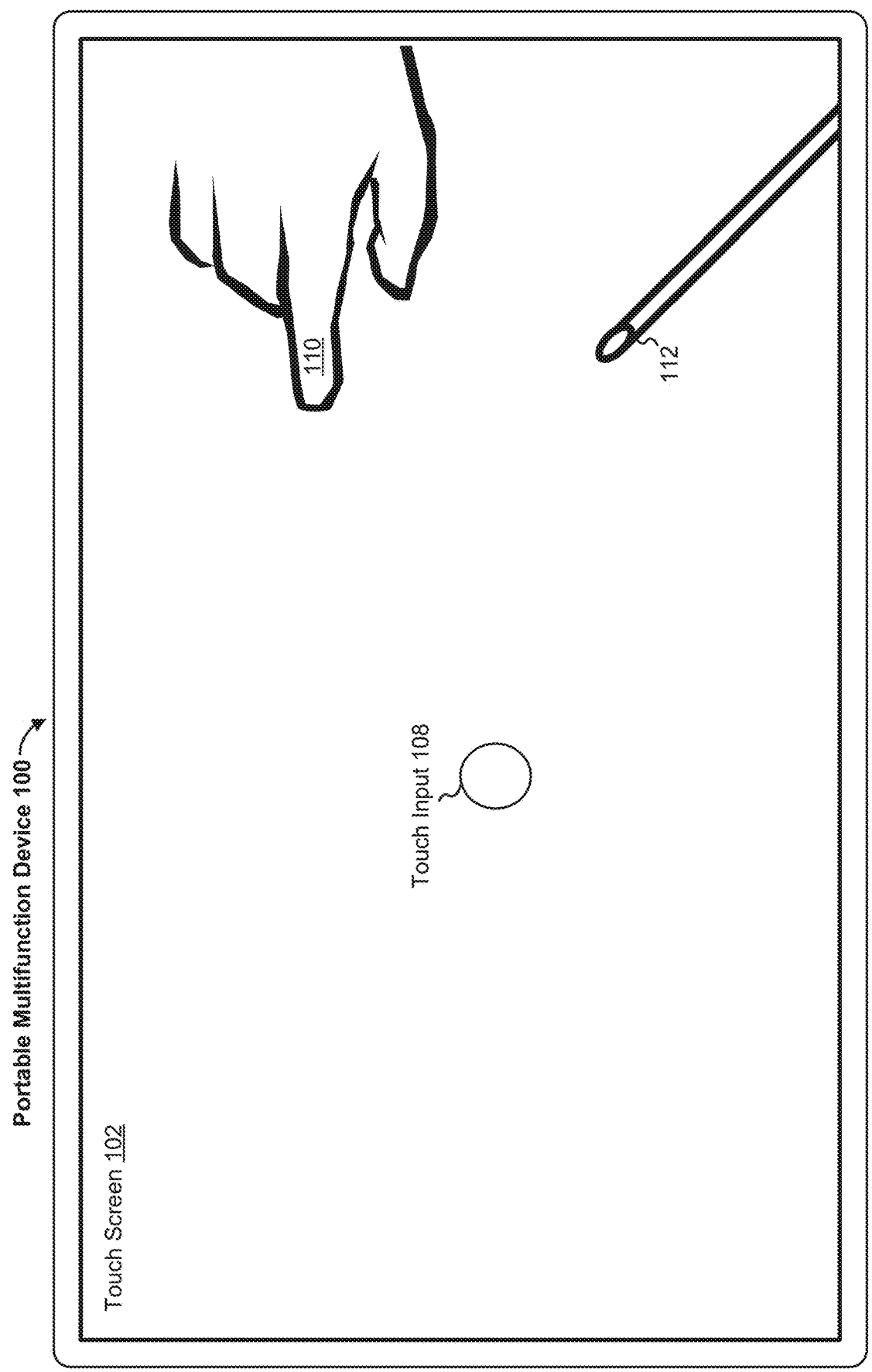
FIG. 1 illustrates a portable multifunction device having a touch screen, in accordance with some implementations.

FIG. 1 illustrates portable multifunction device 100 having a touch screen 102, in accordance with some implementations. In some implementations, the device 100 is a mobile phone, a laptop computer, a personal digital assistant (PDA), or a tablet computer. The touch screen 102 is also sometimes called a touch-sensitive display and/or a touch-sensitive display system. In some implementations, the touch screen 102 displays one or more graphics within a user interface (UI). In some implementations, a user is enabled to select one or more of the graphics by making a touch input (e.g., touch input 108) on the graphics. In some instances, the touch input is a contact on the touch screen. In some instances, the touch input is a gesture that includes a contact and movement of the contact on the touch screen. In some instances, the gesture optionally includes one or more taps, one or more swipes (from left to right, right to left, upward and/or downward) and/or a rolling of a finger (from right to left, left to right, upward and/or downward) that has made contact with device 100. For example, a touch input may be made with one or more fingers 110 (not drawn to scale in the figure) or one or more styluses 112 (not drawn to scale in the figure). In some implementations, selection of one or more graphics occurs when the user breaks contact with the one or more graphics. In some circumstances, inadvertent contact with a graphic does not select the graphic. For example, a swipe gesture that sweeps over a visual mark optionally does not select the visual mark when the gesture corresponding to selection is a tap. In some implementations, the device 100 includes one or more physical buttons and/or other input/output devices, such as a microphone for verbal inputs.

Figure 2:
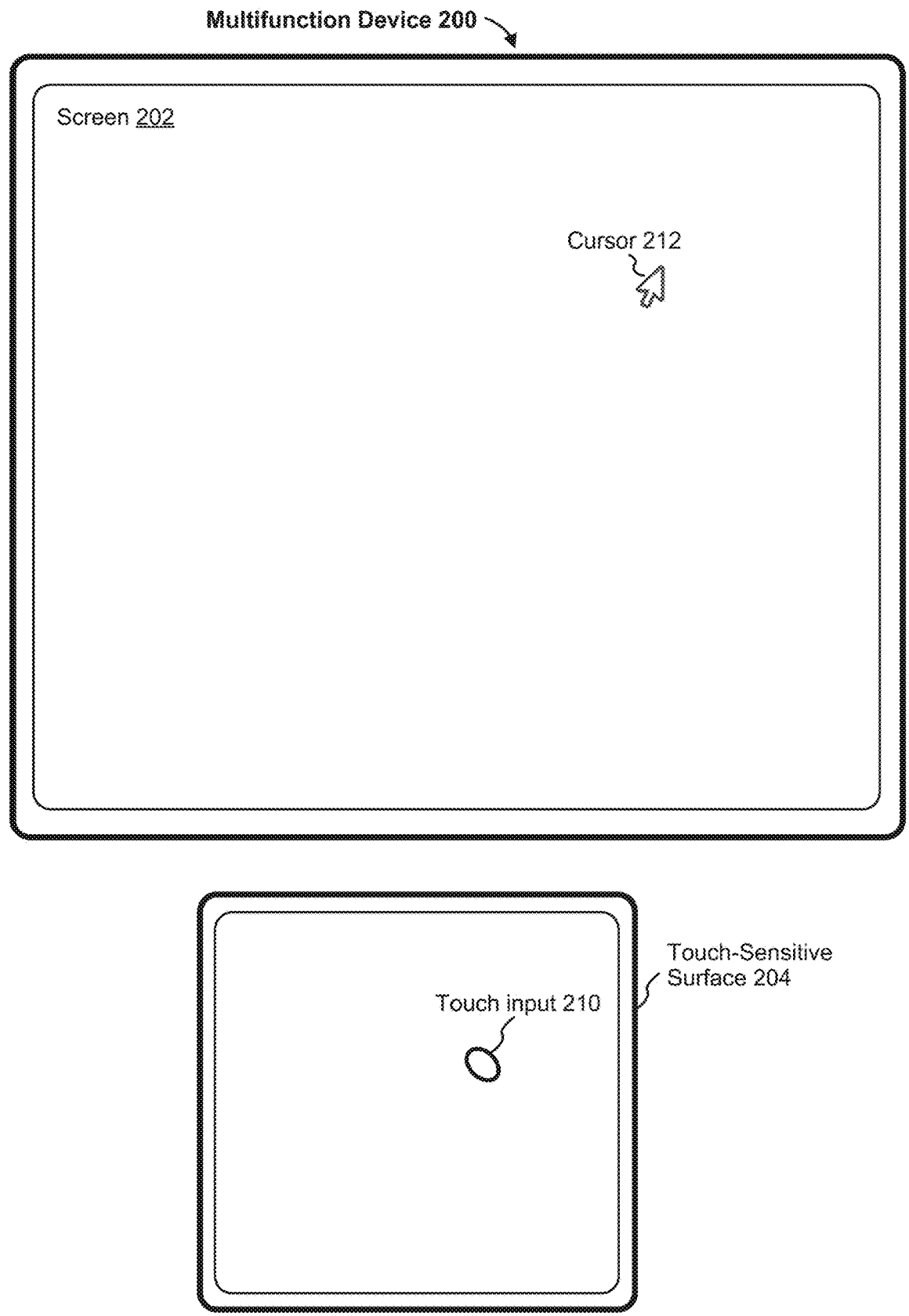
FIG. 2 illustrates a multifunction device having a touch-sensitive surface that is separate from the display, in accordance with some implementations.

FIG. 2 illustrates a multifunction device 200 in accordance with some implementations. The device 200 need not be portable. In some implementations, the device 200 is a laptop computer, a desktop computer, a tablet computer, or an educational device. The device 200 includes a screen 202 and a touch-sensitive surface 204. In some implementations, the screen 202 displays one or more graphics within a UI. In some implementations, a user is enabled to select one or more of the graphics by making a touch input (e.g., touch input 210) on the touch-sensitive surface 204 such that a corresponding cursor (e.g., the cursor 212) on the screen 202 selects the one or more graphics. For example, when an input is detected on the touch-sensitive surface 204 while the cursor 212 is over a particular user interface element (e.g., a button, window, slider or other user interface element), the particular user interface element is adjusted in accordance with the detected input.

Figure 3A:
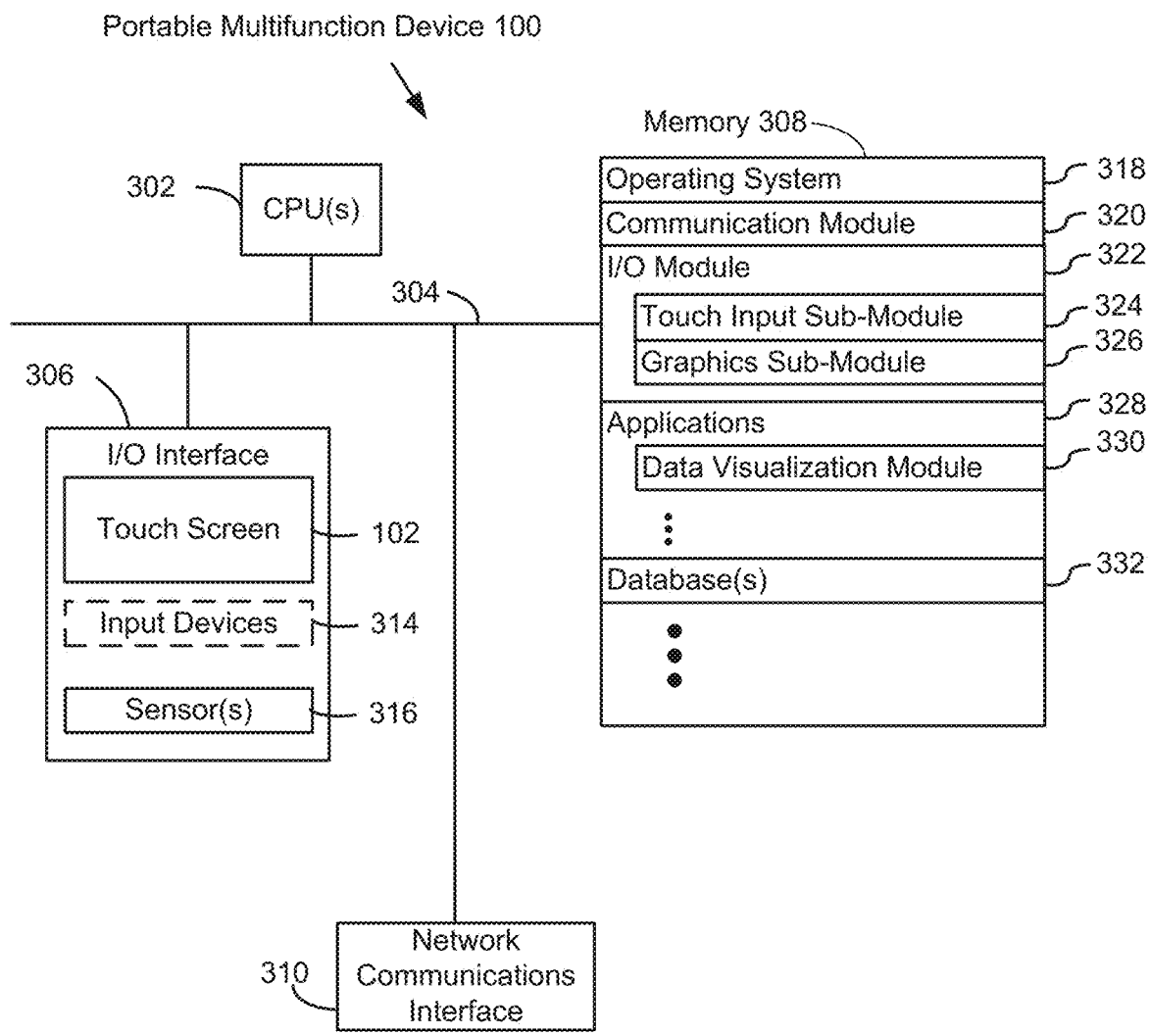
FIG. 3A is a block diagram illustrating a portable multifunction device having a touch screen, in accordance with some implementations.

FIG. 3A is a block diagram illustrating a portable multifunction device 100, in accordance with some implementations. It should be appreciated that the device 100 is only one example of a portable multifunction device. In some implementations, the device 100 has more or fewer components than shown, combines two or more components, or has a different configuration or arrangement of the components. The various components shown in FIG. 3A are implemented in hardware, software, firmware, or a combination of hardware, software, and/or firmware, including one or more signal processing and/or application specific integrated circuits.

The device 100 includes one or more processing units (CPU's) 302, an input/output (I/O) subsystem 306, memory 308 (which optionally includes one or more computer readable storage media), and a network communications interface 310. In some implementations, these components communicate over one or more communication buses or signal lines 304. In some implementations, the communication buses 304 include circuitry (sometimes called a chipset) that interconnects and controls communications between system components.

The memory 308 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some implementations, the memory 308 includes one or more storage devices remotely located from processor(s) 302. The memory 308, or alternately the non-volatile memory device(s) within the memory 308, comprises a non-transitory computer readable storage medium.

In some implementations, the software components stored in the memory 308 include an operating system 318, a communication module 320, an input/output (I/O) module 322, and one or more applications 328 (e.g., a data visualization application 422). In some implementations, one or more of the various modules comprises a set of instructions in memory 308. In some implementations, the memory 308 stores one or more data sets in one or more database(s) 332.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware, software, and/or firmware components.

The communication module 320 facilitates communication with other devices over one or more external ports and also includes various software components for handling data received from other devices.

The I/O module 322 includes a touch input sub-module 324 and a graphics sub-module 326. In some implementations, the touch input sub-module 324 detects touch inputs with touch screen 102 and other touch sensitive devices (e.g., a touchpad or physical click wheel). The touch input sub-module 324 includes various software components for performing various operations related to detection of a touch input, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The touch input sub-module 324 receives contact data from the touch-sensitive surface (e.g., touch screen 102). In some implementations, these operations are applied to single touch inputs (e.g., one finger contacts) or to multiple simultaneous touch inputs (e.g., "multitouch"/multiple finger contacts). In some implementations, the touch input sub-module 324 detects contact on a touchpad.

In some implementations, the touch input sub-module 324 detects a gesture input by a user. Different gestures on the touch-sensitive surface have different contact patterns. In some implementations, a gesture is detected by detecting a particular contact pattern. For example, detecting a finger tap gesture includes detecting a finger-down event followed by detecting a finger-up (lift off) event at the same position (or substantially the same position) as the finger-down event (e.g., at the position of an data mark). As another example, detecting a finger swipe gesture on the touch-sensitive surface includes detecting a finger-down event followed by detecting one or more finger-dragging events, and subsequently followed by detecting a finger-up (lift off) event.

The graphics sub-module 326 includes various known software components for rendering and displaying graphics on the touch screen 102 or other display, including components for changing the visual impact (e.g., brightness, transparency, saturation, contrast or other visual property) of graphics that are displayed. As used herein, the term "graphics" includes any object that can be displayed to a user, including data visualizations, icons (such as user-interface objects including soft keys), text, digital images, animations, and the like. In some implementations, the graphics sub-module 326 stores data representing graphics to be used. In some implementations, each graphic is assigned a corresponding code. The graphics sub-module 326 receives (e.g., from applications) one or more codes specifying graphics to be displayed along with, if necessary, coordinate data and other graphic property data, and then generates screen image data to output to the display or touch screen.

In some implementations, the applications 328 include a data visualization module 330 or data visualization application 422 for displaying graphical views of data and one or more other applications. Examples of other applications that are optionally stored in the memory 308 include word processing applications, email applications, and presentation applications.

In conjunction with the I/O interface 306, including the touch screen 102, the CPU(s) 302, and/or the database(s) 332, the data visualization module 330 includes executable instructions for displaying and manipulating various graphical views of data.

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures, or modules, and thus various subsets of these modules are, optionally, combined or otherwise re-arranged in various implementations. In some implementations, the memory 308 stores a subset of the modules and data structures identified above. In some implementations, the memory 308 stores additional modules and data structures not described above.

Figure 3B:
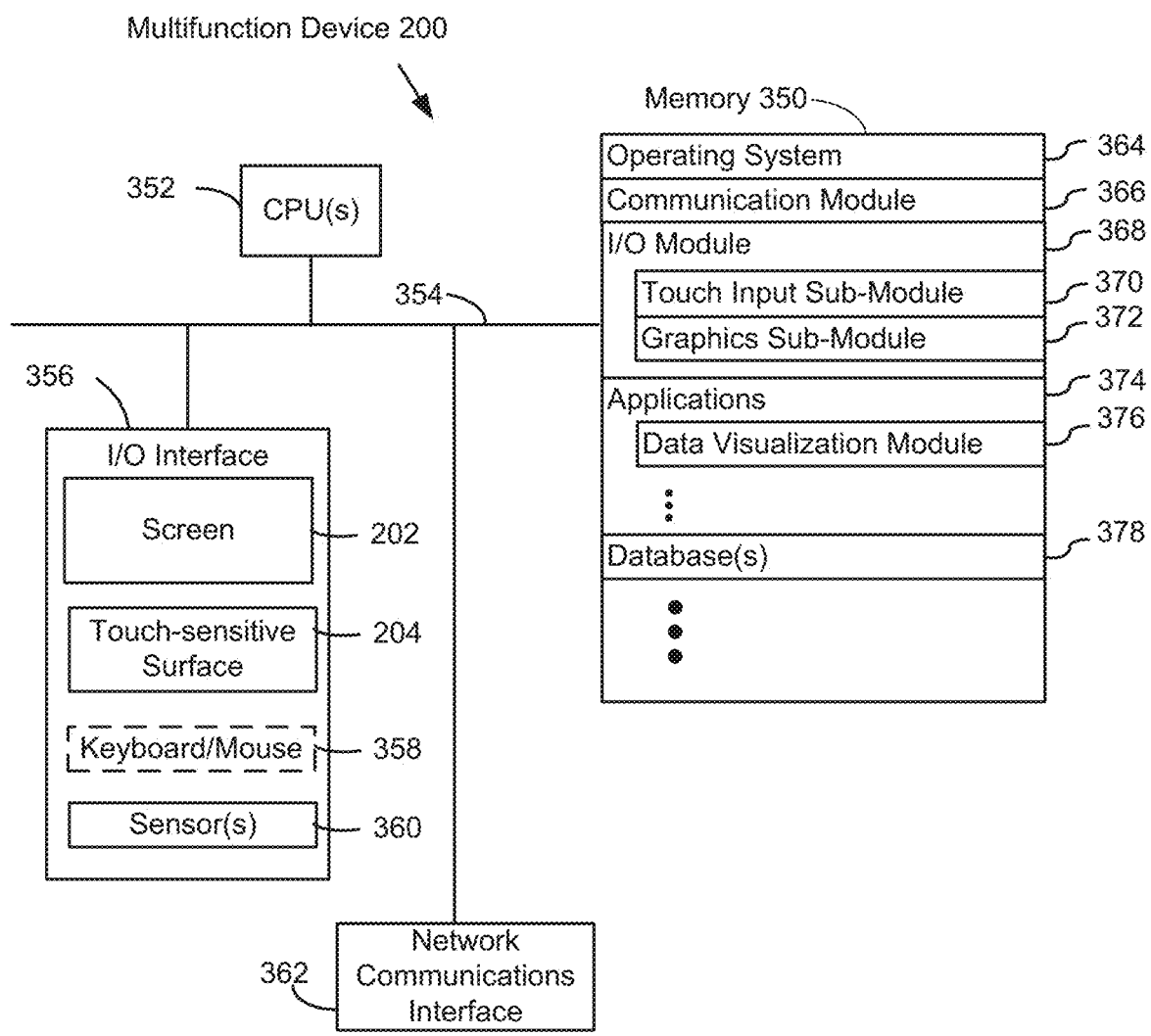
FIG. 3B is a block diagram illustrating a multifunction device having a touch-sensitive surface, in accordance with some implementations.

FIG. 3B is a block diagram illustrating a multifunction device 200, in accordance with some implementations. It should be appreciated that the device 200 is only one example of a multifunction device. In some implementations, the device 200 has more or fewer components than shown, combines two or more components, or has a different configuration or arrangement of the components. The various components shown in FIG. 3B are implemented in hardware, software, or firmware, or a combination of hardware, software, and/or firmware, including one or more signal processing and/or application specific integrated circuits.

The device 200 typically includes one or more processing units/cores (CPUs) 352, one or more network or other communications interfaces 362, memory 350, an I/O interface 356, and one or more communication buses 354 for interconnecting these components. In some implementations, the communication buses 354 include circuitry (sometimes called a chipset) that interconnects and controls communications between system components.

The I/O interface 306 includes a screen 202 (also sometimes called a display), a touch-sensitive surface 204, and one or more sensor(s) 360 (e.g., optical, acceleration, proximity, and/or touch-sensitive sensors). In some implementations, the I/O interface 356 includes a keyboard and/or mouse (or other pointing device) 358. The I/O interface 356 couples input/output peripherals on the device 200, such as the screen 202, the touch-sensitive surface 204, other input devices 358, and one or more sensor(s) 360, to the CPU(s) 352 and/or the memory 350.

The screen 202 provides an output interface between the device and a user. The screen 202 displays visual output to the user. In some implementations, the visual output includes graphics, text, icons, data marks, and any combination thereof (collectively termed "graphics"). In some implementations, some or all of the visual output corresponds to user-interface objects. In some implementations, the screen 202 uses LCD (liquid crystal display) technology, LPD (light emitting polymer display) technology, or LED (light emitting diode) technology, although other display technologies are used in other implementations.

In addition to the touch screen, the device 200 includes a touch-sensitive surface 204 (e.g., a touchpad) for detecting touch inputs. The touch-sensitive surface 204 accepts input from the user via touch inputs (e.g., the touch input 210 in FIG. 2). The touch-sensitive surface 204 (along with any associated modules and/or sets of instructions in memory 350) detects touch inputs and converts the detected inputs into interaction with user-interface objects (e.g., one or more icons, data marks, or images) that are displayed on the screen 202. Commonly, a point of contact between the touch-sensitive surface 204 and the user corresponds to a finger of the user.

The memory 350 includes high-speed random access memory, such as DRAM, SRAM, DDR RAM or other random access solid state memory devices. In some implementations, the memory includes non-volatile memory, such as one or more magnetic disk storage devices, optical disk storage devices, flash memory devices, or other non-volatile solid state storage devices. In some implementations, the memory 350 includes one or more storage devices remotely located from CPU(s) 352. In some implementations, the software components stored in the memory 350 include an operating system 364, a communication module 366, an input/output (I/O) module 368, and one or more applications 374 (e.g., a data visualization application 422). In some implementations, one or more of the various modules comprises a set of instructions in the memory 350. In some implementations, the memory 350 stores one or more data sets in one or more database(s) 378. In some implementations, the I/O module 368 includes a touch input sub-module 370 and a graphics sub-module 372. In some implementations, the applications 374 include data visualization module 376.

In some implementations, the memory 350 stores programs, modules, and data structures analogous to the programs, modules, and data structures stored in the memory 308 of the portable multifunction device 100, or a subset thereof. In some implementations, the memory 350 stores additional programs, modules, and data structures not present in the memory 308 of the portable multifunction device 100. In some implementations, the memory 350 of the device 200 stores drawing, presentation, and word processing applications.

The device 200 also includes a power system for powering the various components. The power system optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management, and distribution of power in portable devices.

Each of the above identified elements in FIG. 3B is stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise rearranged in various implementations. In some implementations, the memory 350 stores a subset of the modules and data structures identified above. In some implementations, the memory 350 stores additional modules and data structures not described above.

Figure 4:
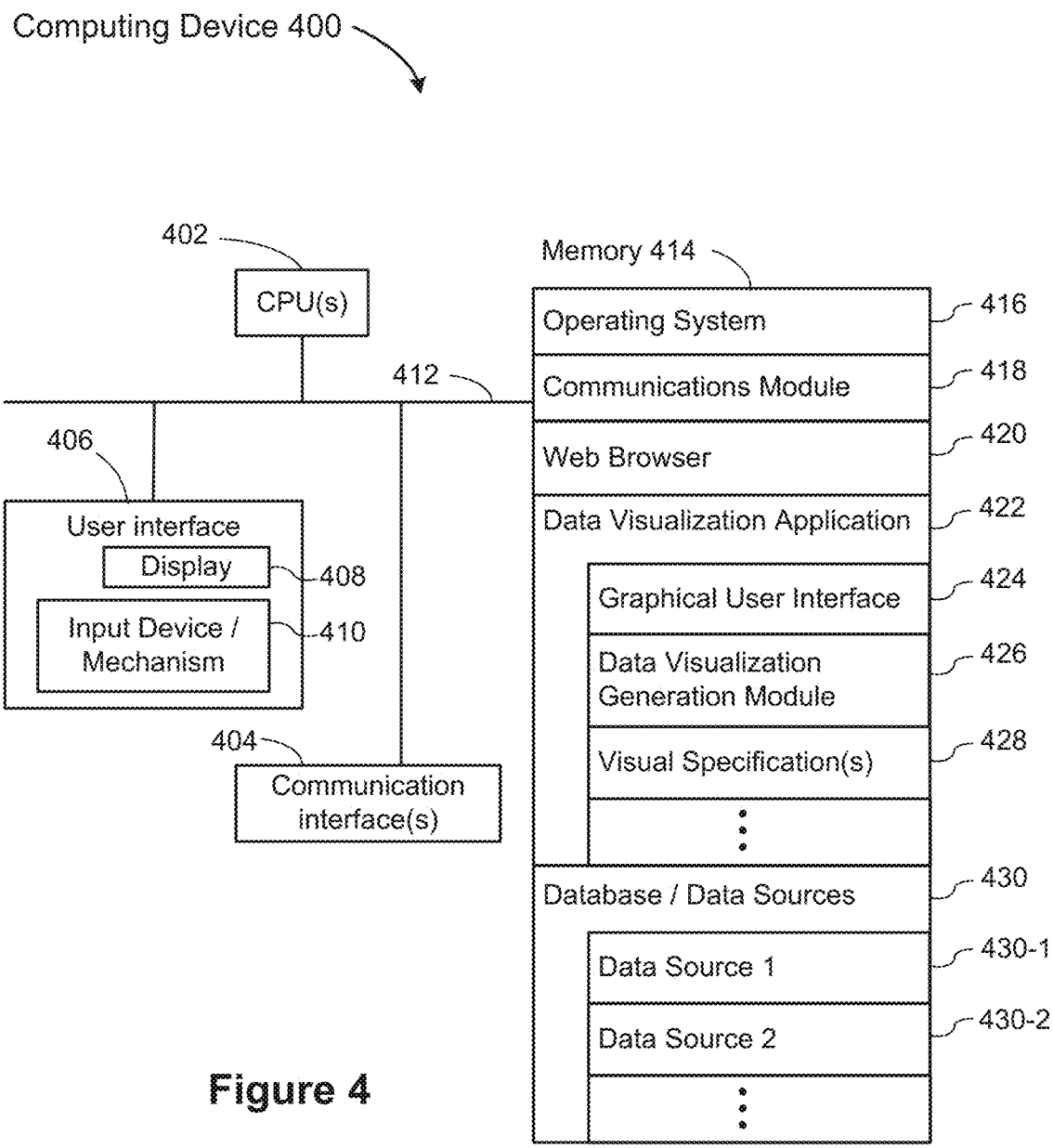
FIG. 4 is a block diagram of a computing device according to some implementations.

FIG. 4 is a block diagram illustrating a computing device 400 that can display a graphical user interface for a data visualization application 422 in accordance with some implementations. Computing devices 400 include desktop computers, laptop computers, tablet computers, portable multifunction devices 100, multifunction devices 200, and other computing devices with a display and a processor capable of running a data visualization application 422. A computing device 400 typically includes one or more processing units/cores (CPUs) 402 for executing modules, programs, and/or instructions stored in the memory 414 and thereby performing processing operations; one or more network or other communications interfaces 404; memory 414; and one or more communication buses 412 for interconnecting these components. The communication buses 412 may include circuitry that interconnects and controls communications between system components. A computing device 400 includes a user interface 406 comprising a display device 408 and one or more input devices or mechanisms 410. In some implementations, the input device/mechanism includes a keyboard; in some implementations, the input device/mechanism includes a "soft" keyboard, which is displayed as needed on the display device 408, enabling a user to "press keys" that appear on the display 408. In some implementations, the display 408 and input device/mechanism 410 comprise a touch screen display (also called a touch sensitive display).

In some implementations, the memory 414 includes high-speed random access memory, such as DRAM, SRAM, DDR RAM or other random access solid state memory devices. In some implementations, the memory 414 includes non-volatile memory, such as one or more magnetic disk storage devices, optical disk storage devices, flash memory devices, or other non-volatile solid state storage devices. In some implementations, the memory 414 includes one or more storage devices remotely located from the CPU(s) 402. The memory 414, or alternately the non-volatile memory device(s) within the memory 414, comprises a non-transitory computer readable storage medium. In some implementations, the memory 414, or the computer readable storage medium of the memory 414, stores the following programs, modules, and data structures, or a subset thereof:

- an operating system 416 that includes procedures for handling various basic system services and for performing hardware dependent tasks;
- a communications module 418 that is used for connecting the computing device 400 to other computers and devices via the one or more communication network interfaces 404 (wired or wireless) and one or more communication networks, such as the Internet, other wide area networks, local area networks, metropolitan area networks, and so on;
- a web browser 420 (or other client application) that enables a user to communicate over a network with remote computers or devices;
- a data visualization application 422, which provides a graphical user interface 424 for a user to construct visual graphics. A user selects one or more data sources 430 (which may be stored on the computing device 400 or stored remotely), selects data fields from the data source(s), and uses the selected fields to define a visual graphic. In some implementations, the information the user provides is stored as a visual specification 428. The data visualization application 422 includes a data visualization generation module 426, which takes the user input (e.g., the visual specification), and generates a corresponding visual graphic. The data visualization application 422 then displays the generated graphic in the user interface 424. In some implementations, the data visualization application 422 executes as a stand-alone application (e.g., a desktop application). In some implementations, the data visualization application 422 executes within the web browser 420; and
- zero or more databases or data sources 430 (e.g., a first data source 430-1 and a second data source 430-2), which are used by the data visualization application 422. In some implementations, the data sources can be stored as spreadsheet files, CSV files, XML files, flat files, or a relational database.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 414 stores a subset of the modules and data structures identified above. Furthermore, the memory 414 may store additional modules or data structures not described above.

Although FIG. 4 shows a computing device 400, FIG. 4 is intended more as functional description of the various features that may be present rather than as a structural schematic of the implementations described herein. In practice, and as recognized by those of ordinary skill in the art, items shown separately could be combined and some items could be separated.

Disclosed user interfaces are optionally implemented on a portable multifunction device 100 or device 200. The following examples are shown utilizing a touch screen (e.g., a touch screen 102). However, it should be understood that, in some implementations, the inputs (e.g., finger contacts) are detected on a touch-sensitive surface on a device that is distinct from a display on the device. In addition, while the following examples are given primarily with reference to finger inputs (e.g., finger contacts, finger tap gestures, finger swipe gestures), it should be understood that, in some implementations, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
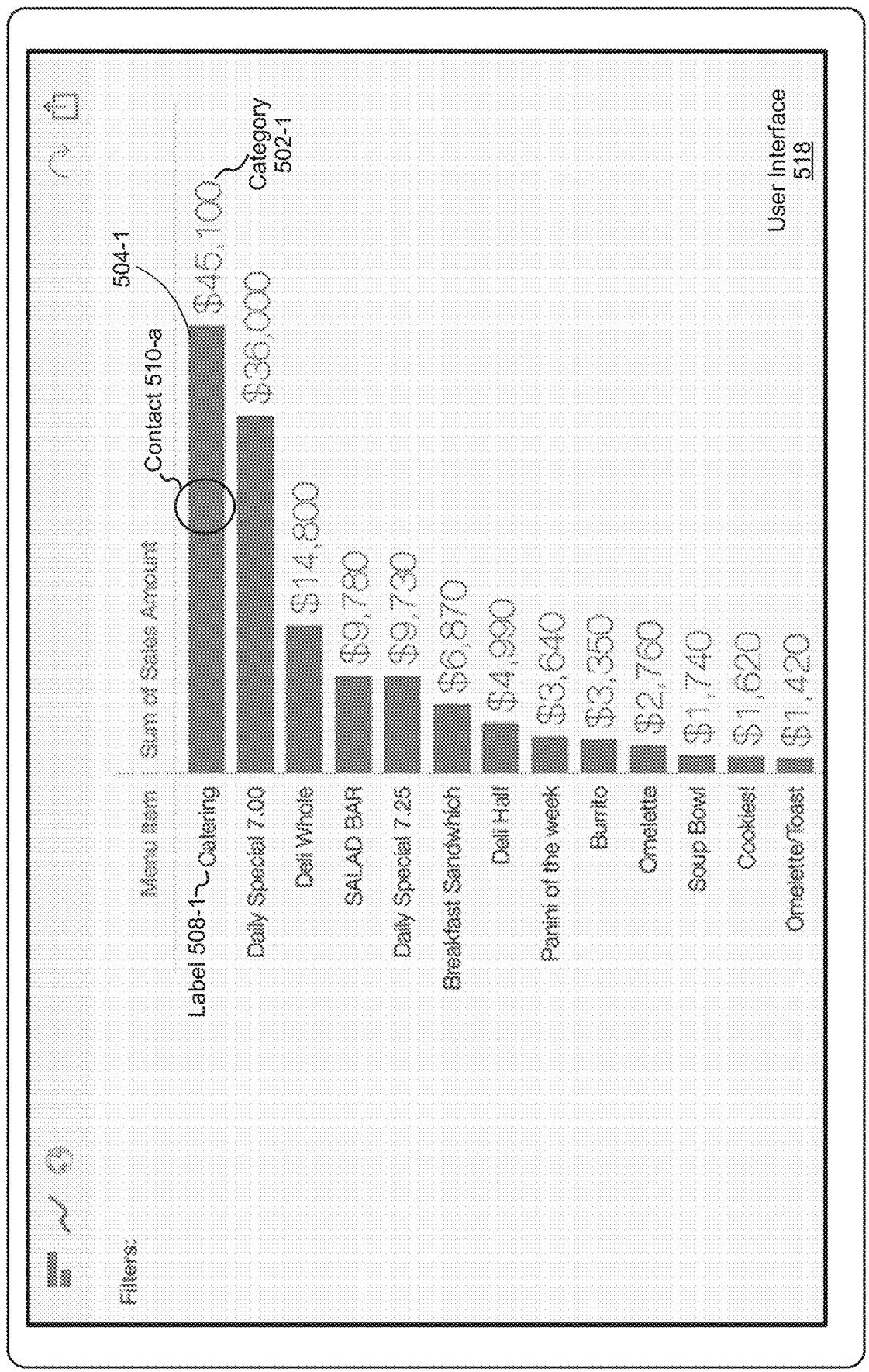
FIGS. 5A-5I illustrate user interfaces for adjusting data visualization filters, in accordance with some implementations.
Figure 5B:
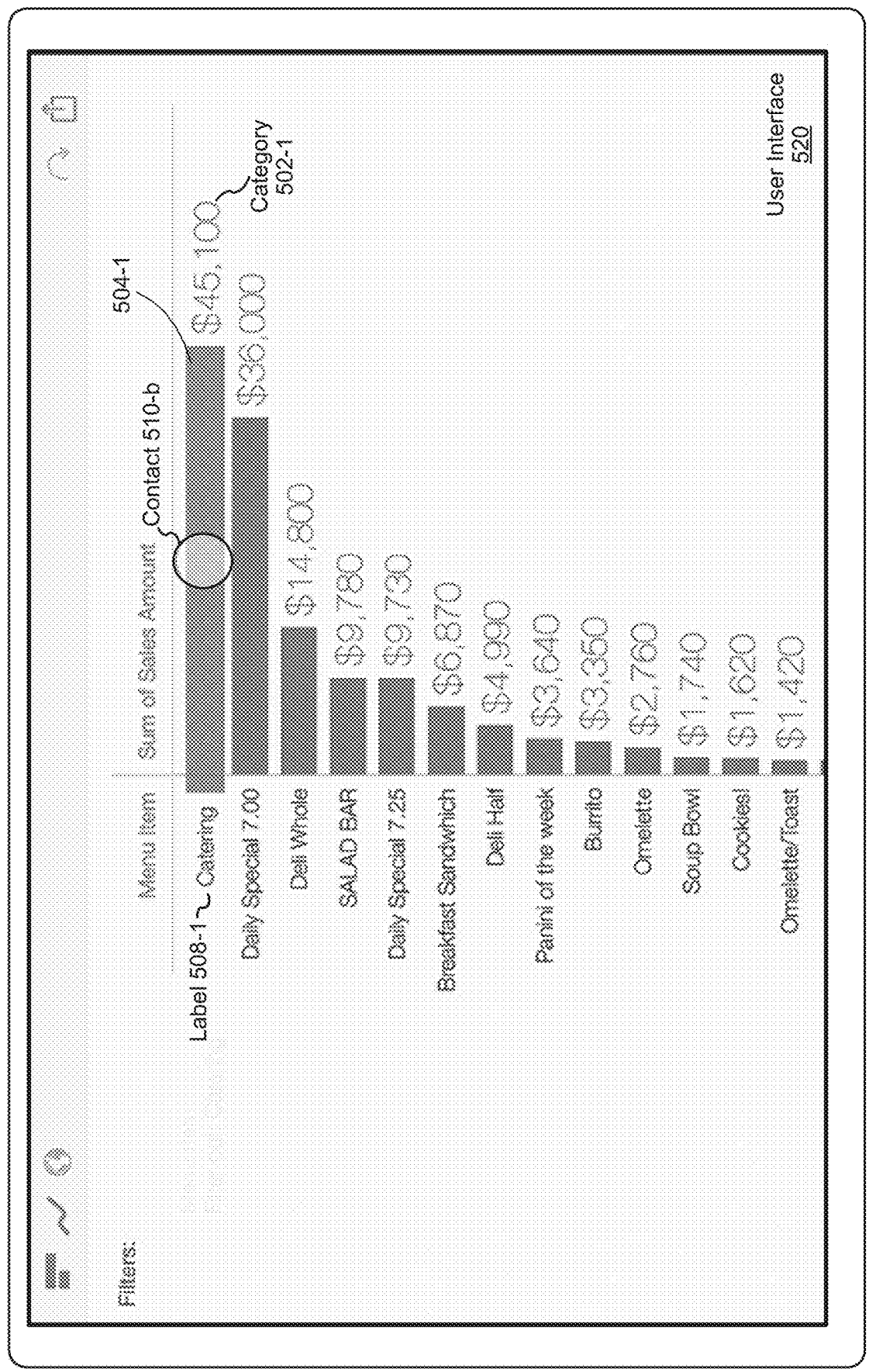
Figure 5C:
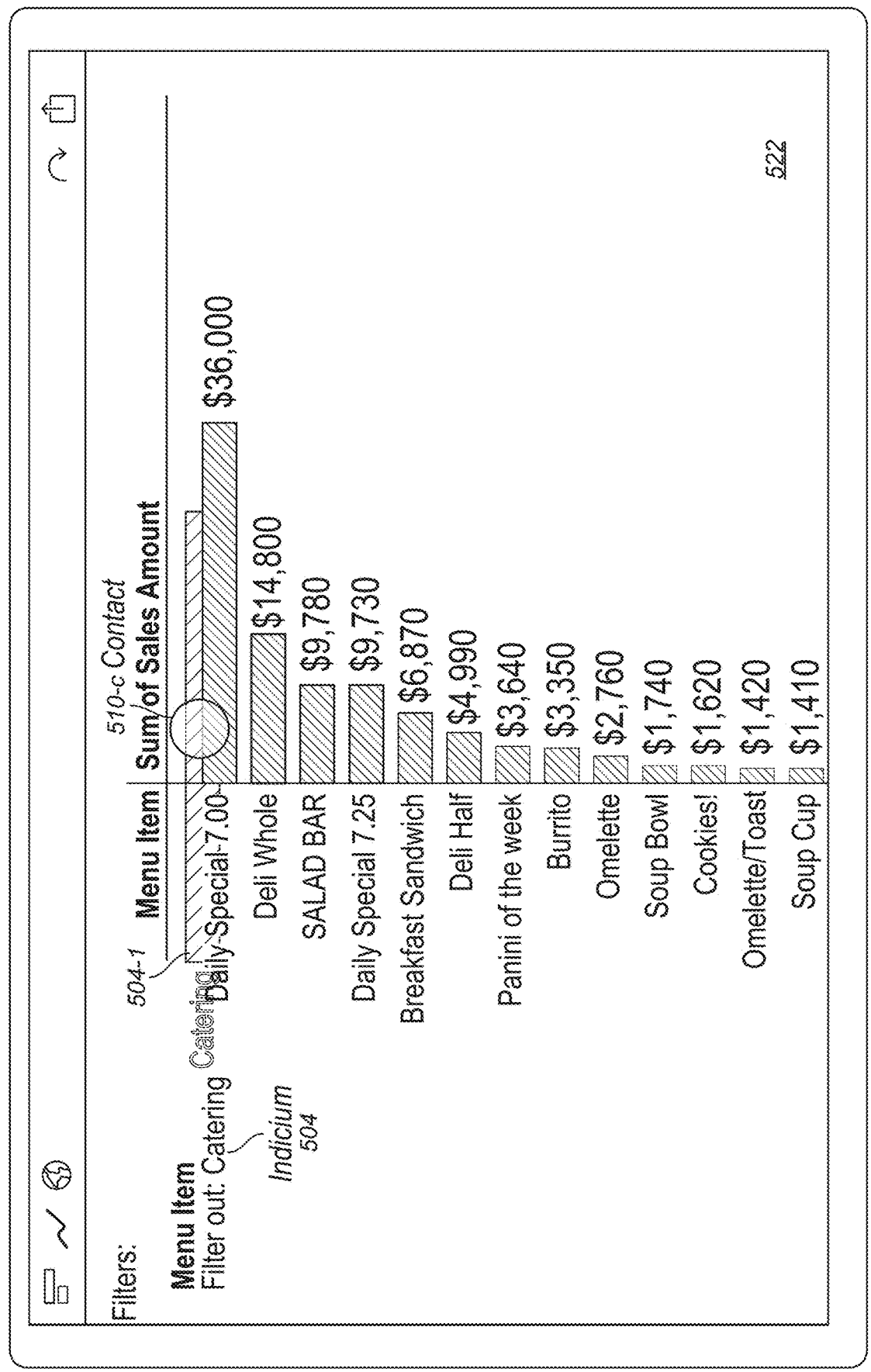
Figure 5D:
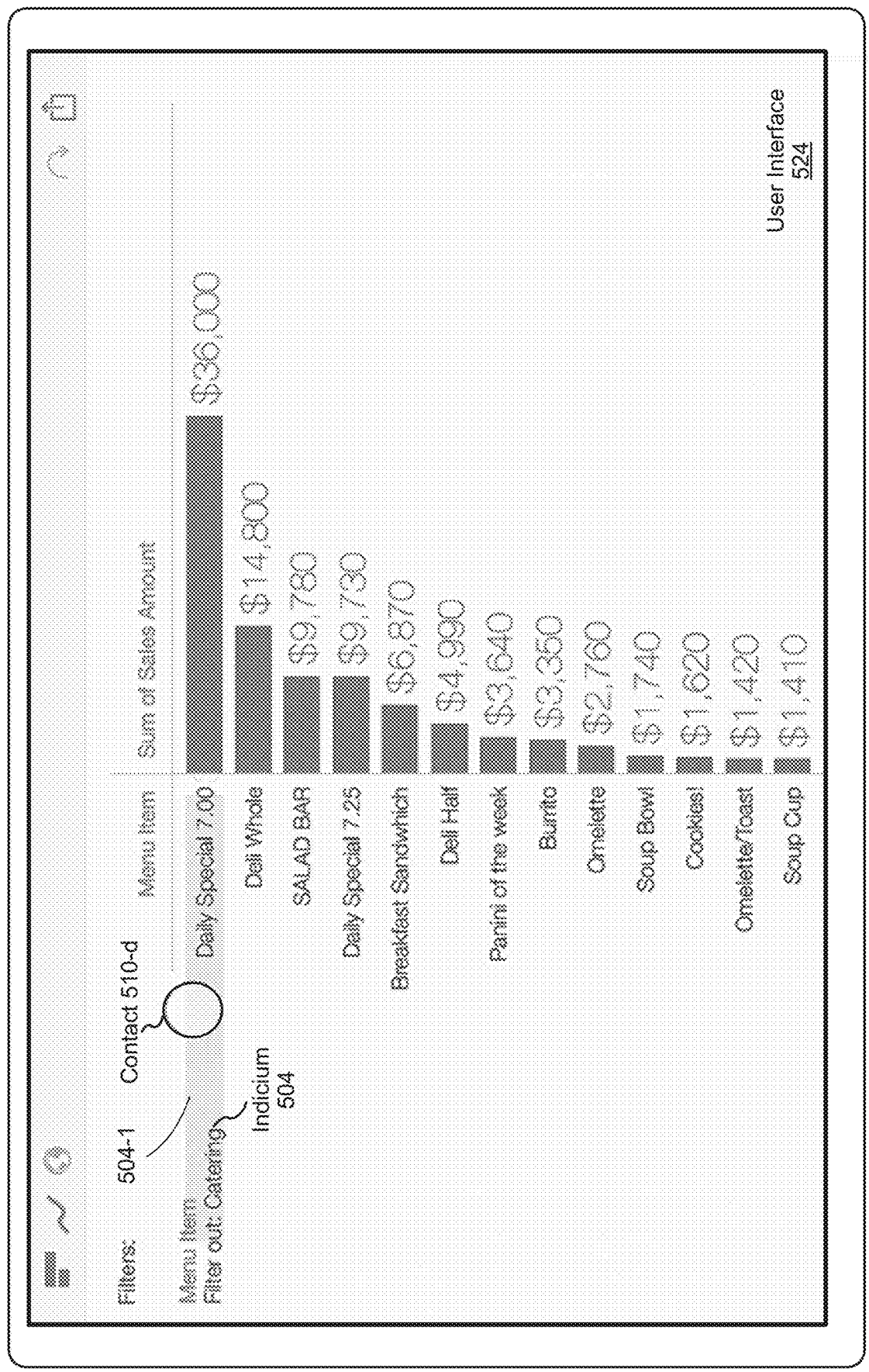
Figure 5E:
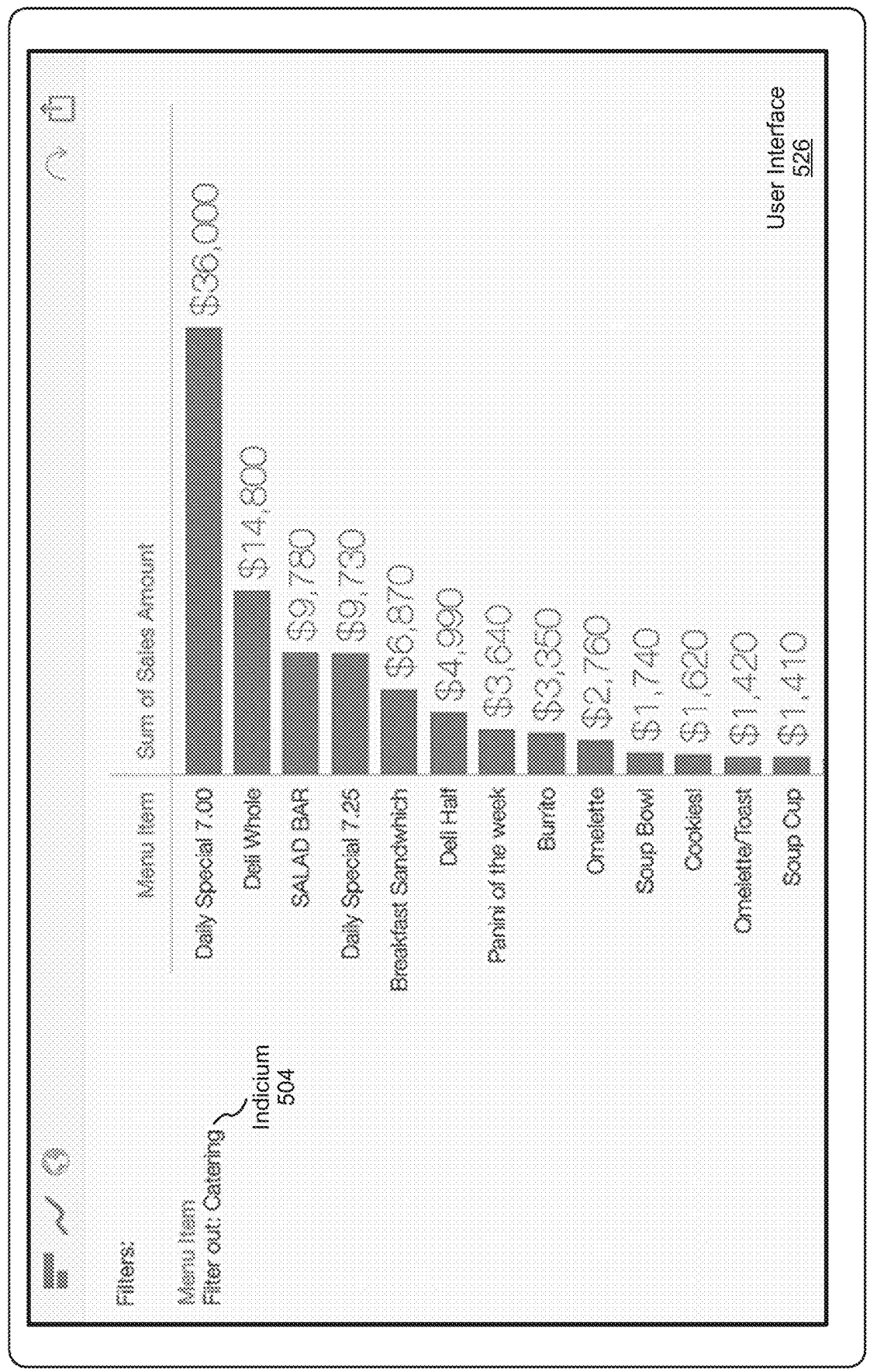

FIGS. 5A-5G illustrate user interfaces for adjusting data visualization filters, in accordance with some implementations. FIG. 5A shows a UI 518 including a category 502-1 and a category label 508-1. FIG. 5A also shows a contact 510 detected at a position 510-a corresponding to the visual mark 504-1 for the category 502-1. FIG. 5B shows a UI 520 including the contact 510 detected at a position 510-b and the visual mark 504-1 for category 502-1 moving in concert with movement of the contact 510 via an animated transition. FIG. 5C shows a UI 522 including the contact 510 detected at a position 510-c and the visual mark 504-1 for the category 502-1 continuing to move in concert with movement of the contact 510 via an animated transition. FIG. 5C also shows an indicium 504 indicating that the category 502-1 (Catering) is being filtered out of the data as a result of the current action (e.g., the movement of the contact 510). FIG. 5D shows a UI 524 including the indicium 504, the contact 510 detected at a position 510-d, and the visual mark 504-1 for category 502-1 continuing to move in concert with movement of the contact 510 via an animated transition. FIG. 5E shows a UI 526 including the indicium 504 and the removal of the visual mark 504-1 for the category 502-1 from the data visualization.

Figure 5F:
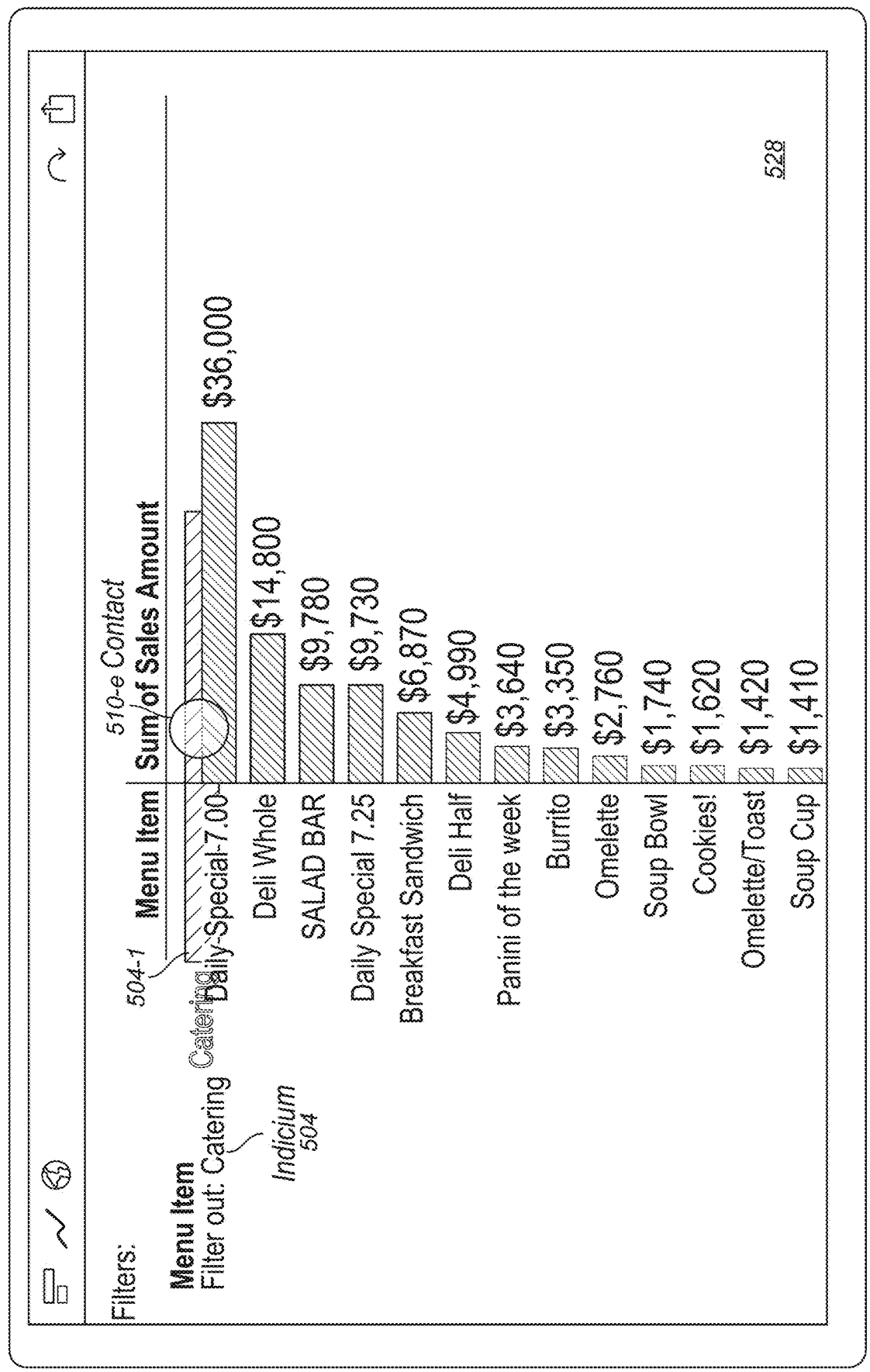

FIG. 5F illustrates the process of returning a data item (Catering) to a displayed data visualization after being previously filtered out. The process starts with a contact 510 on the indicium 504, and the user returns the visual mark 504-1 for the category 502-1 to the display. FIG. 5F shows a UI 528 including the indicium 504, and a contact 510 detected at position 510-e, and the visual mark for category 502-1 move in concert with movement of a contact 510 via an animated transition, bringing the visual mark 504-1 back to the data visualization.

FIGS. 5A-5F thus illustrate filtering out or returning an individual visual mark 504-1 to a data visualization. Note that multiple marks can be filtered out. In some instances, a user filters out one mark at a time, and may intersperse removing and returning visual marks to the data visualization. Some implementations enable a user to remove or return multiple visual marks simultaneously. In this illustrated implementation, moving a visual mark 504-1 to the left removes just that individual item.

Figure 5G:
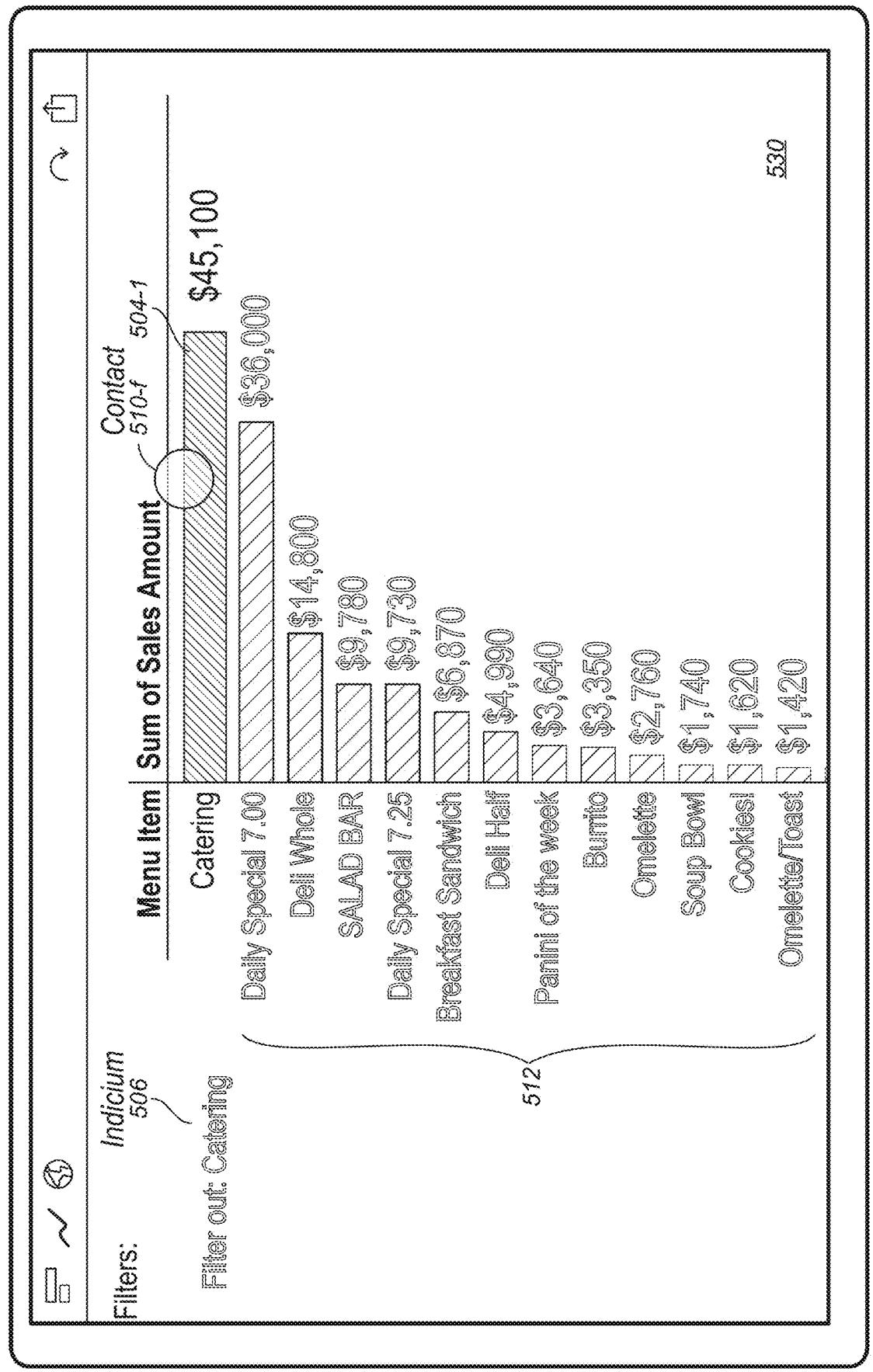
Figure 5H:
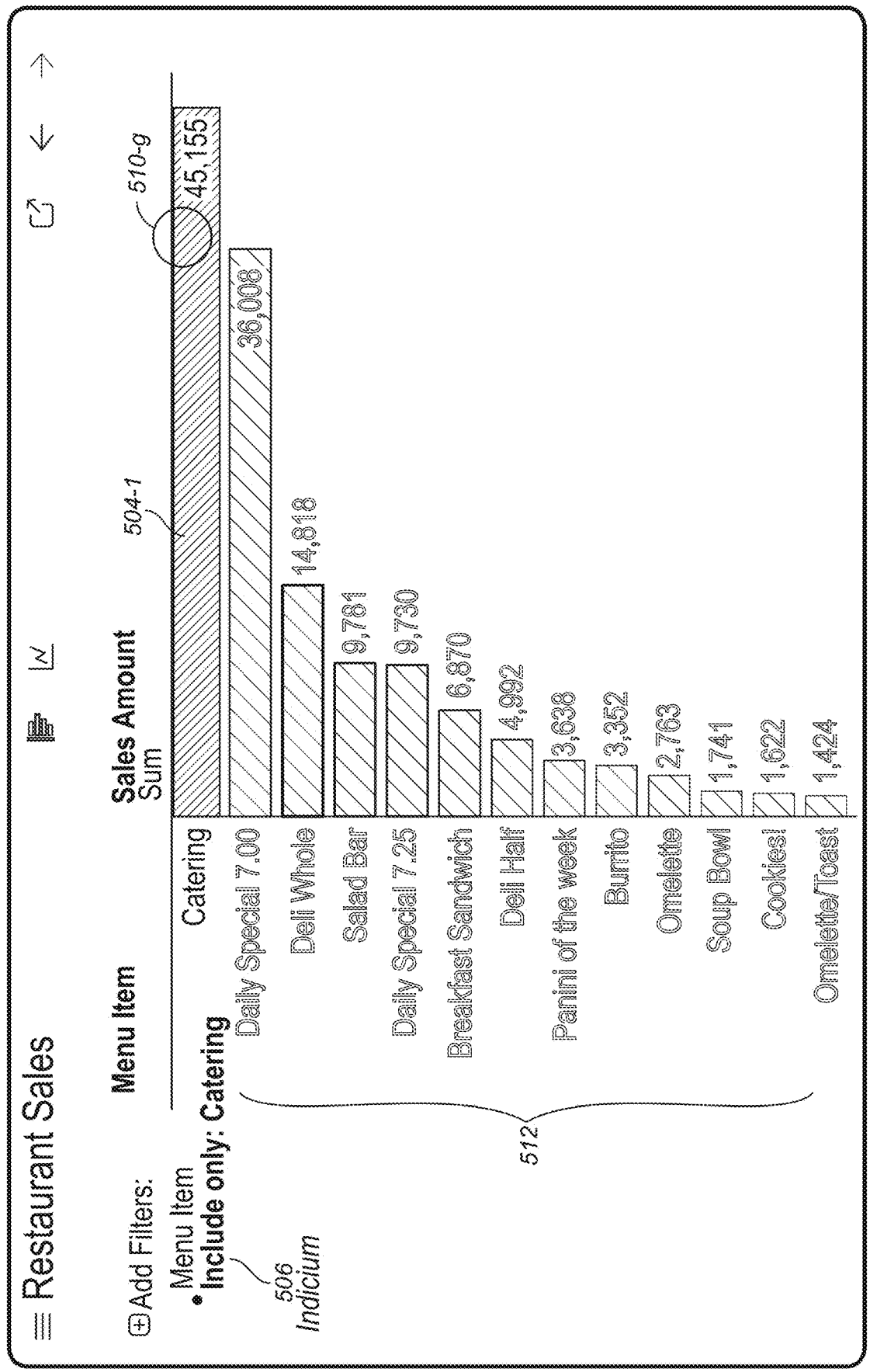
Figure 5I:
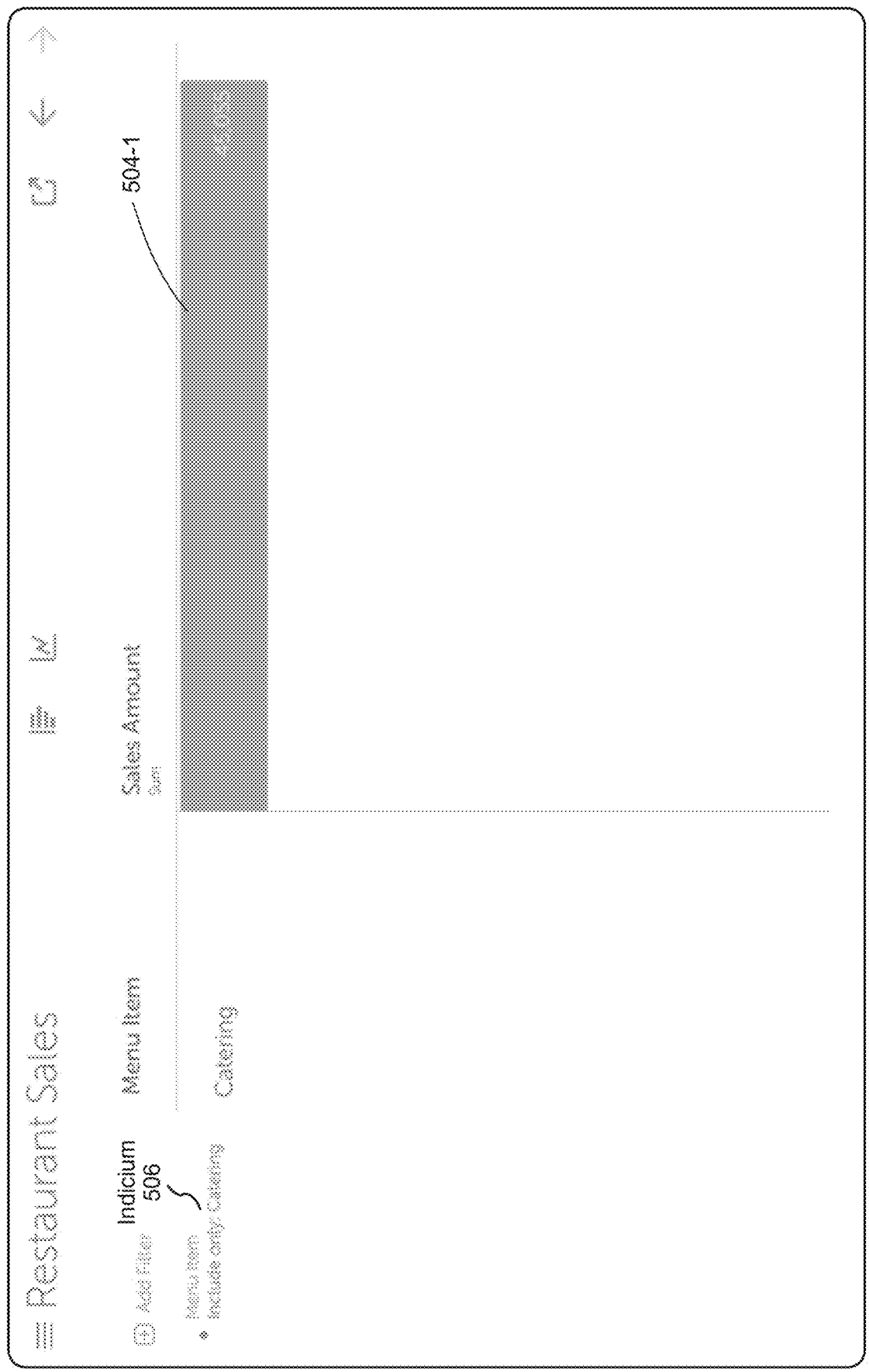

FIGS. 5G-5I illustrate an implementation in which moving a visual mark to the right performs a filtering operation in which only the selected visual mark 504-1 is kept. FIG. 5G shows a UI 530 including an indicium 506, which indicates that the category Catering 502-1 is the only category that will be kept. The visual marks for the other categories are shown dimmed, providing feedback to the user that they are being filtered out. In addition, the other category labels 512 are moving to the left. In the UI 530, the contact 510 is detected at a position 510-f on the visual mark 504-1. As the user moves the contact 510 to the right, the visual mark 504-1 does not move; instead, the other visual marks fade out and the other category labels 512 move to the left in concert with movement of a contact 510 via an animated transition. In FIG. 5H, the user has continued to move the contact 510 to the right, which is now at a position 510-g. The visual mark 504-1 for the Catering category has not moved, but the visual marks for the other categories have faded further and the corresponding labels 512 has moved further to the left, in concert with the movement of the contact position 510. With a little more movement of the contact position, only the Catering mark 504-1 remains, as illustrated in FIG. 5I.

Figure 6A:
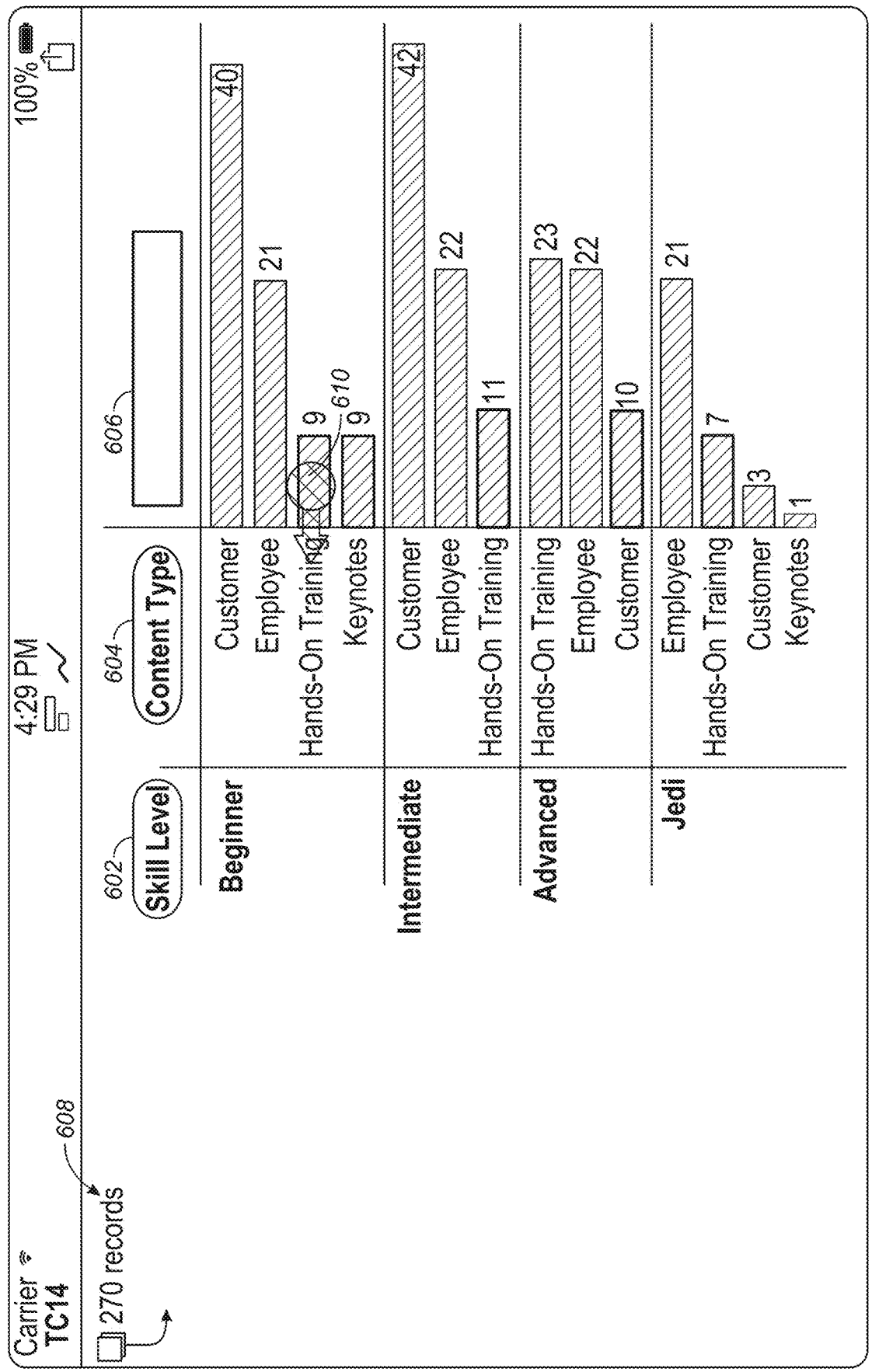
FIGS. 6A-6S illustrate a graphical user interface that provides for interactive hierarchical filtering, in accordance with some implementations.
Figure 6B:
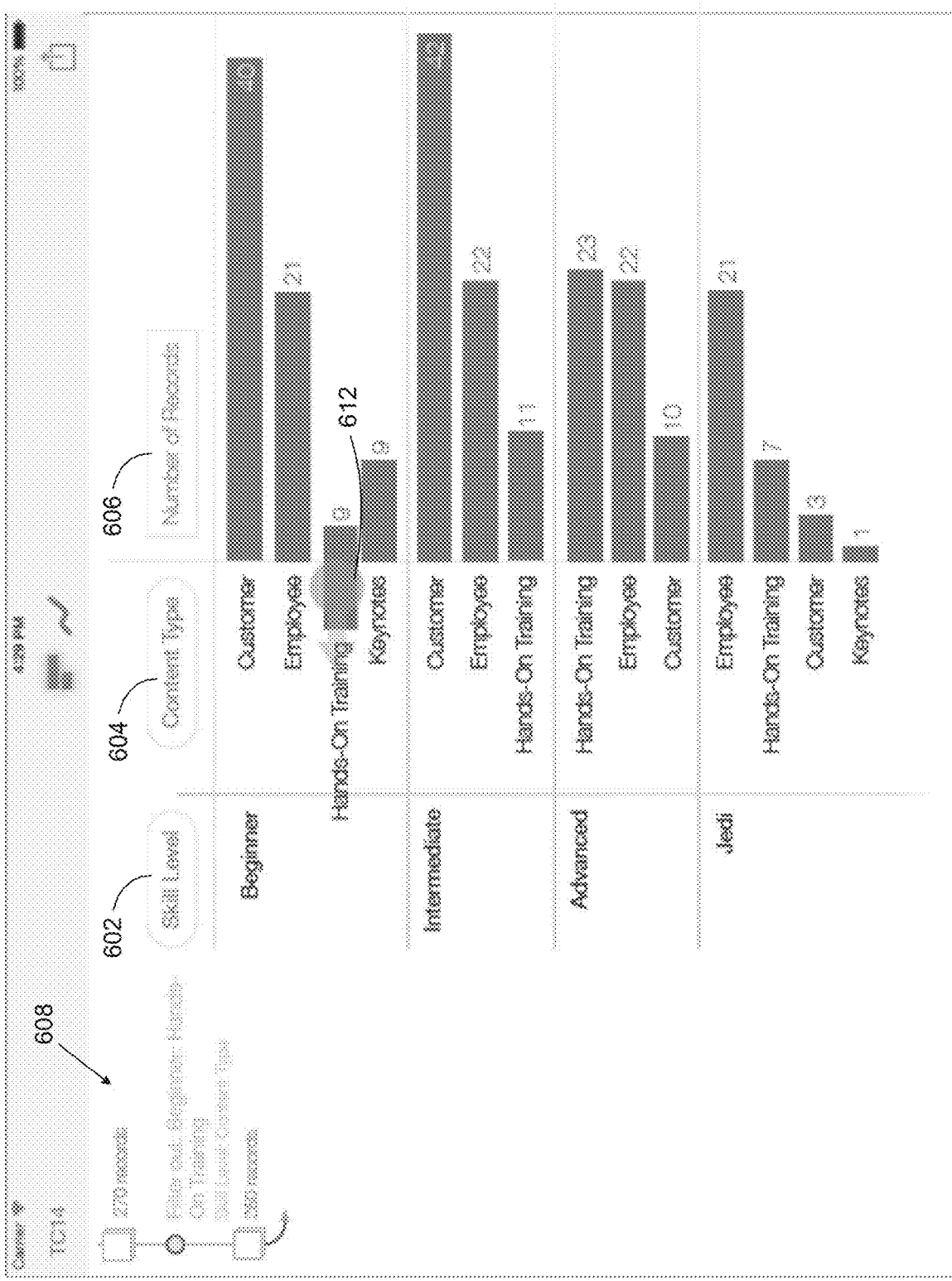
Figure 6C:
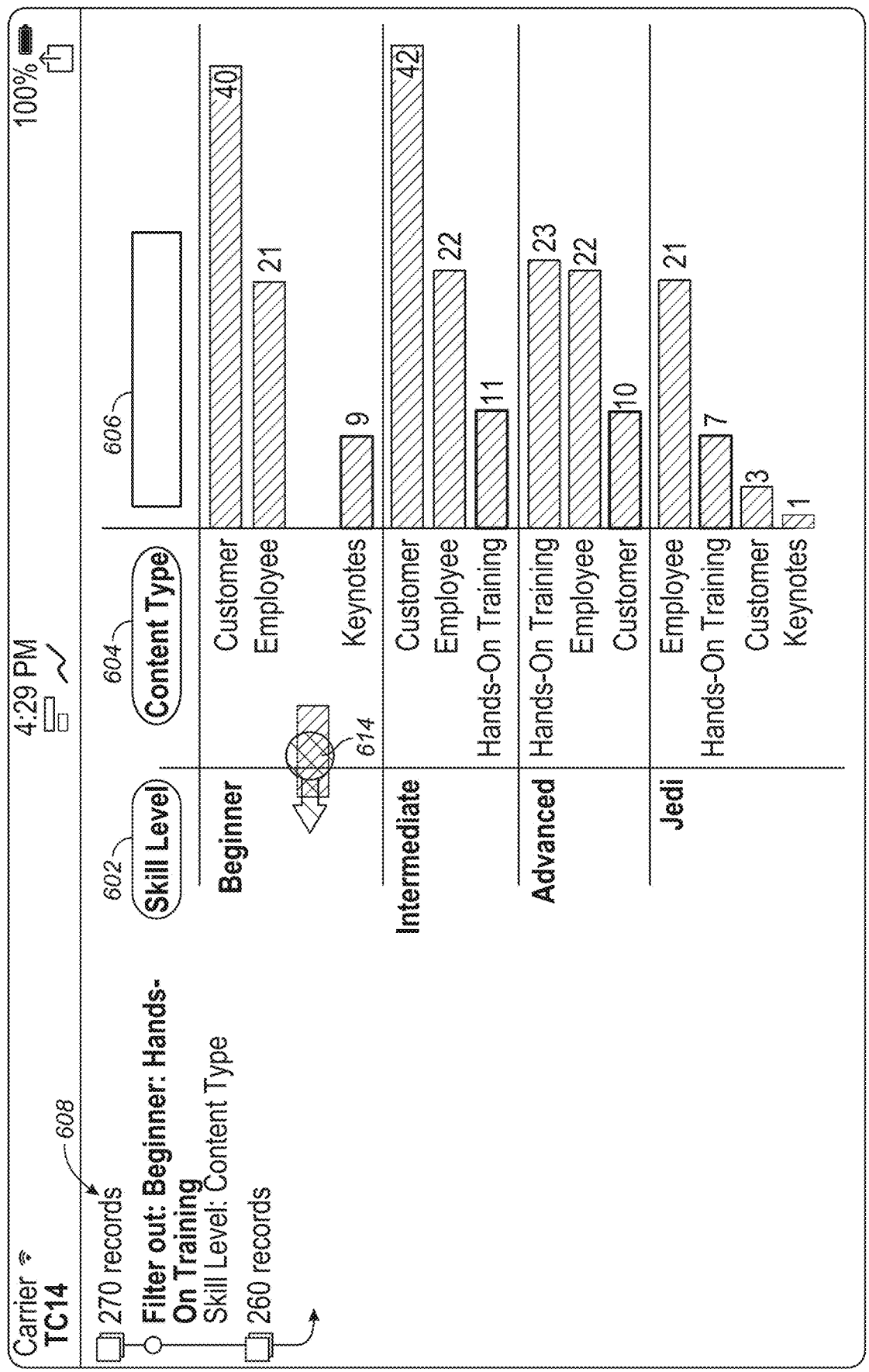
Figure 6D:
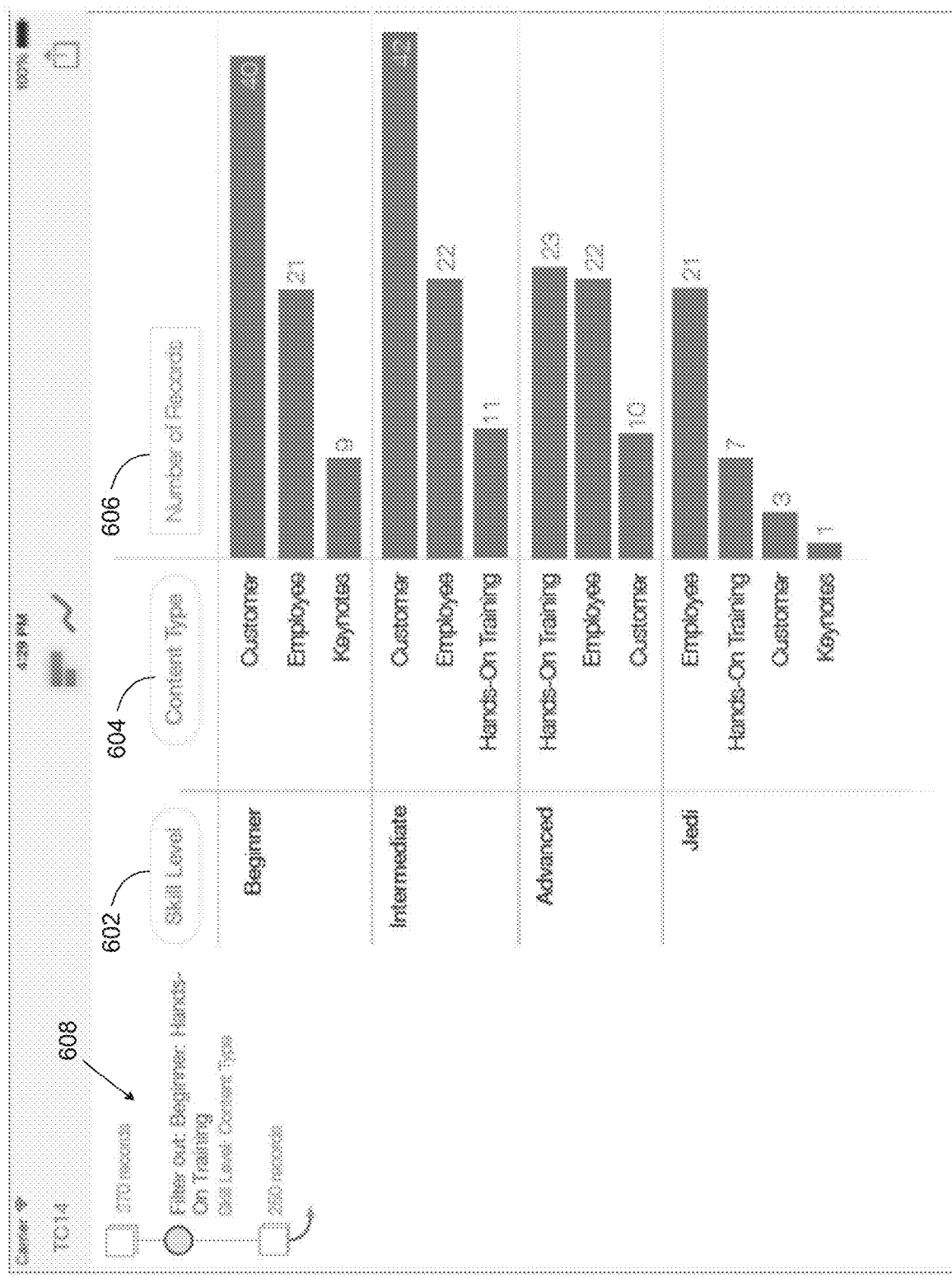
Figure 6E:
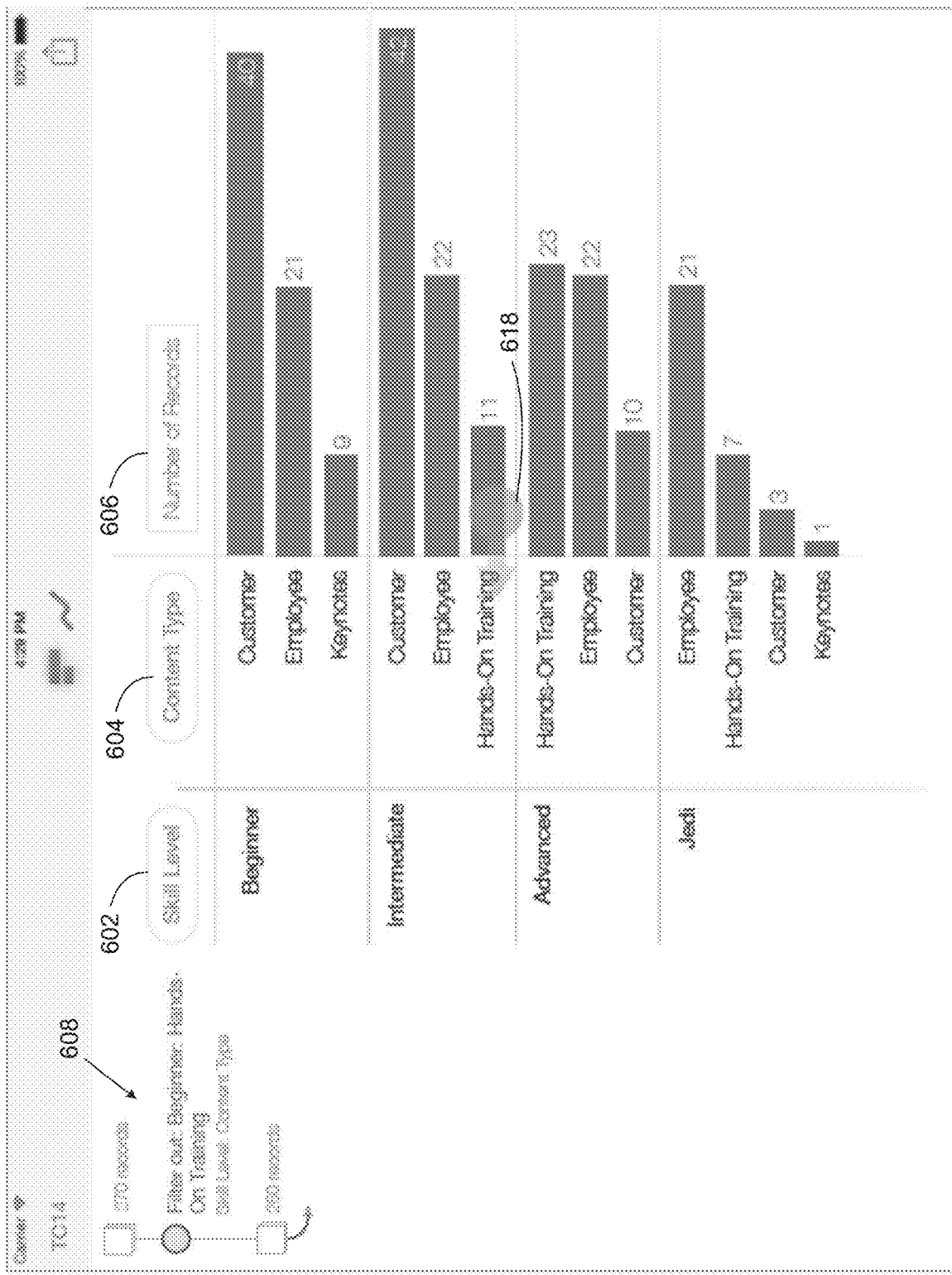
Figure 6F:
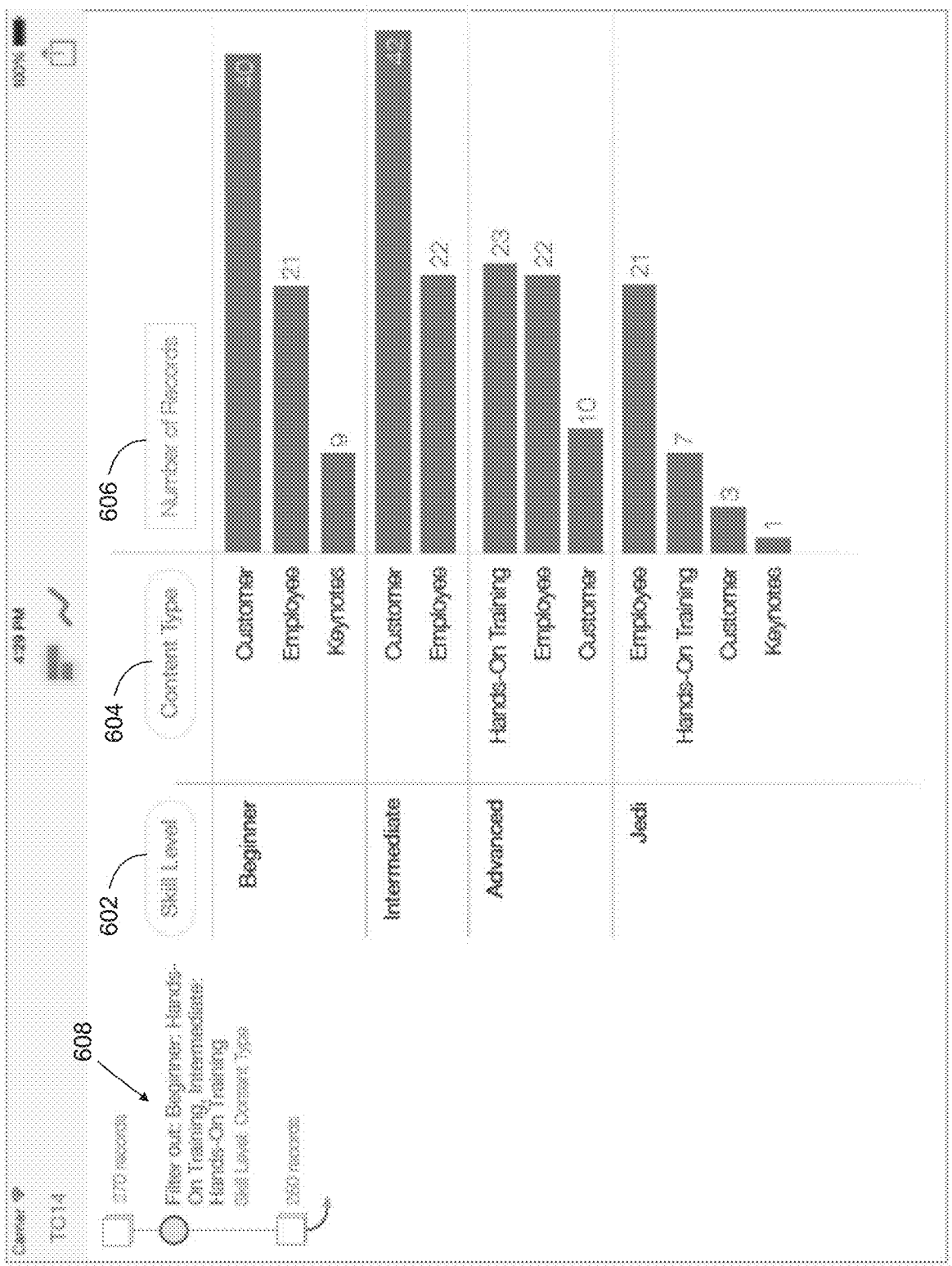
Figure 6G:
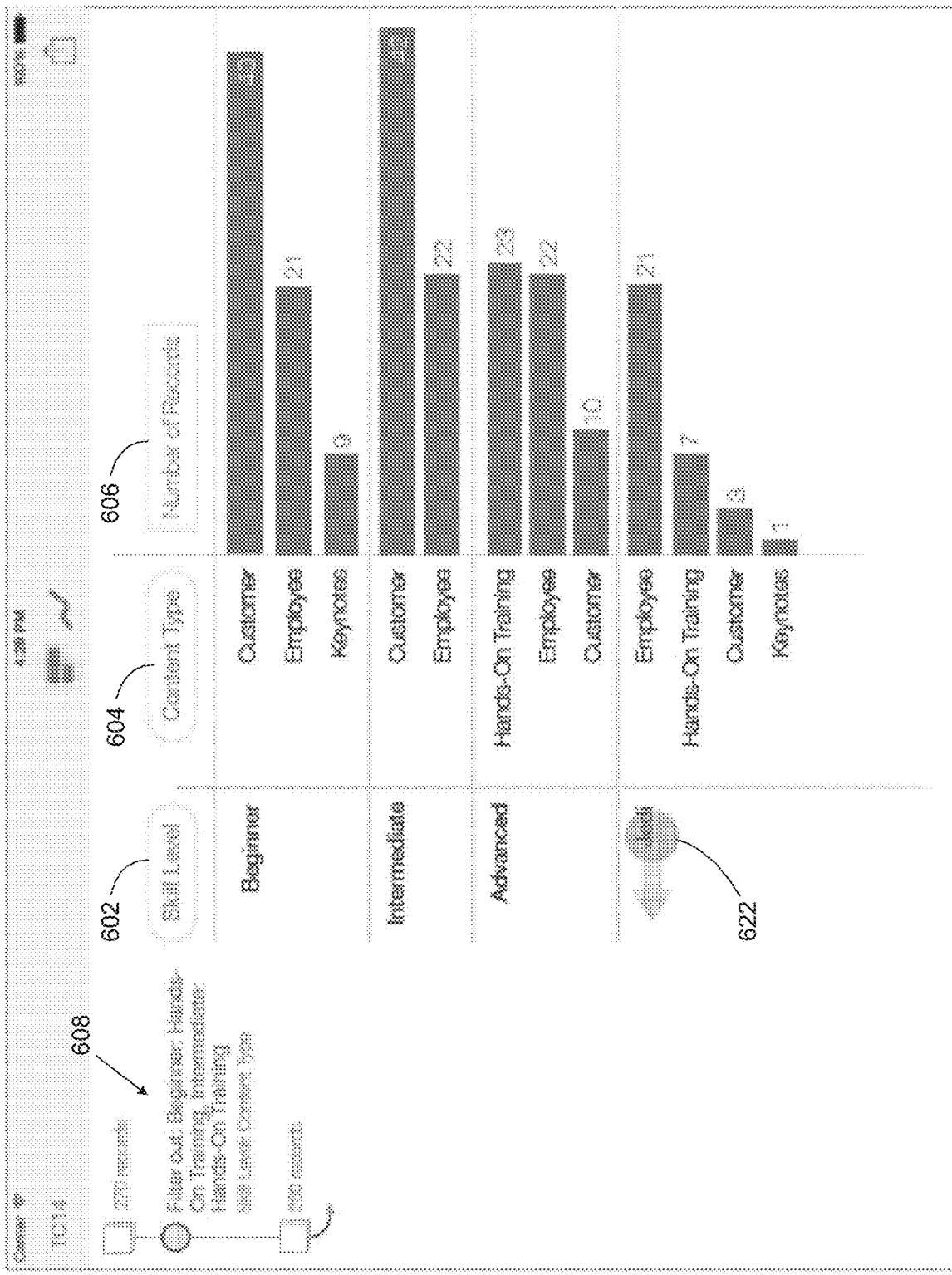
Figure 6H:
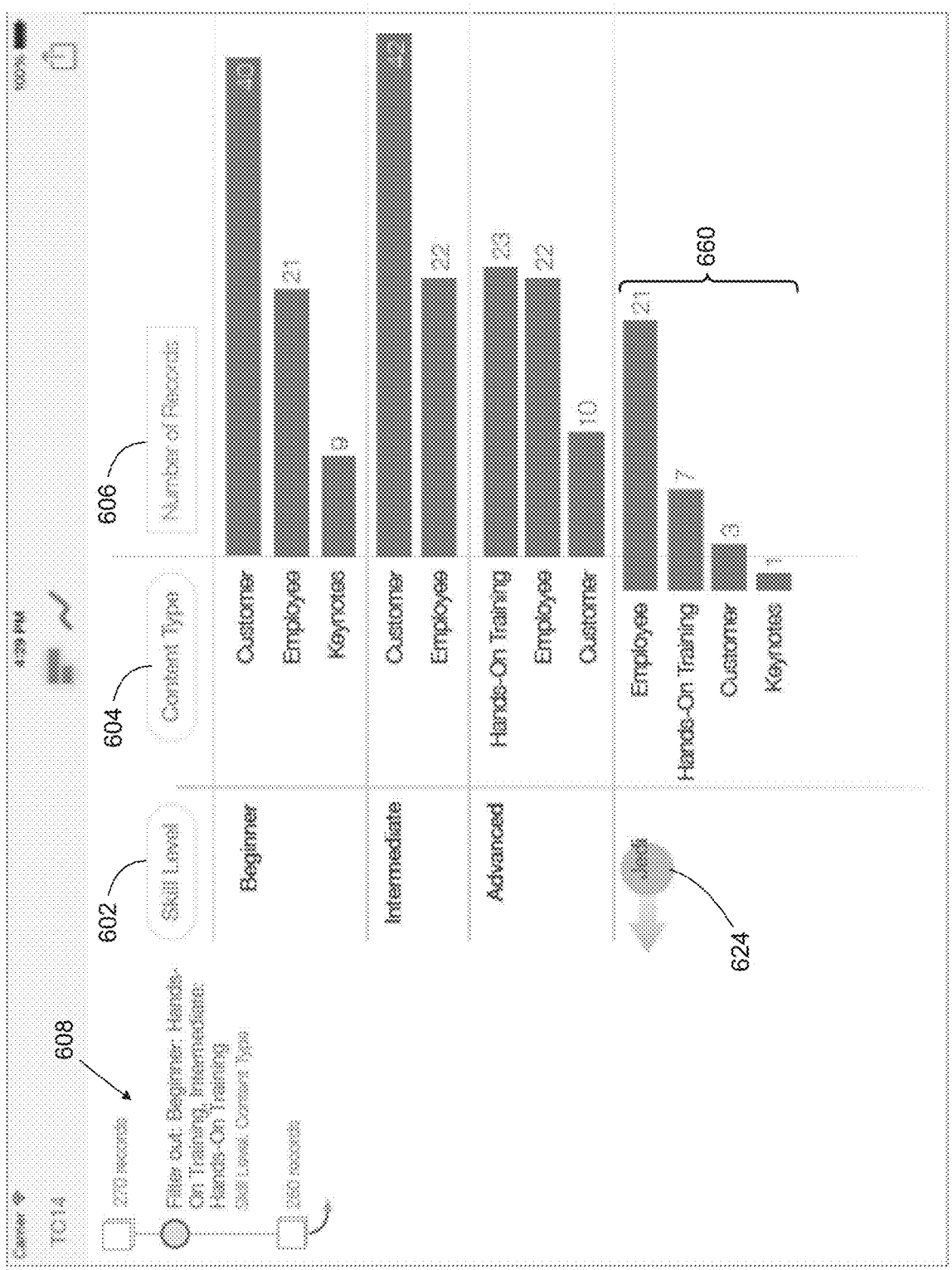
Figure 6I:
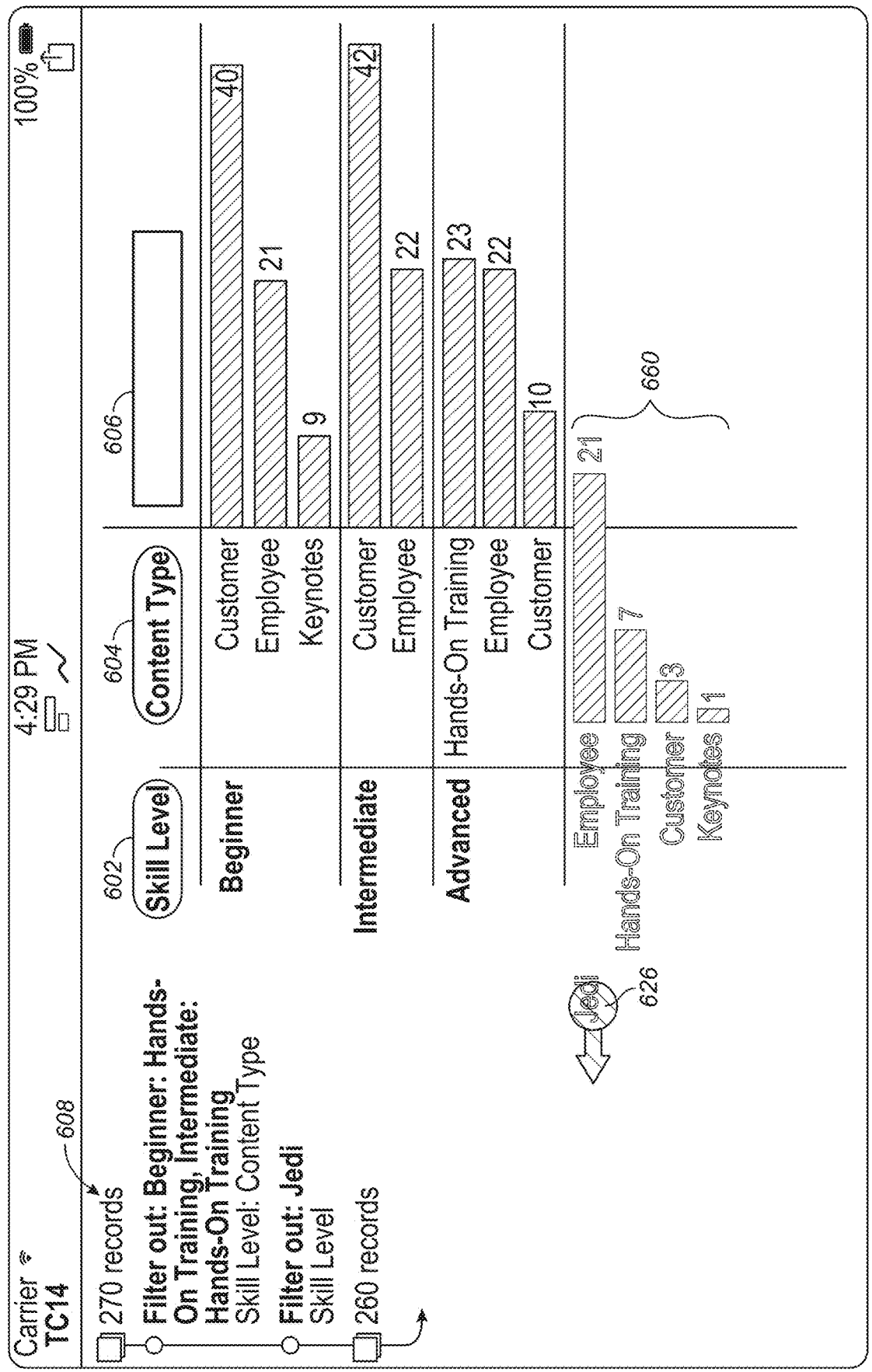
Figure 6J:
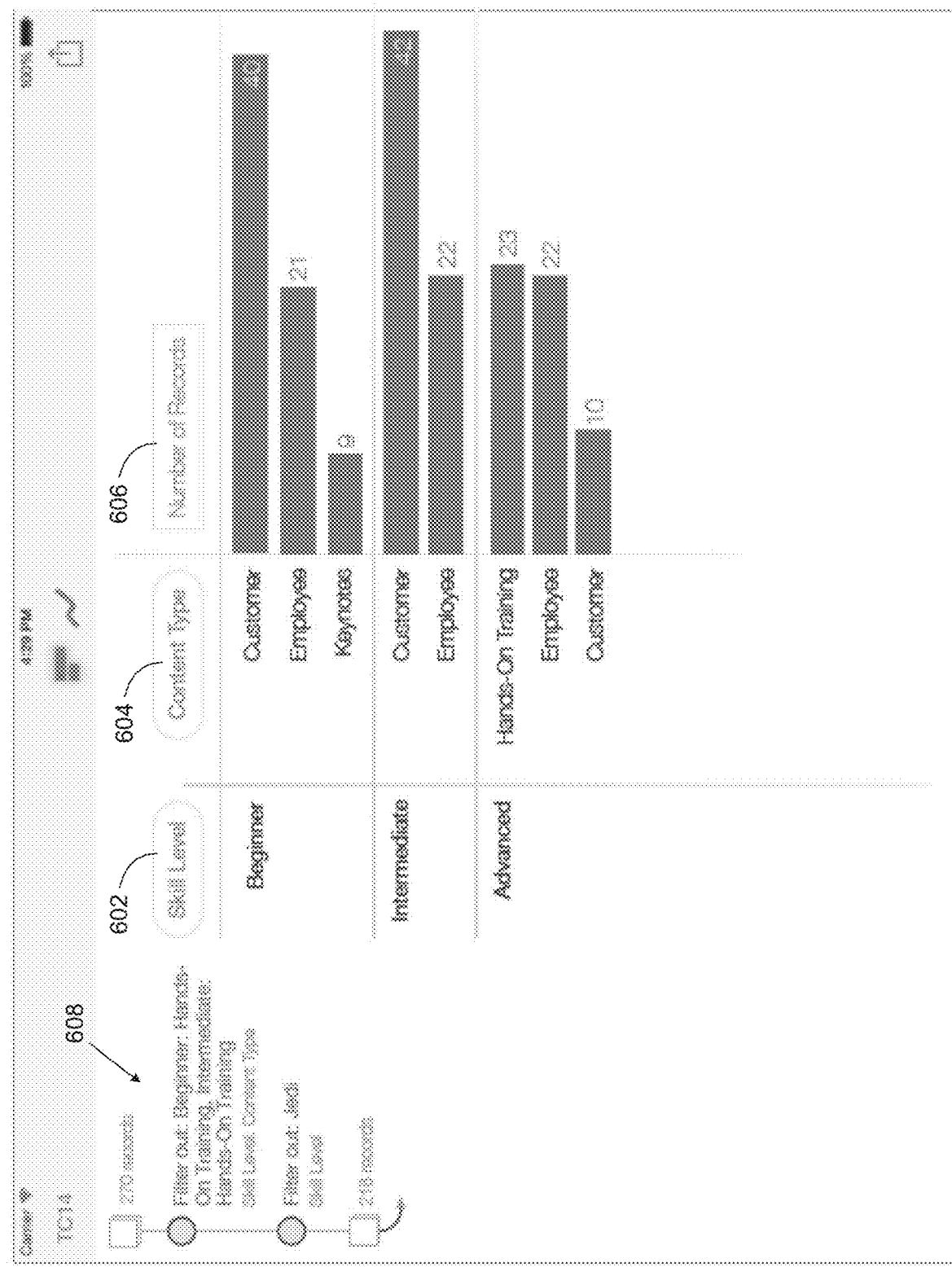
Figure 6K:
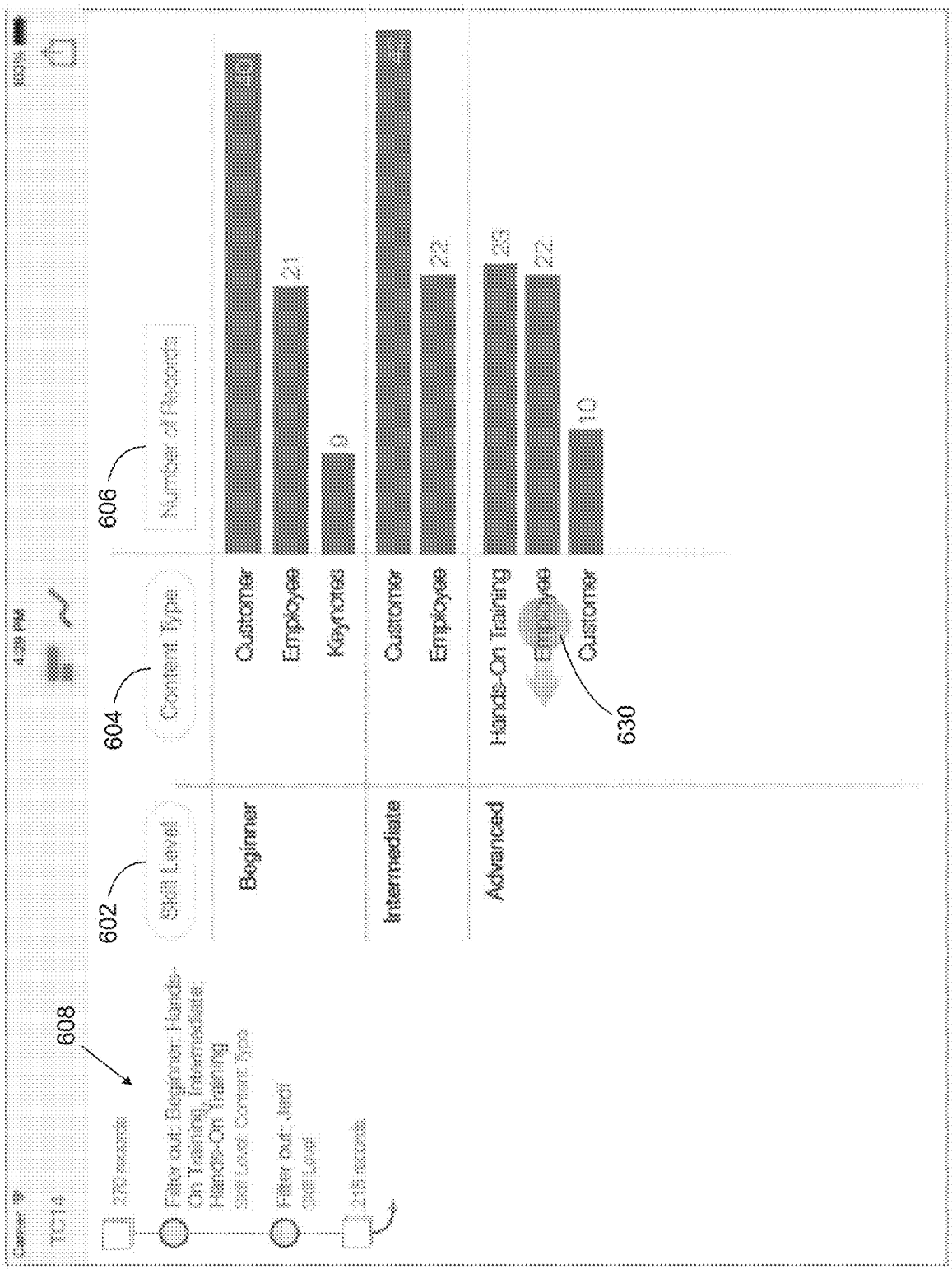
Figure 6L:
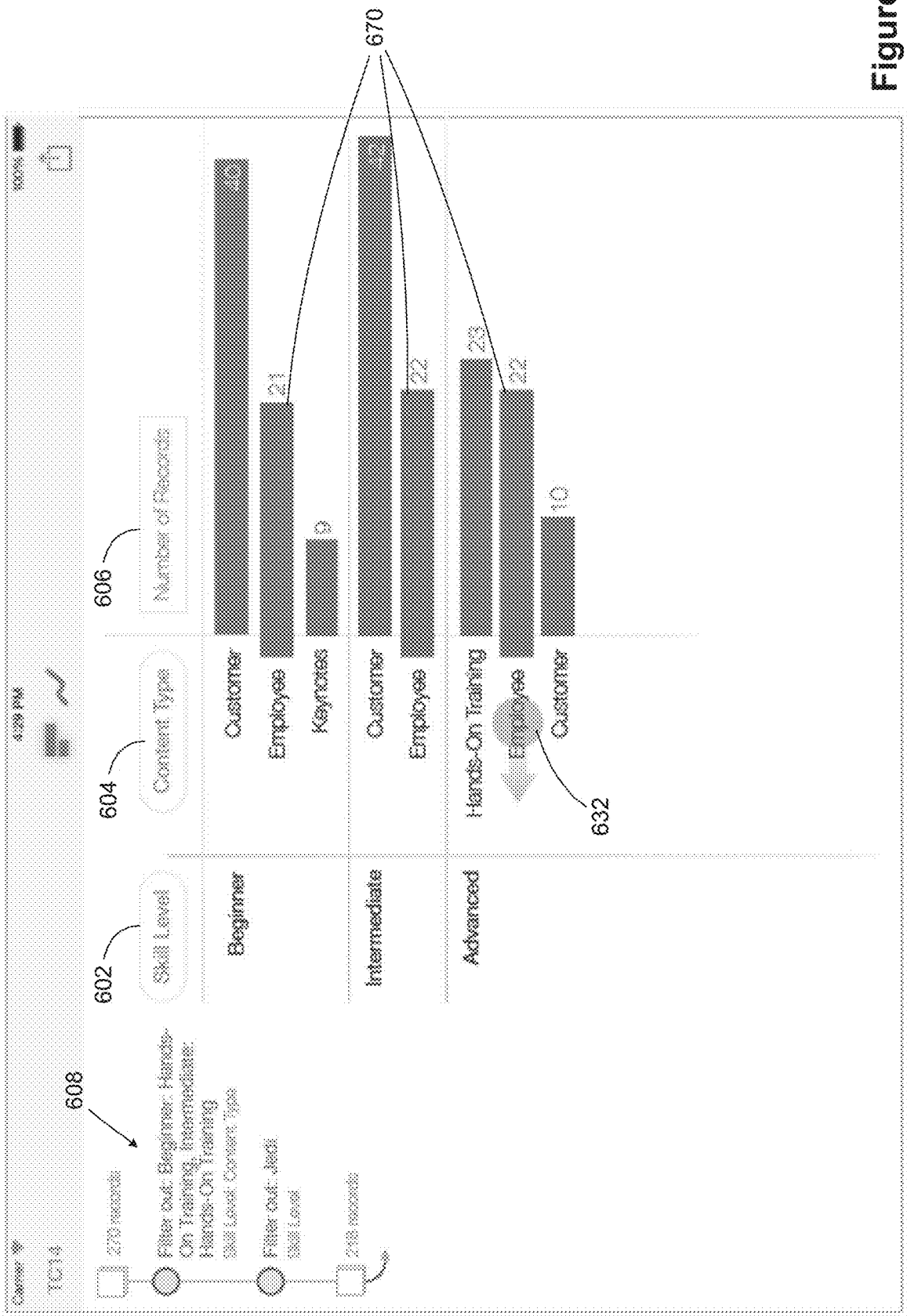
Figure 6M:
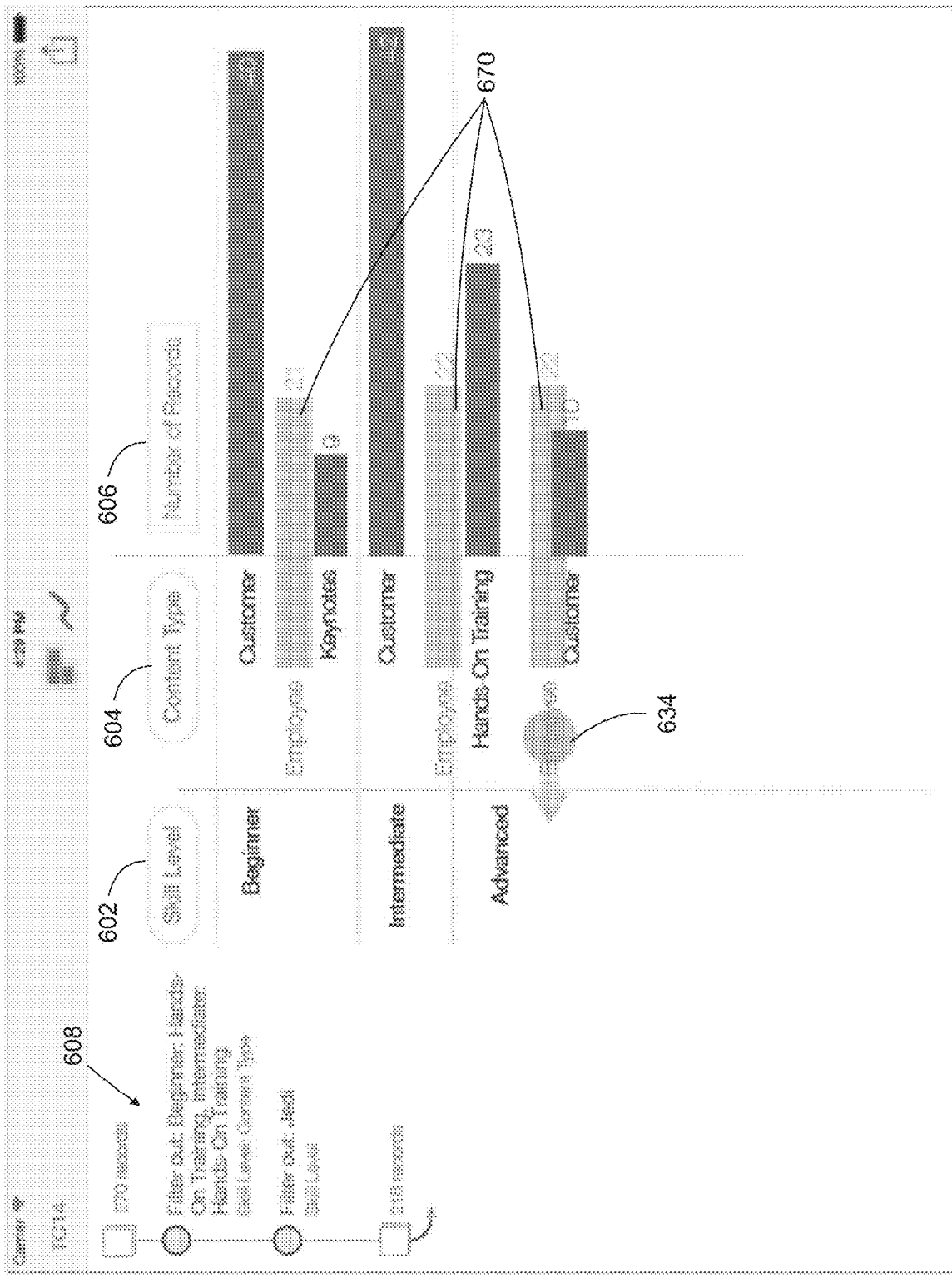
Figure 6N:
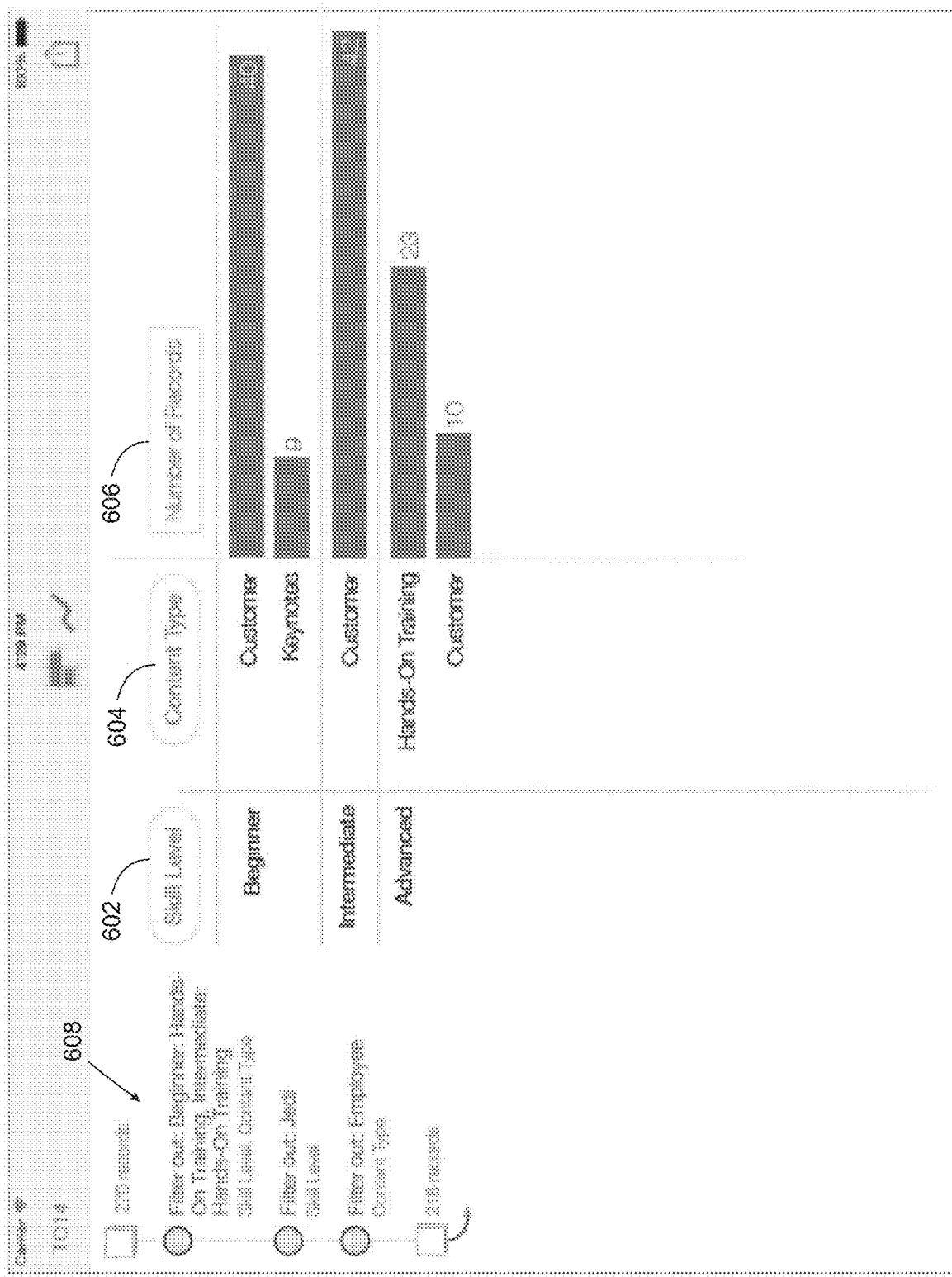
Figure 6O:
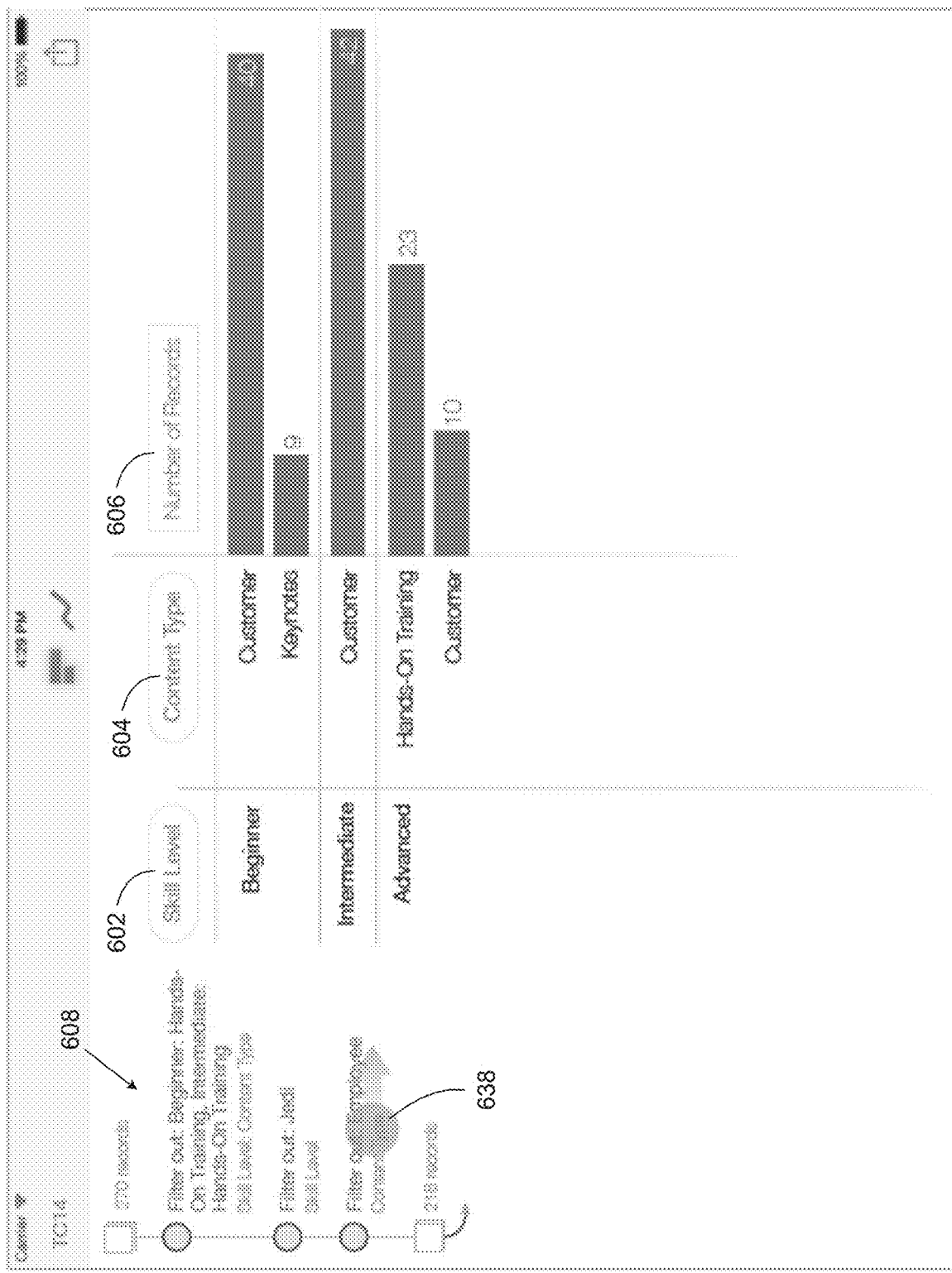
Figure 6P:
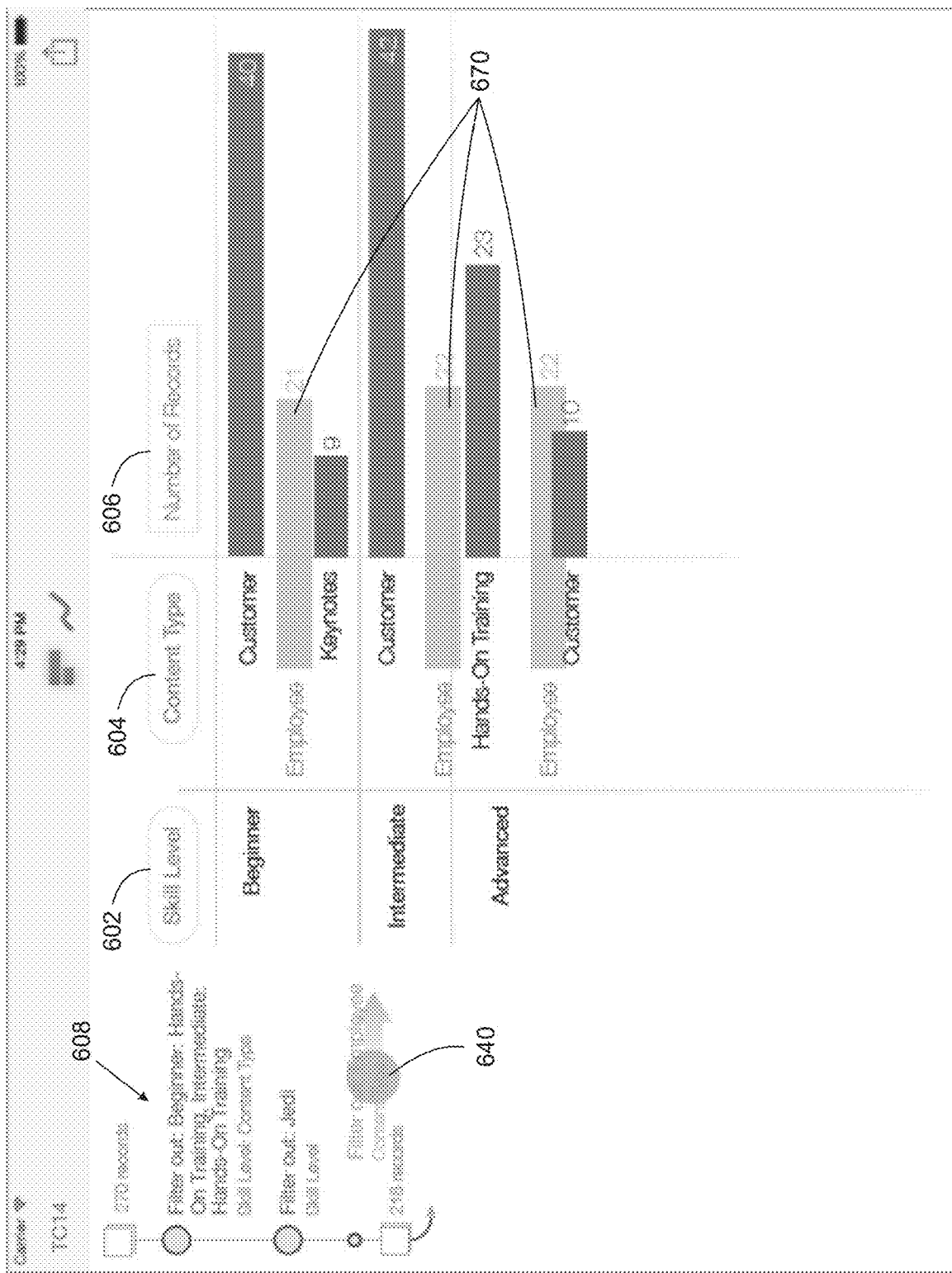
Figure 6Q:
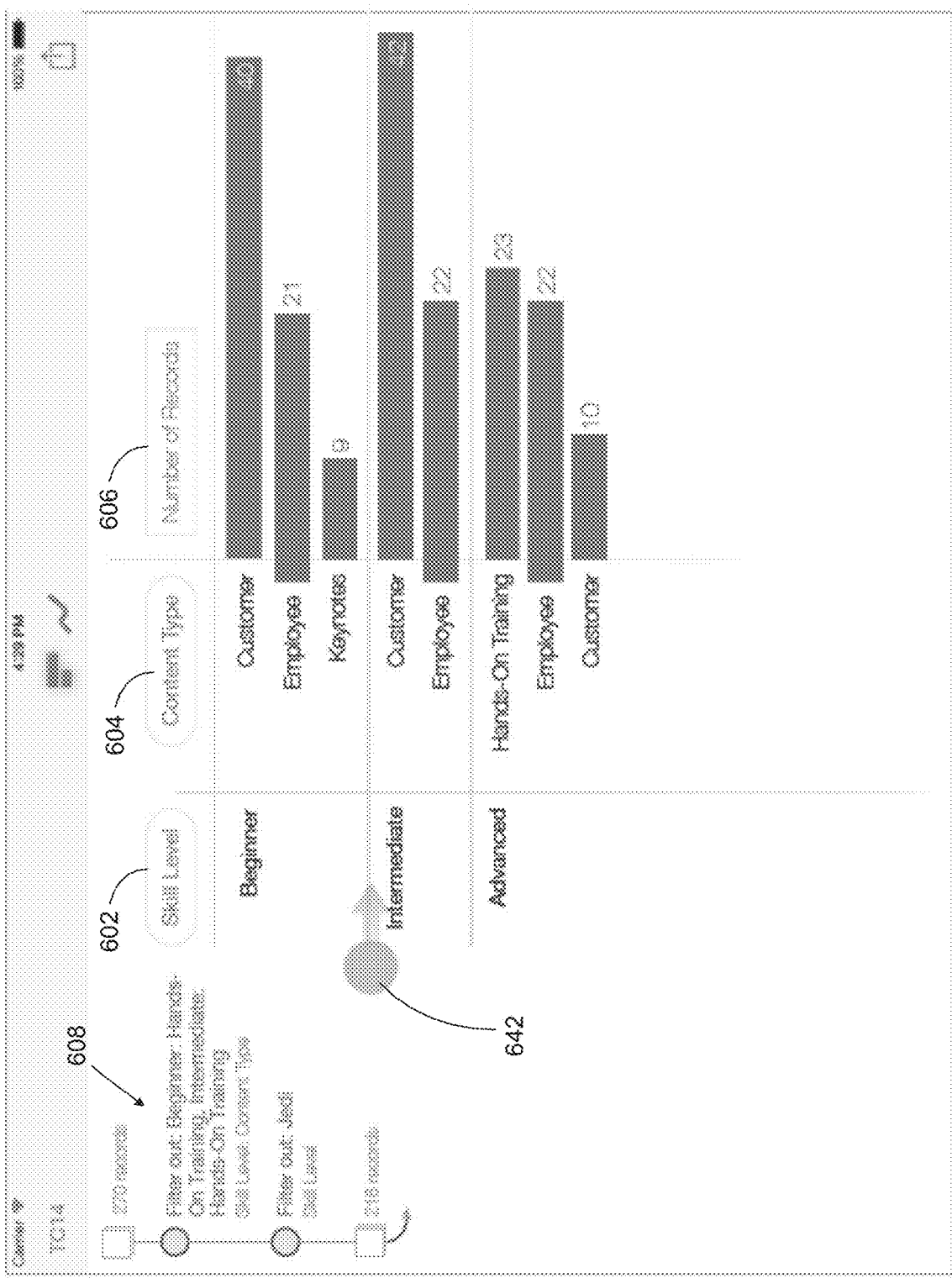
Figure 6R:
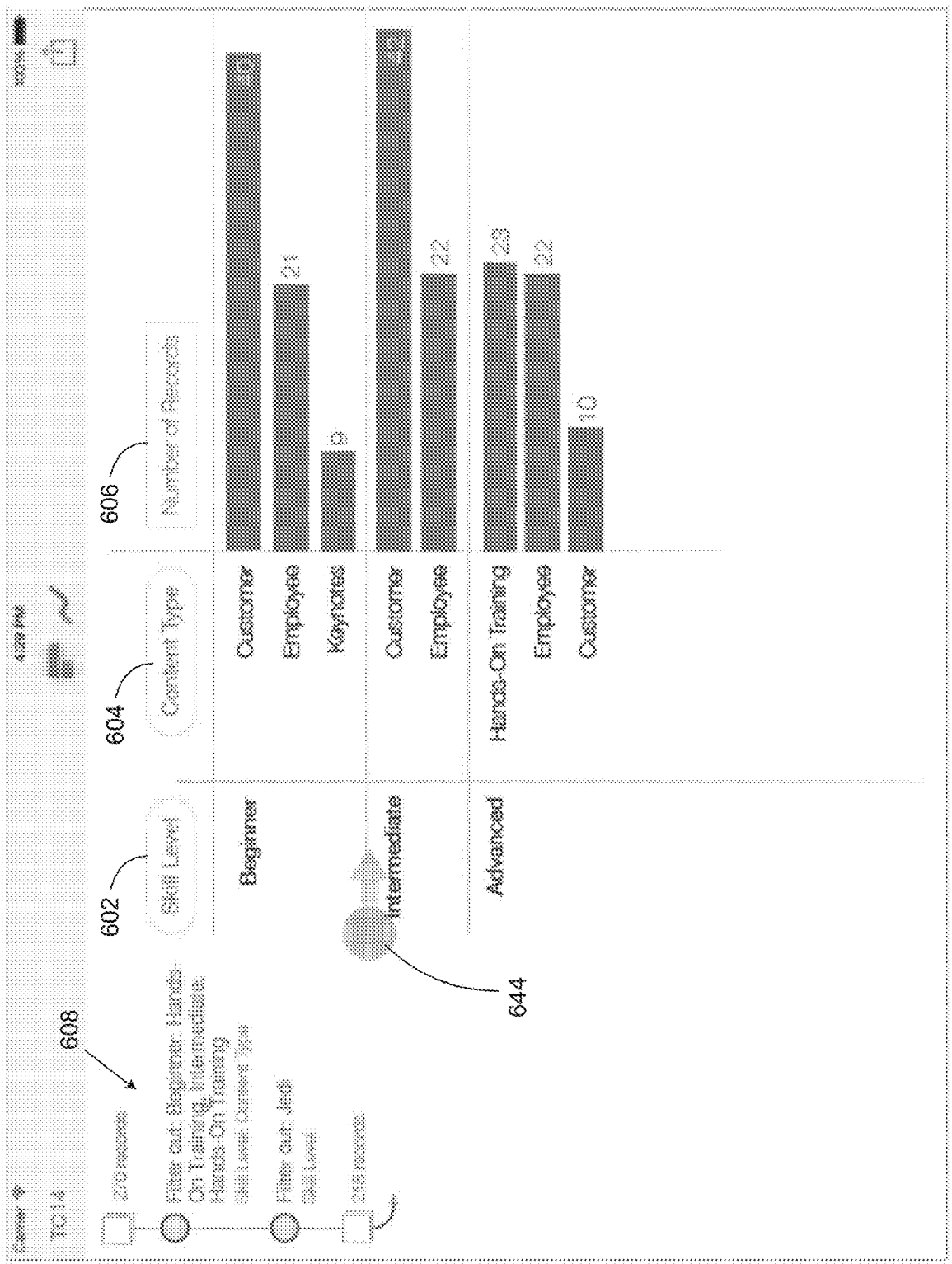
Figure 6S:
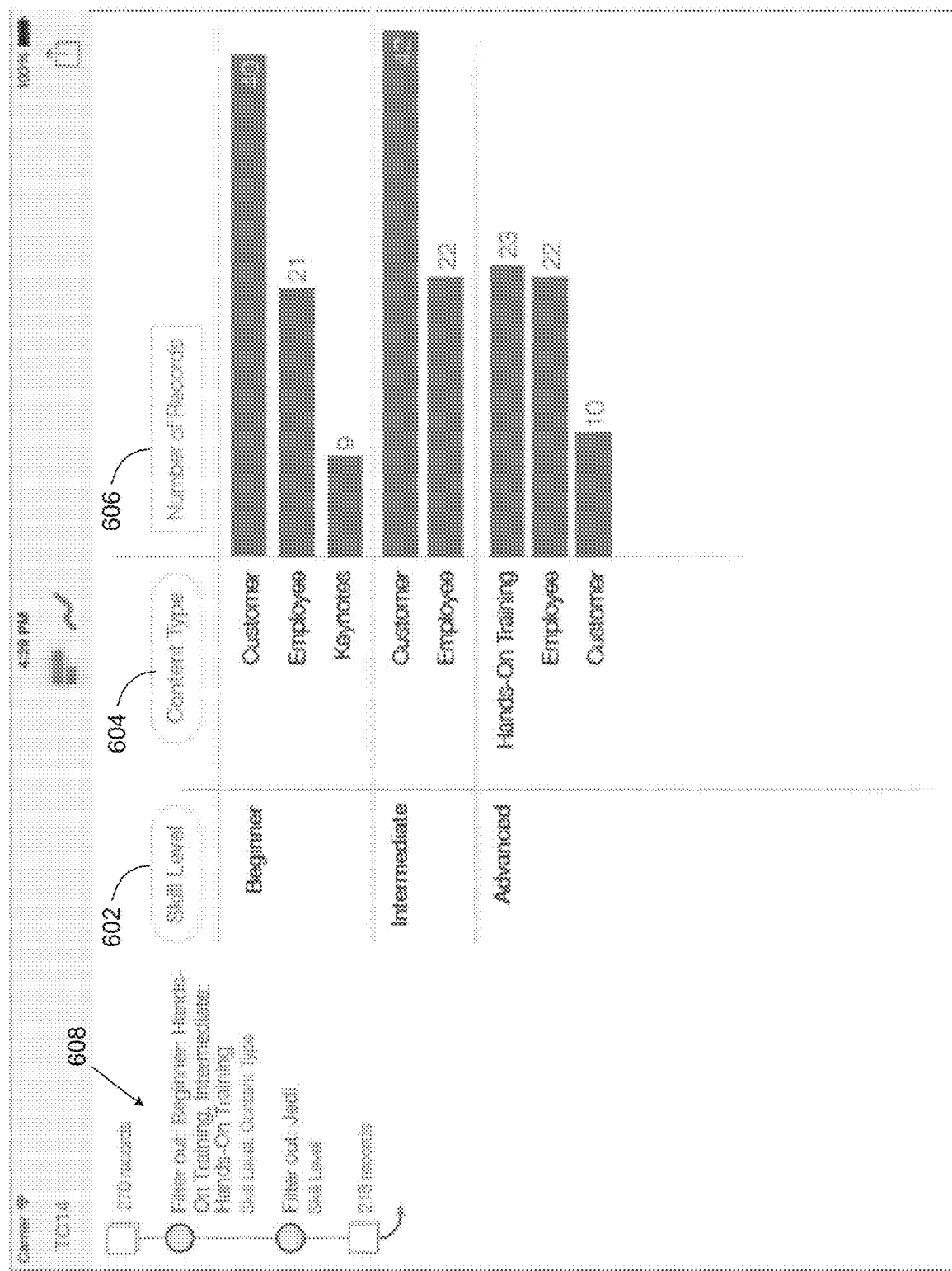

FIGS. 6A-6S illustrate a graphical user interface that provides for interactive hierarchical filtering, in accordance with some implementations. Here, the data set is for a user conference with many individual sessions for people to attend. The session has both a skill level 602 and a content type 604. In the data visualization in FIG. 6A, the visual marks (the bars) represent the number of records 606 for each skill level/content type combination. In the upper left corner is an indicium 608 of what records are being displayed. Initially, there are 270 records, and none of the records are being filtered out. The user can filter out data in the data visualization, and what is filtered depends on what is selected.

In FIG. 6A, the interface contact point 610 is on a specific bar, so moving the contact point to the left proceeds to remove just the one selected bar, which represents the hands on training sessions for beginners. As illustrated in FIGS. 6B and 6C as the contact point reaches position 61 and then 614. In some implementations, the bar that is being removed begins to fade as it is removed, as illustrated in FIG. 6C. The indicium 608 is updated to provide the user feedback about the current option. Here, the indicium 608 indicates that the beginner hands on training sessions will be filtered out. In some implementations, the indicium for the filtering condition remains dimmed until the action is complete. FIG. 6D illustrates completion of the action to filter out beginner hands on training sessions.

In FIG. 6E, the user places the contact position 618 on the hands on training sessions for intermediate users and begins to move the contact position to the left. The indicium 608 is updated to indicate that this additional set of sessions is filtered out, as illustrated in FIG. 6F.

In FIG. 6G, the user places the contact position 622 on the Jedi skill level and begins to move the contact to the left. Because the user has selected a skill level 602, moving the contact position 624 results in moving out all of the sessions 660 for this skill level, regardless of the content type, as illustrated in FIG. 6H. As the contact point 626 moves further, the set 660 of sessions continue to move in concert, and in some implementations the visual marks for the set 660 are dimmed, as illustrated in FIG. 6I. As illustrated in FIGS. 6I and 6J, the indicium 608 updates to show the additional filter. In some implementations, filters are displayed differently within the indicium depending on whether the filter applies to a single visual mark or an entire dimension.

In FIG. 6K, the user places the contact position 630 on the "employee" contact type within the advanced skill level. Because the user has selected a content type rather than an individual data mark, as the user moves the contact position 632 to the left, all three of the data marks 670 are moved in concert with the movement of the contact position. That is the user is filtering out the "employee" contact type, regardless of skill level. As the contact position 634 moves to the left, all three of the visual marks 670 for this contact type are moved in concert to be filtered out, as illustrated in FIG. 6M. As illustrated in FIG. 6N, the indicium 608 is updated to show that this content type is being filtered out.

FIGS. 6O-6S illustrate reversing the process, bringing back the sessions for the "employee" content type. The user selects 638 the "employee" content type from the indicium 608, and moves it to the right, through positions 640, 642, and 644, until the marks for these sessions are back in the data visualization, as shown in FIG. 6S.

Although FIGS. 6A-6S depict a scenario where two dimensions are displayed (Skill Level and Content Type), the same methodology applies when three of more dimensions are displayed. When a specific data mark is moved, just that one mark is filtered out. For the other dimensions, what is filtered out depends on the dimension selected.

When the dimensions are independent of each other, the process is as described. In some instances, there are hierarchical dependencies between the dimensions. In some implementations, when there is a hierarchical dependency between the selected dimensions, filtering out a dependent value filters out the dependent value only within its hierarchy.

Figure 7A:
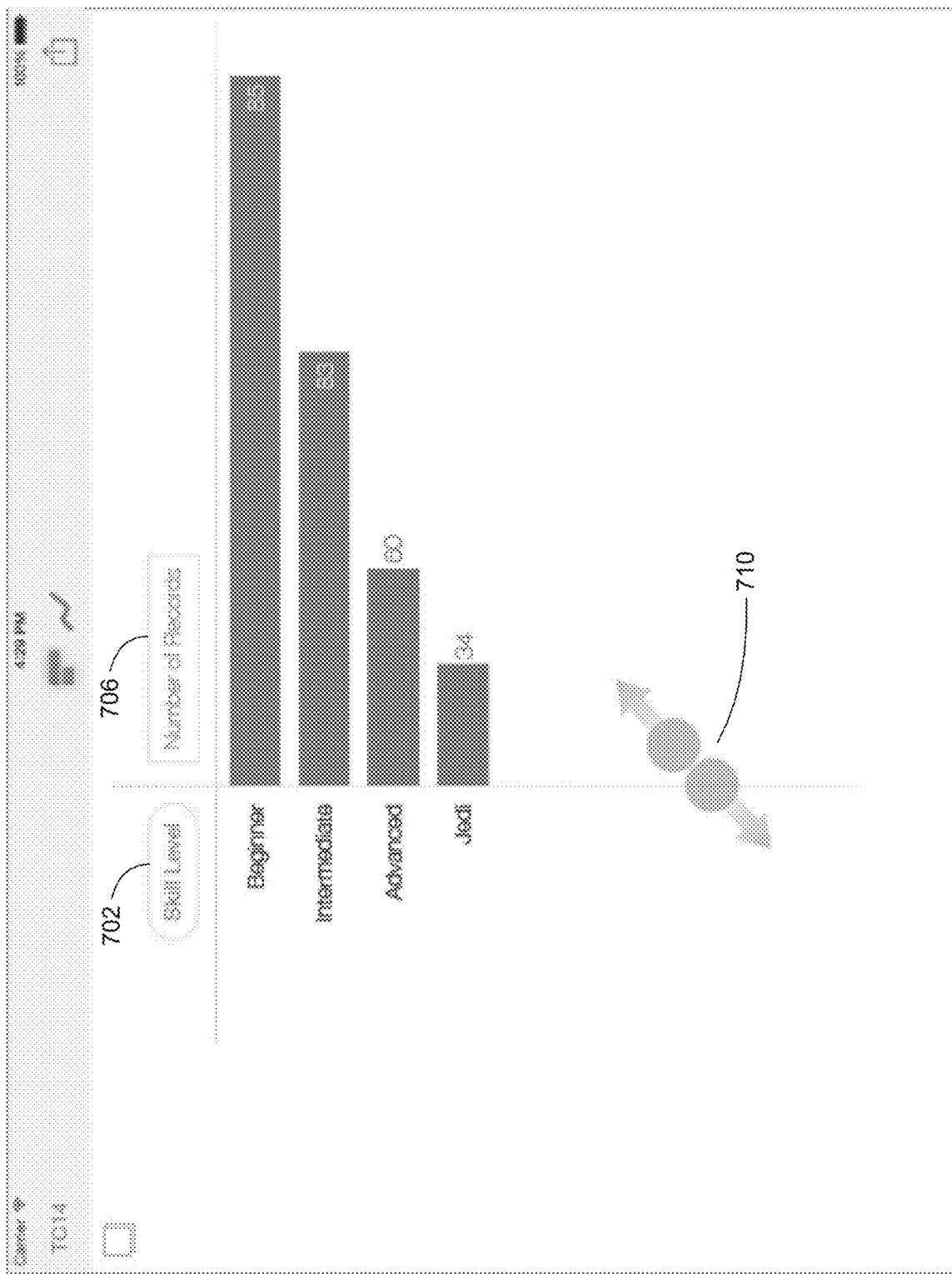
FIGS. 7A-7N illustrate a process of adding an additional dimension to a data visualization based on an interaction gesture with an existing data visualization, in accordance with some implementations.
Figure 7B:
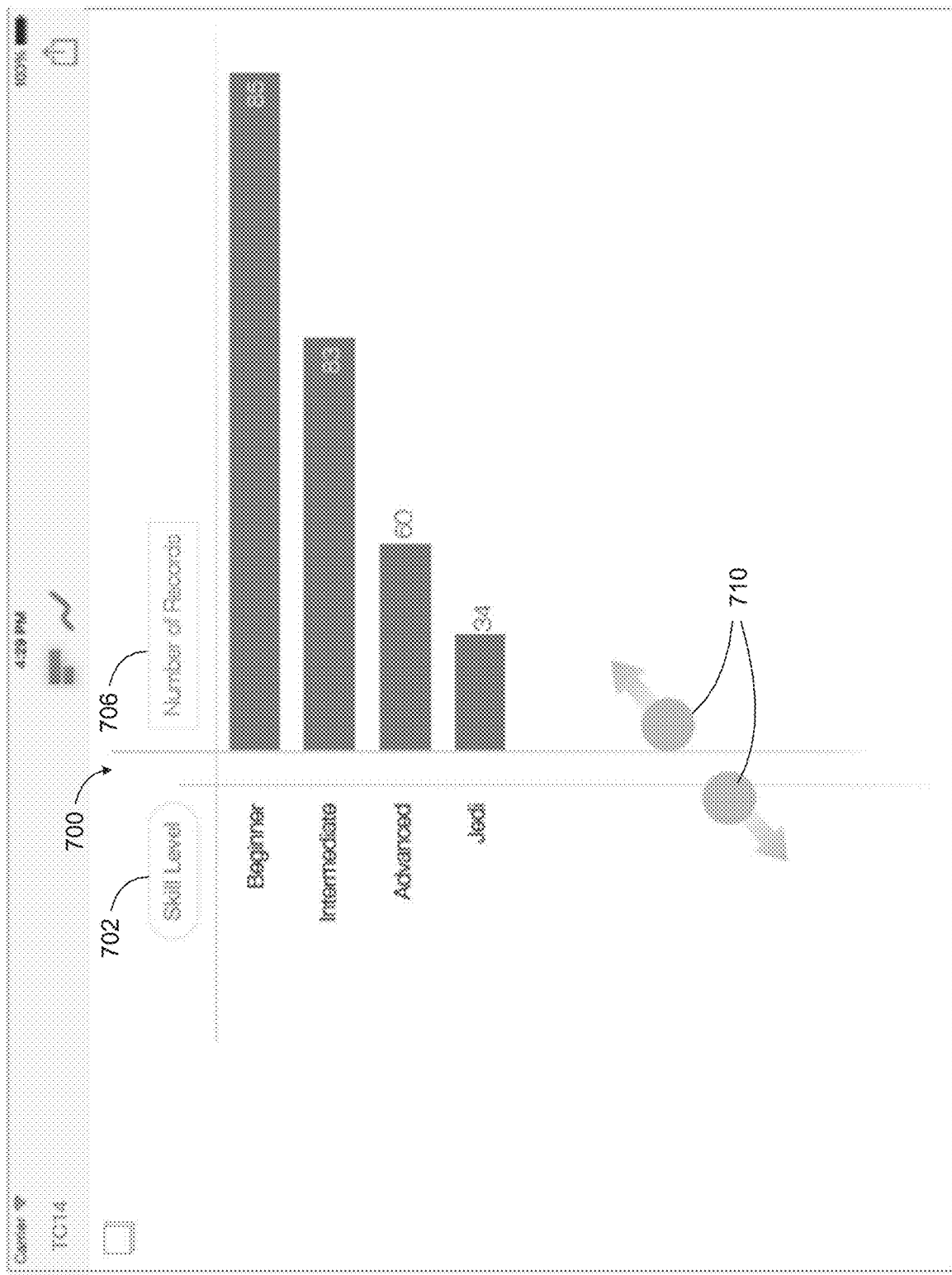
Figure 7C:
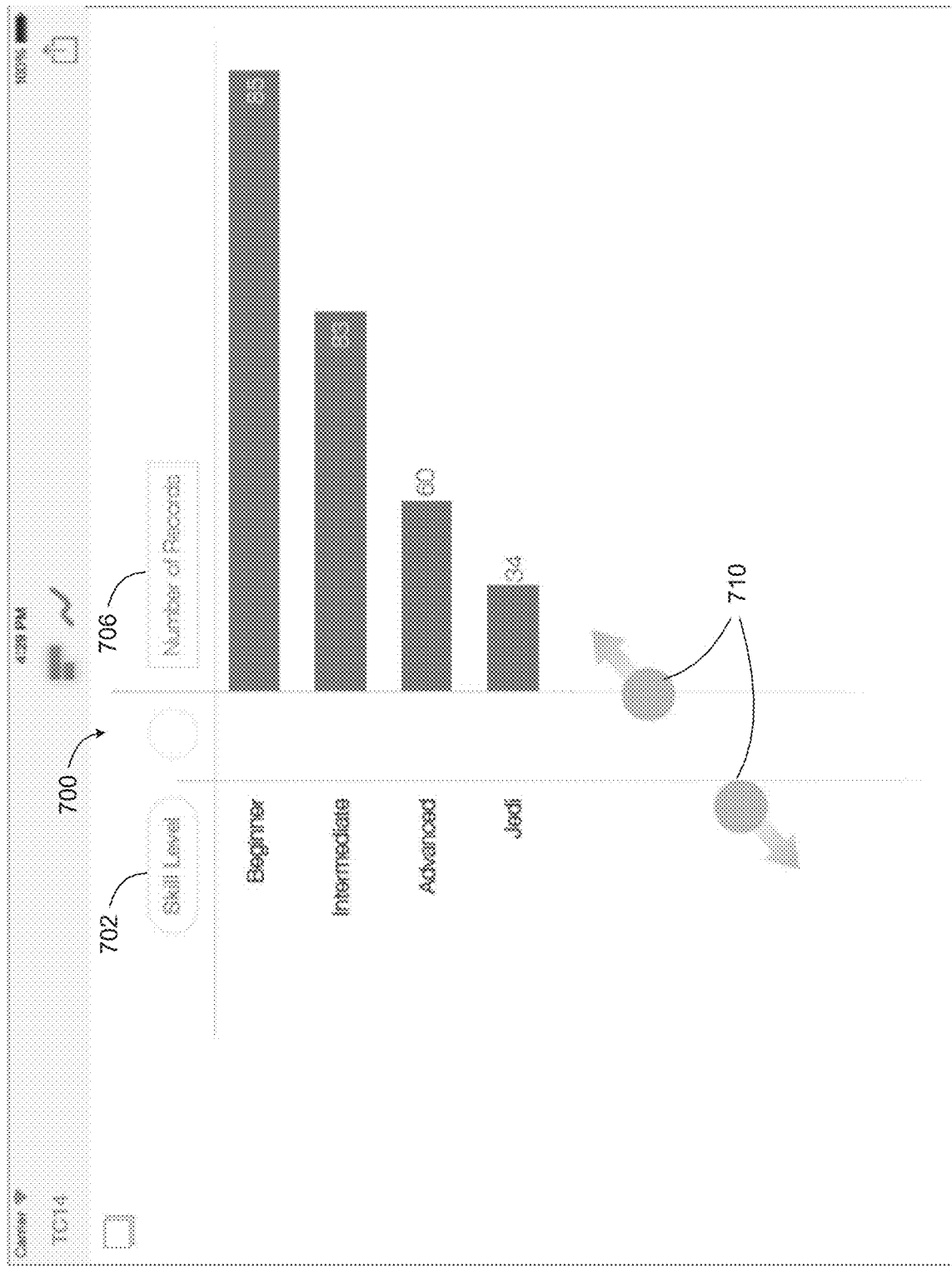
Figure 7D:
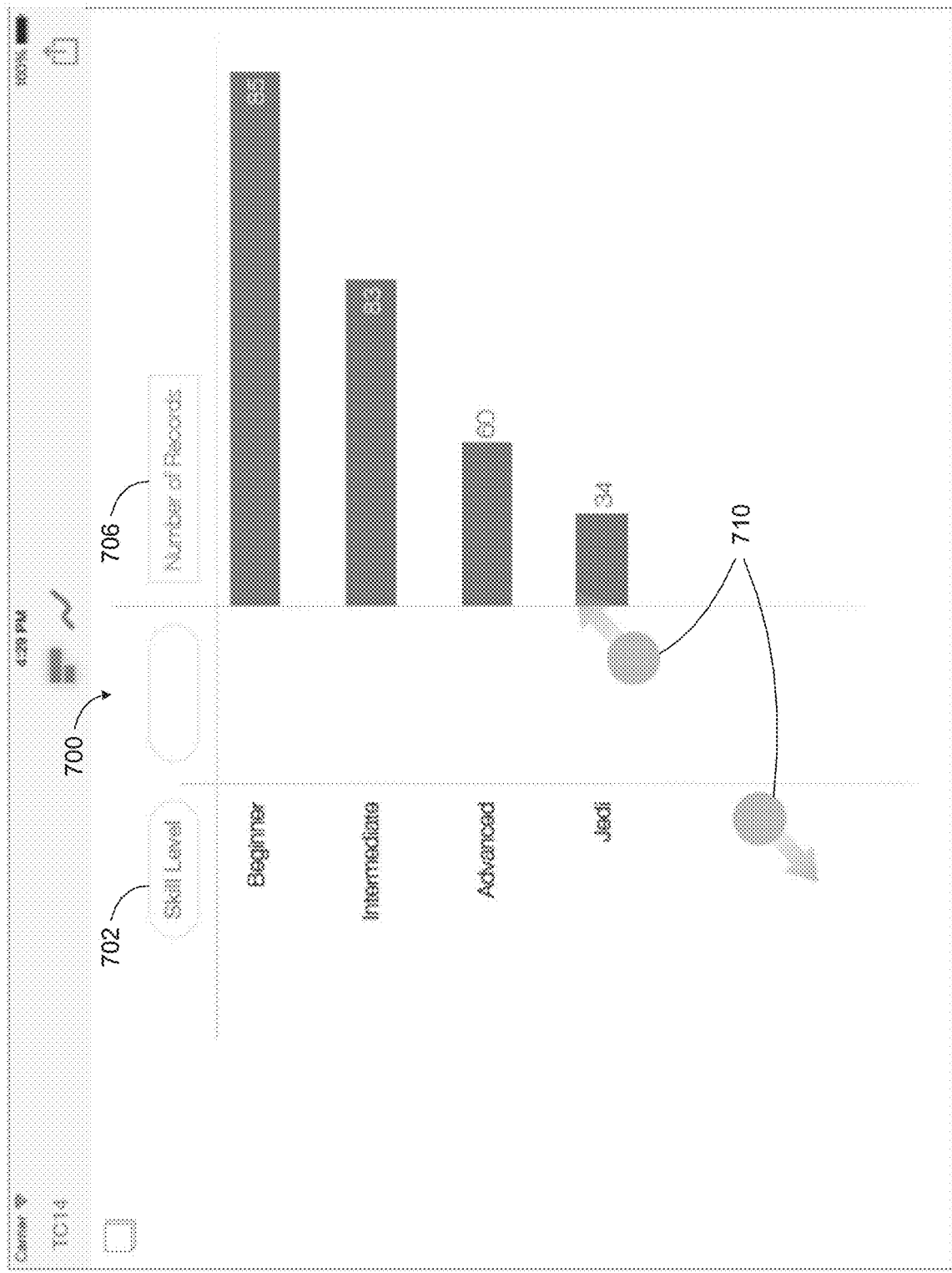
Figure 7E:
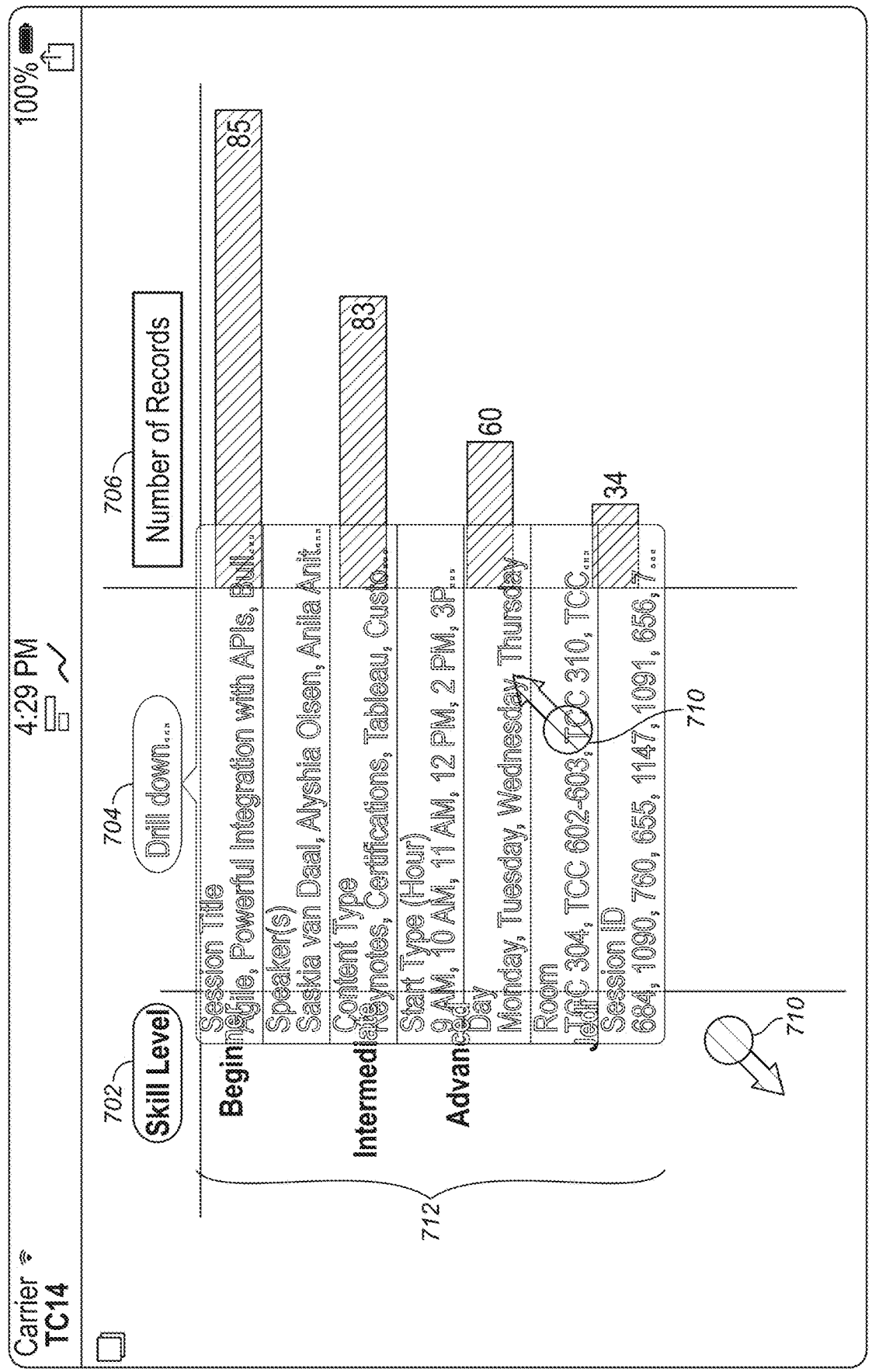
Figure 7F:
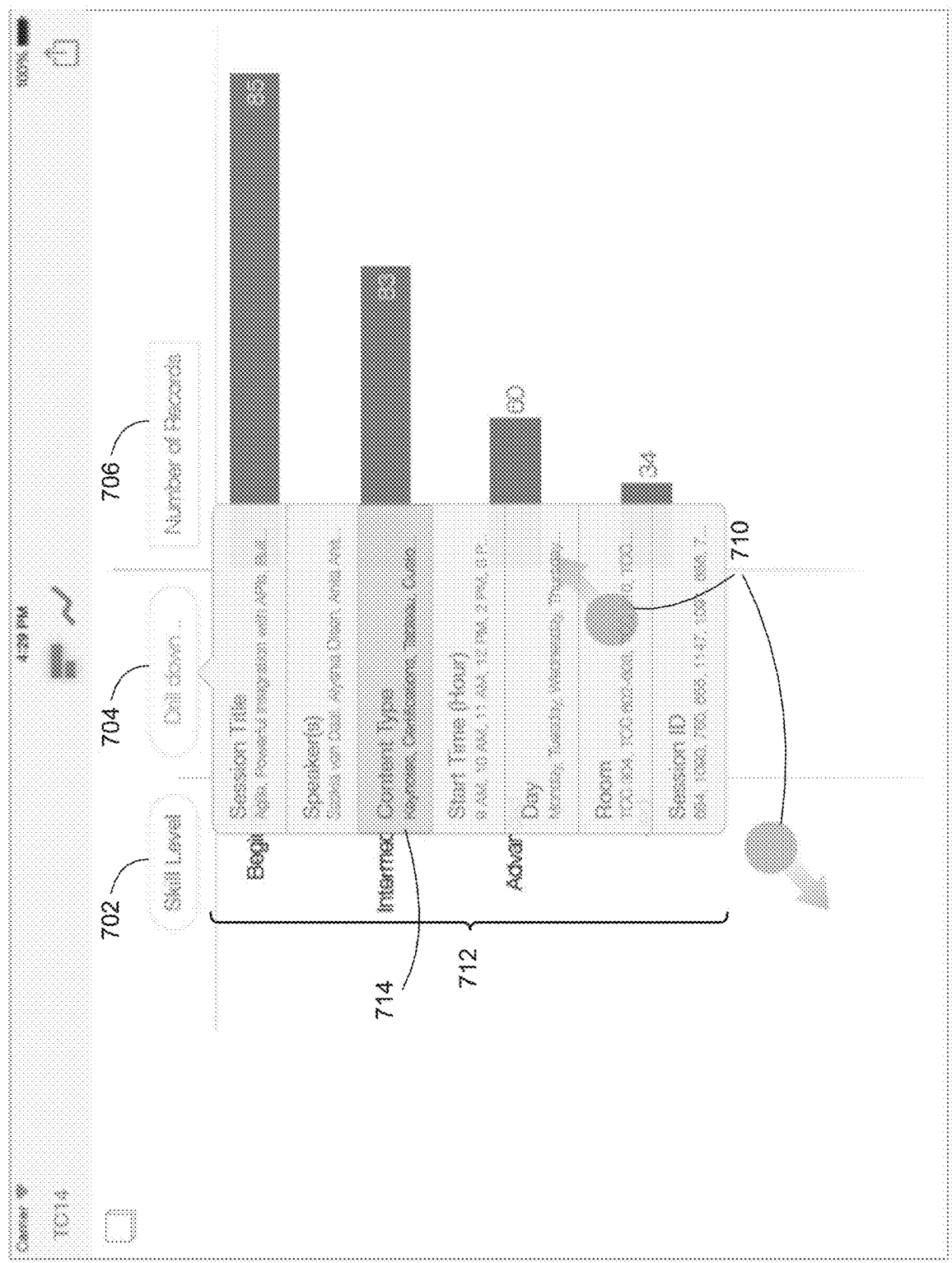
Figure 7G:
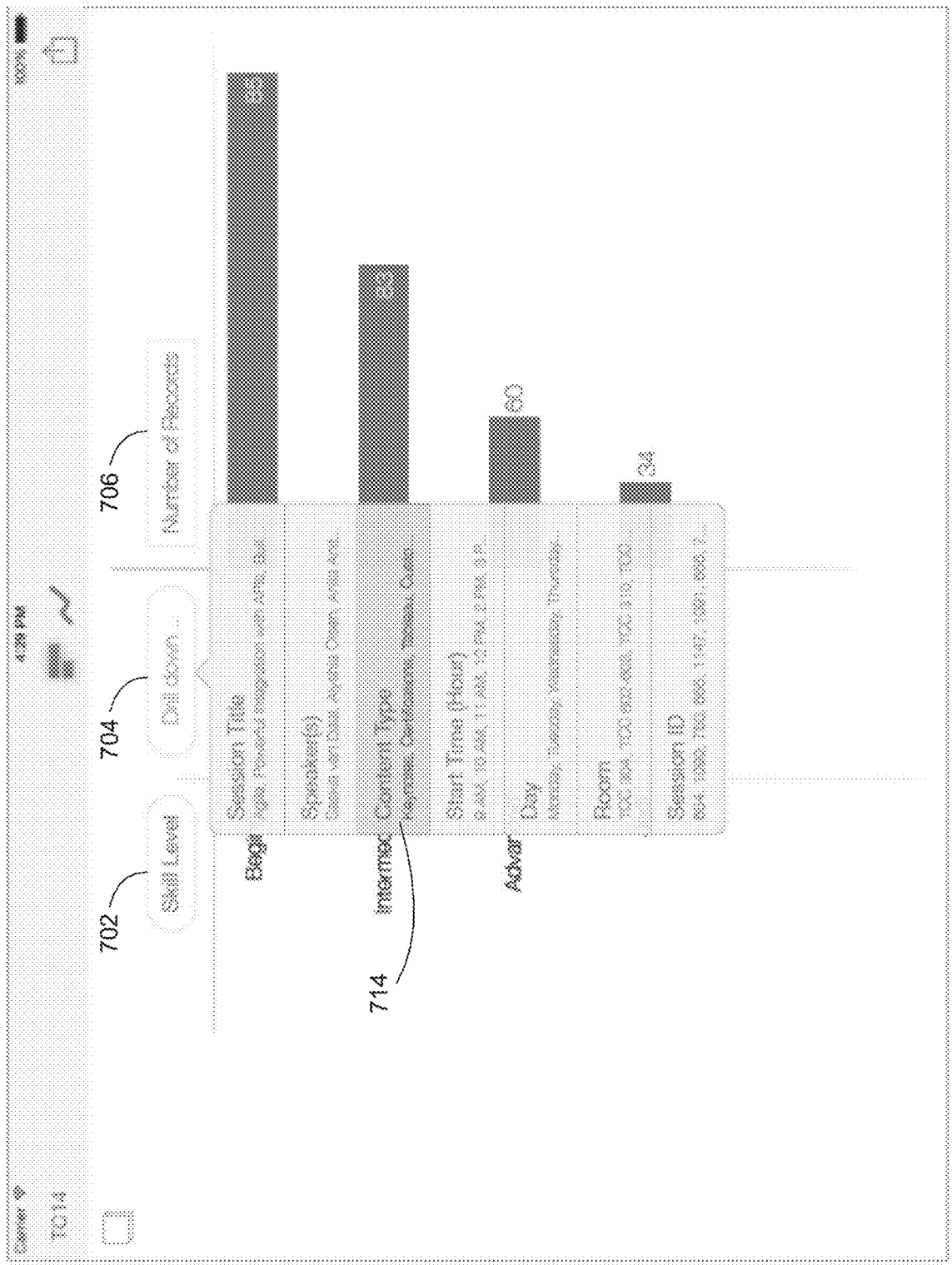
Figure 7H:
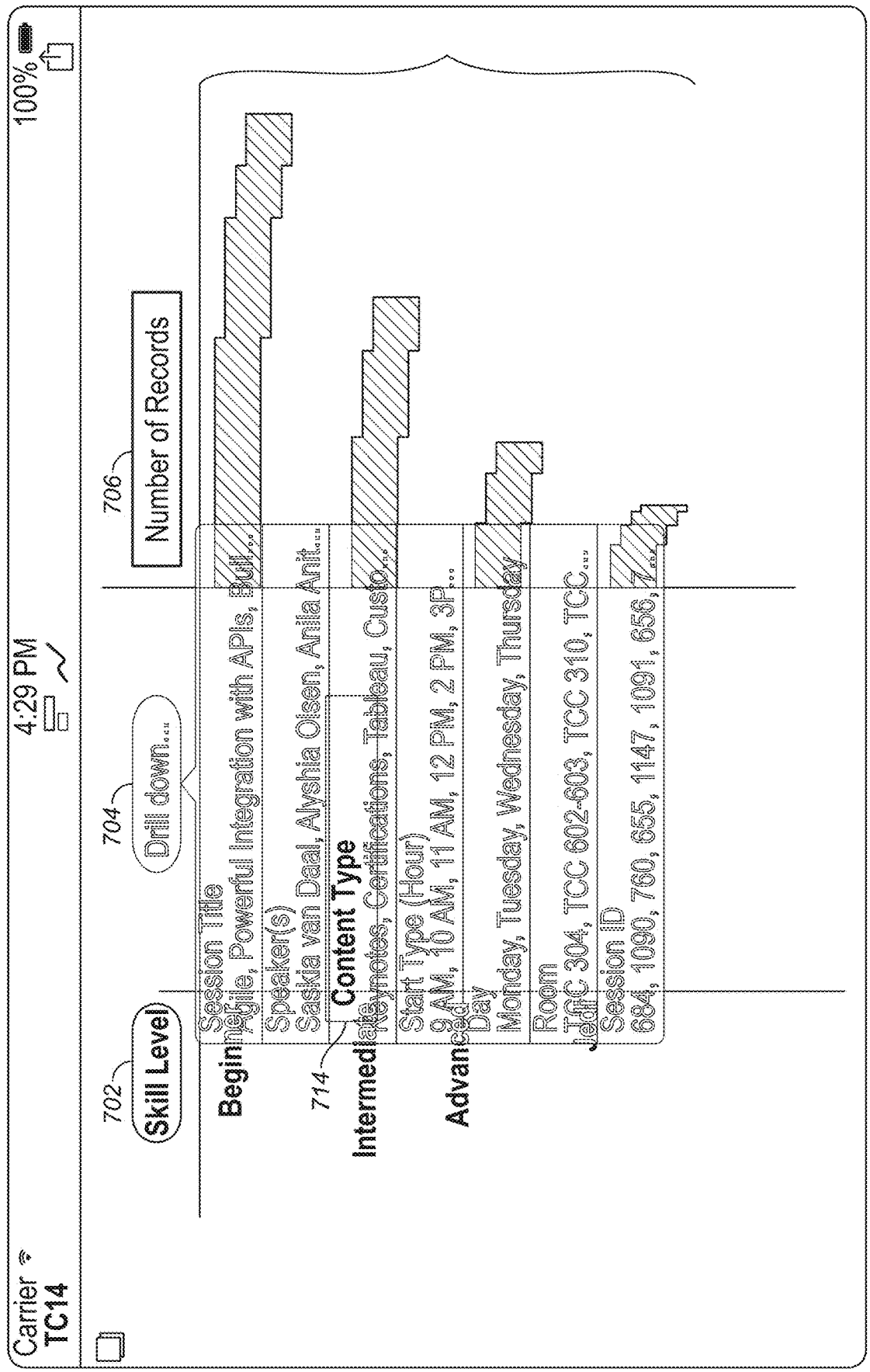
Figure 7I:
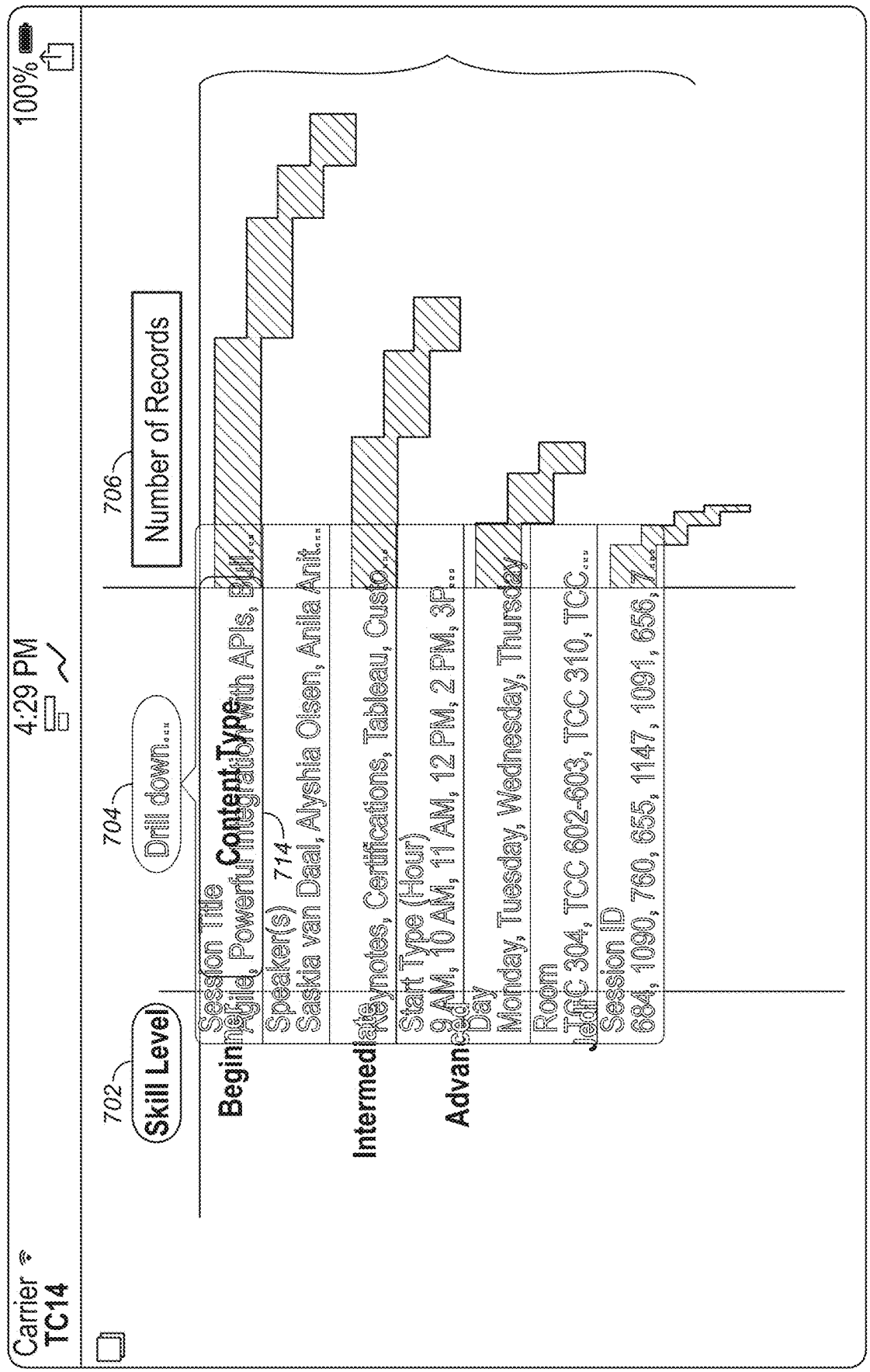
Figure 7J:
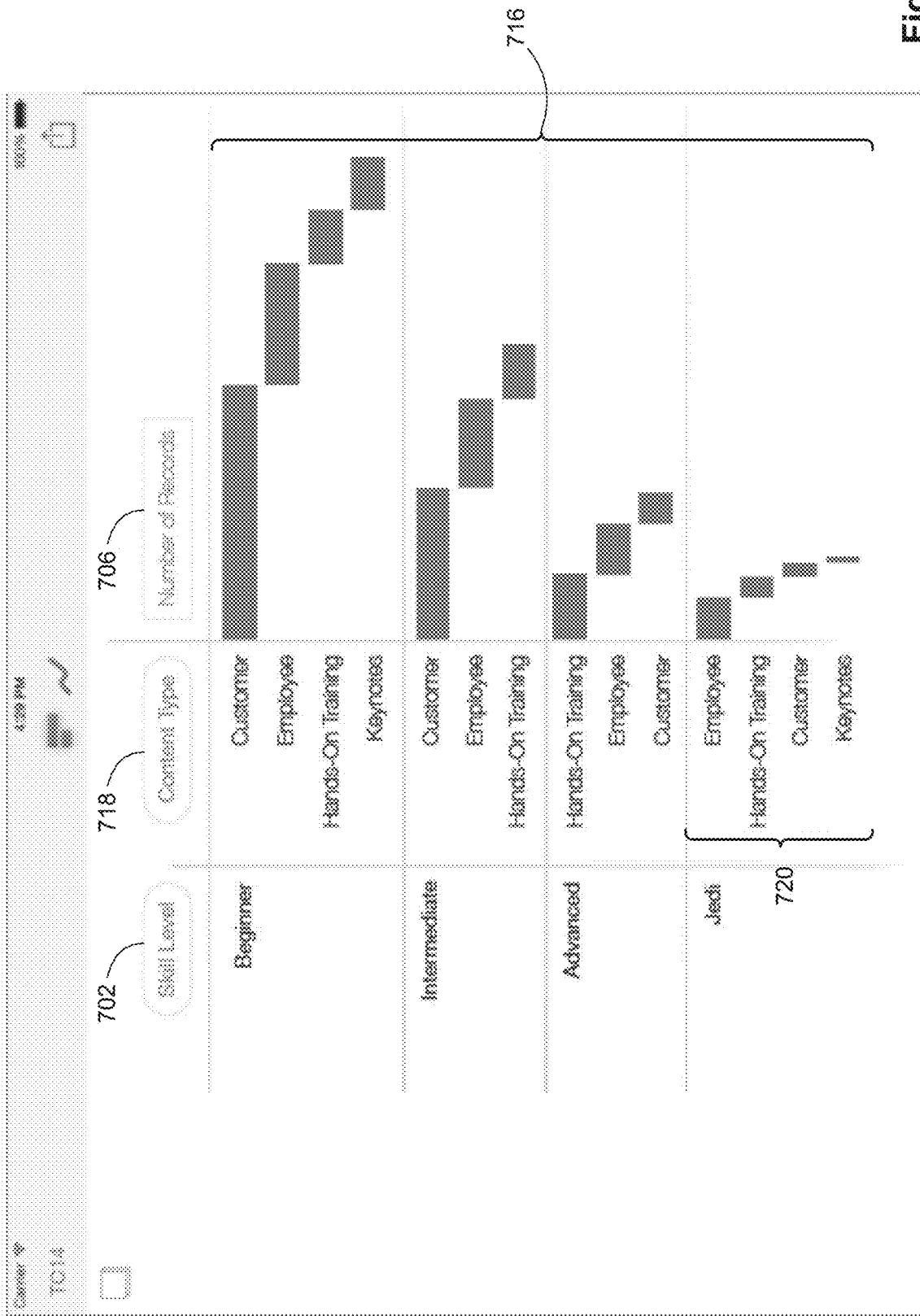
Figure 7K:
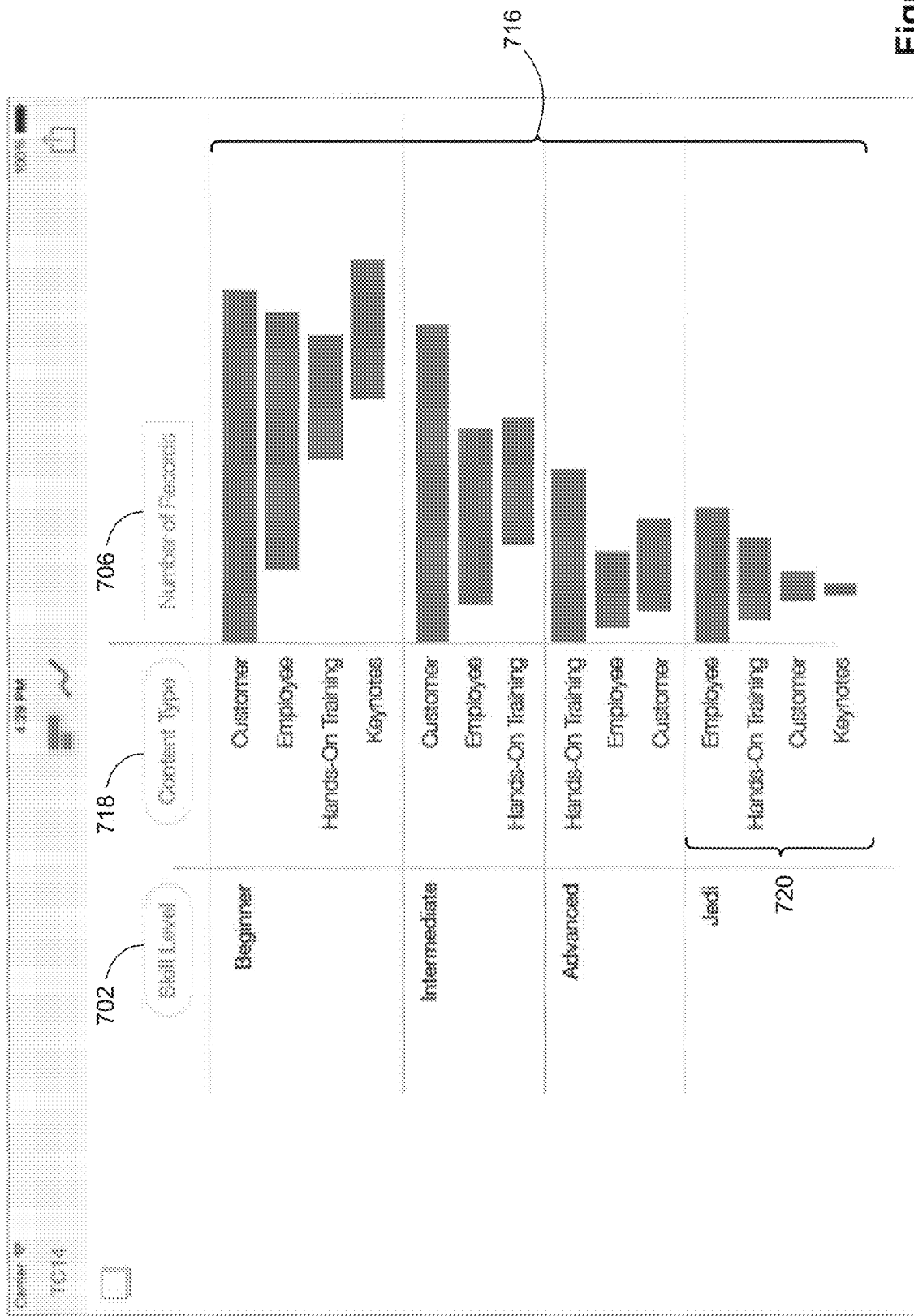
Figure 7L:
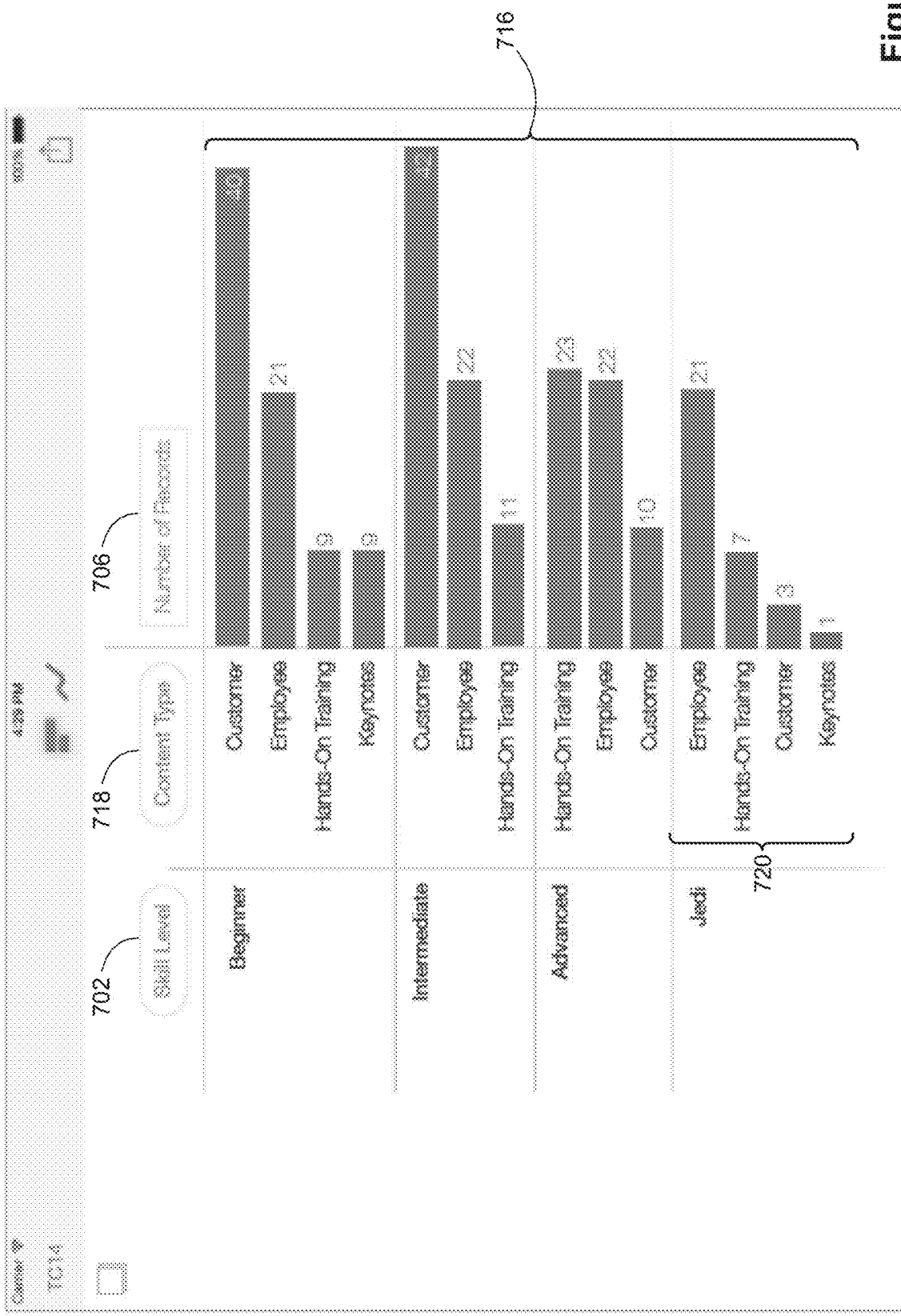
Figure 7M:
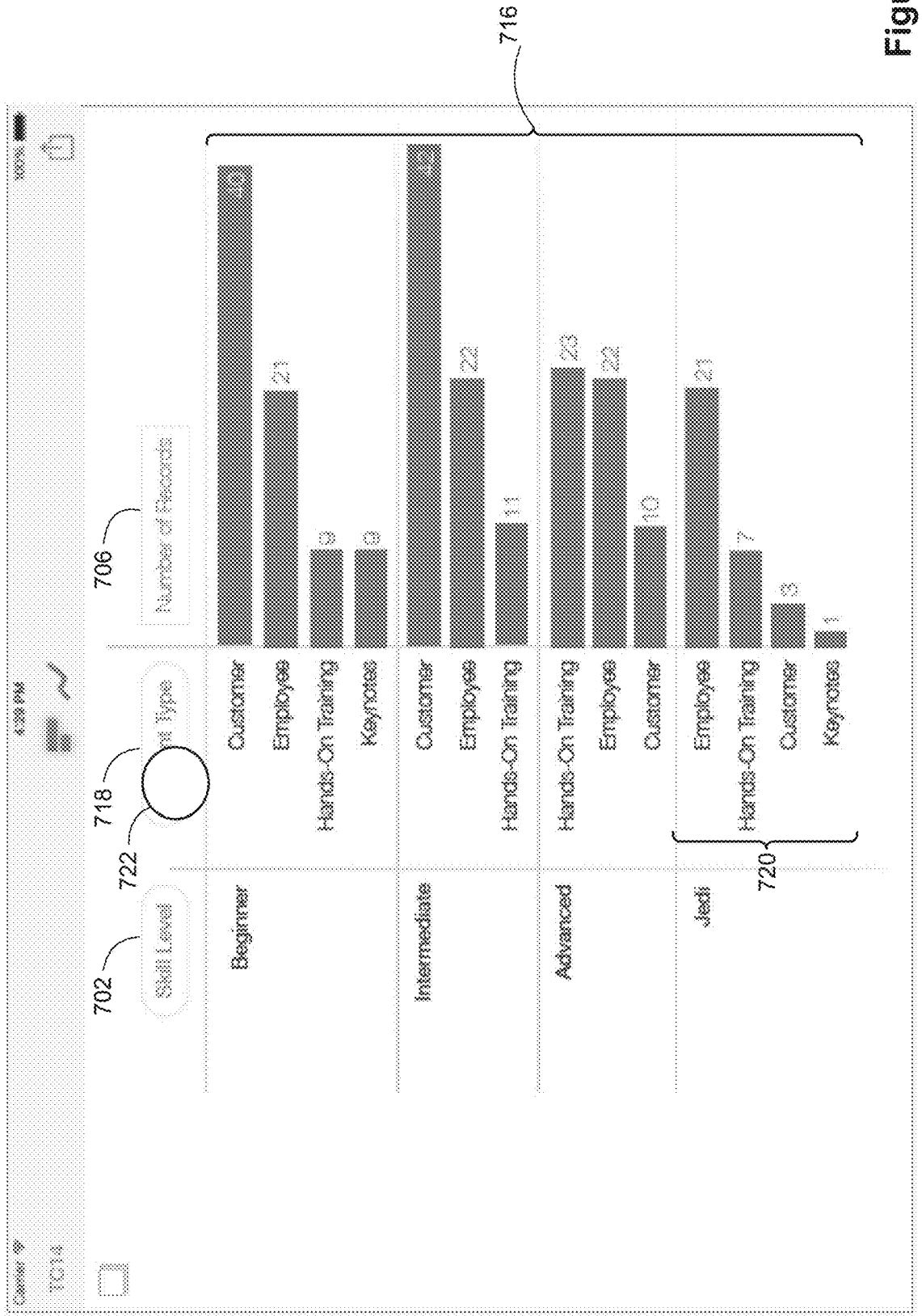
Figure 7N:
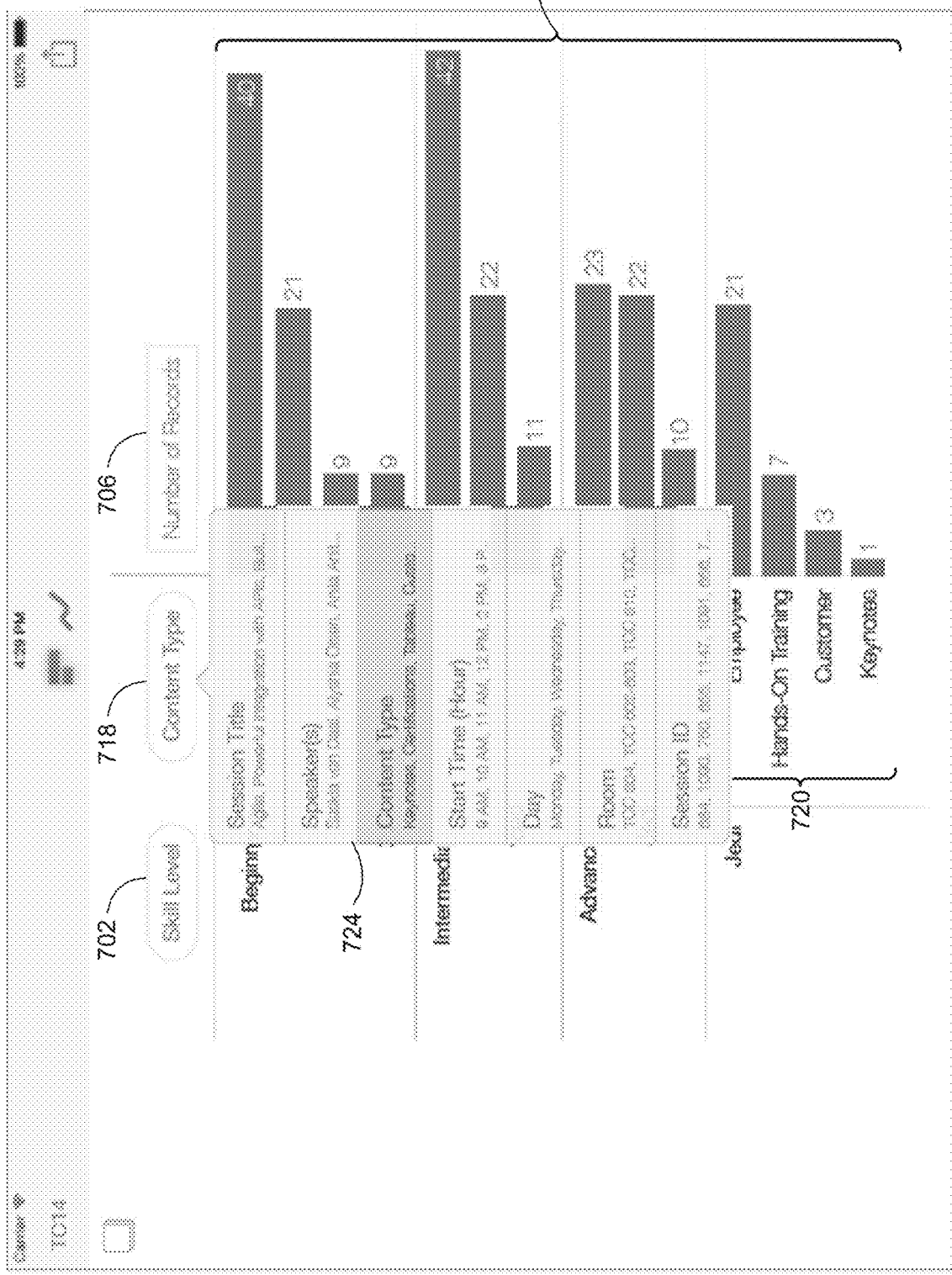

FIGS. 7A-7N illustrate a process of adding an additional dimension to a data visualization based on an interaction gesture with an existing data visualization, in accordance with some implementations. This sequence of illustrations uses the same data set illustrated previously in FIGS. 6A-6S. FIG. 7A provides a user interface showing a bar chart data visualization in which each bar represents the number of records 706 corresponding to each skill level 702. The user initiates an user interface gesture with two contact points 710 moving apart. In some implementations this is referred to as an "unpinch." FIGS. 7B-7D illustrate that as the contact points 710 move apart, a new column 700 opens up. In some implementations, when the new column 700 created in this way is to the left of the visual marks (e.g., to the left of the bars in the bar chart), the data visualization application 422 identifies the dimensions in the data set and displays the possible dimensions 712 in an initially dimmed display, as illustrated in FIG. 7E. At the top of the new column 700, some implementations temporarily display the label "Drill Down" 704, indicating that the user action is triggering a drill down into the data set.

One of the possible dimensions 712 is selected and highlighted, as illustrated by the "Content Type" dimension 714 in FIG. 7F. In some implementations, the selection is based on previous selection by the user or a group of user, or other heuristics. In some implementations, the selection is random or pseudo random. In some implementations, the selection is based on an alphabetical listing of the field names. In some implementations, the user can select the dimension from the displayed list. FIG. 7G indicates that the contact points 710 have been released.

FIG. 7H indicates that the "Content Type" dimension 714 will be used for the drill down, and an animation begins to move this field upward to form the column header. In addition, the bars from the bar chart being to split based on this additional dimension, as illustrated in the data visualization region 716 of FIG. 7H. For example, the first bar for beginner sessions is split into four separate bars based on the content type. FIG. 7I continues to illustrate this transition, with the Content Type dimension 714 continuing to move to the header, and the splitting of the bars continuing vertically. The former list 712 of dimensions fades out.

As FIG. 7J illustrates, when the split bars have moved enough vertically, the "content type" labels 720 for each bar are displayed in the new column 700. In addition, the "Content Type" label 718 is now displayed in the header of the new column 700. FIGS. 7K and 7L illustrate the continued animation of the bars in the data visualization region 716. In this case, the bars move horizontally to the left so that they will be in a typical position for a bar chart with two dimension levels ("skill level" 702 and "content type" 718). The smooth animation assists the user in understanding the data, including the splitting of individual bars in one data visualization to multiple sub-bars in a second data visualization.

FIG. 7M illustrates a contact 722 being detected at a location over the dimension label for "Content Type" dimension 718. FIG. 7N shows a menu 724 of dimension options being displayed as a result of the contact 722 being detected. The menu 724 includes various dimension options that, if selected, will be displayed in place of the "Content Type" dimension 718. For example, if a contact is detected at a location over dimension option "Session ID" then, in response, content type dimension 718 will be replaced by the "Session ID" dimension. In accordance with some implementations, menu 724 in FIG. 7N displays the dimension label and a plurality of dimension categories for each dimension option.

In some implementations, the column header "content type" 718 can be switched to another dimension. In some implementations, this can be achieved by doing a horizontal scroll at a contact point on the content type header.

Figure 8A:
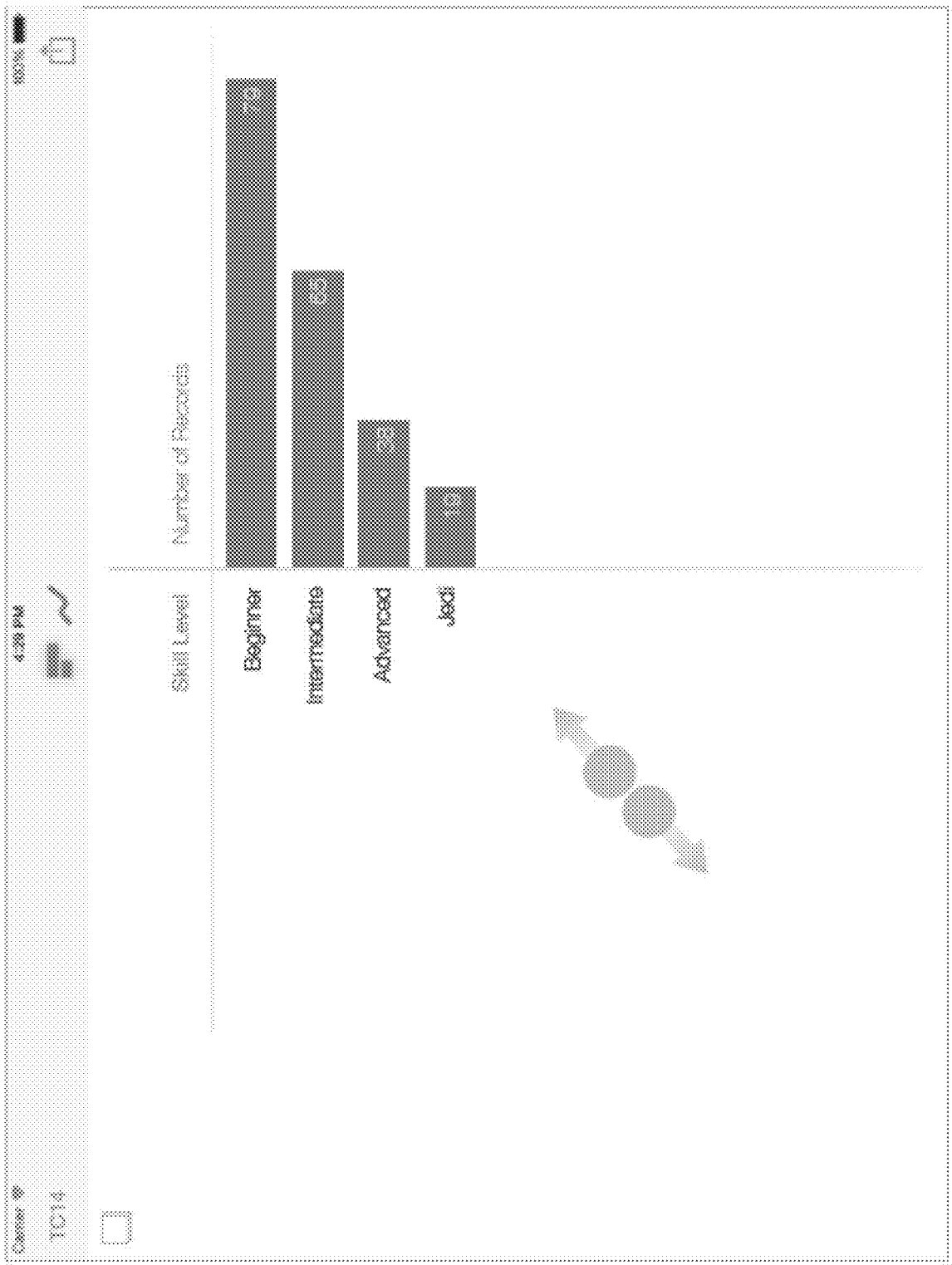
FIGS. 8A-8M illustrate an alternative animated transition when an additional dimension is added to an existing data visualization, in accordance with some implementations.
Figure 8B:
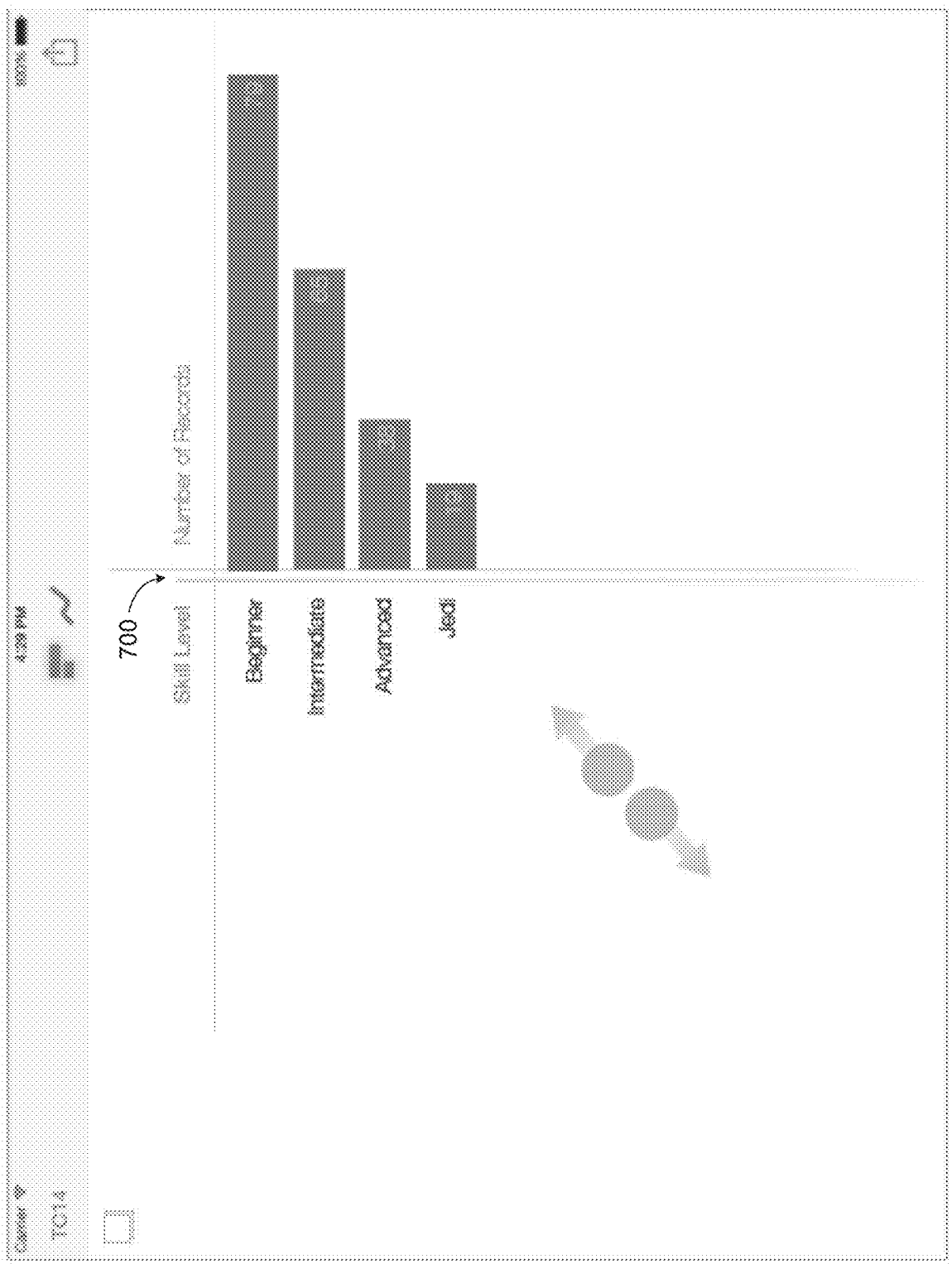
Figure 8C:
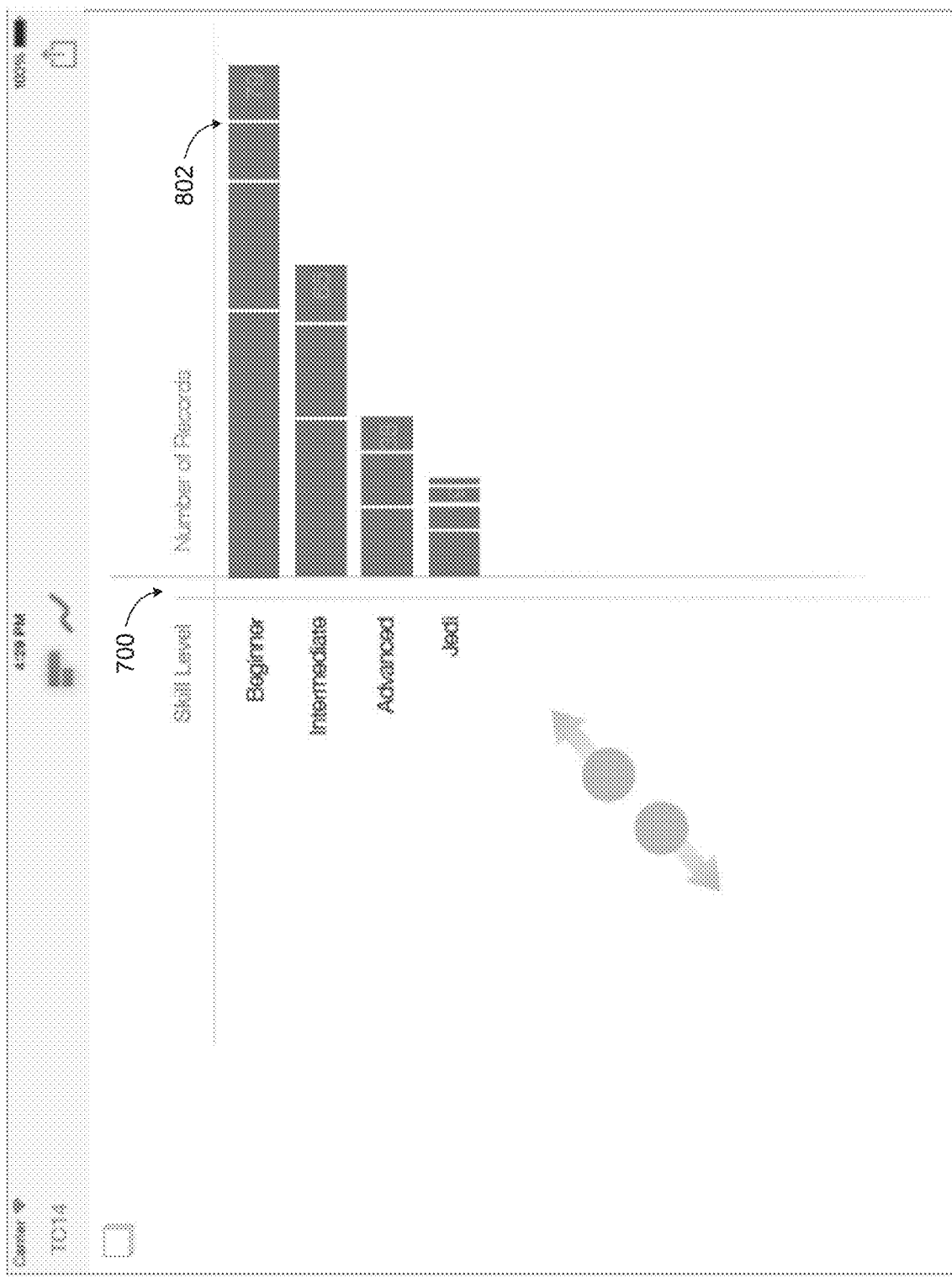
Figure 8D:
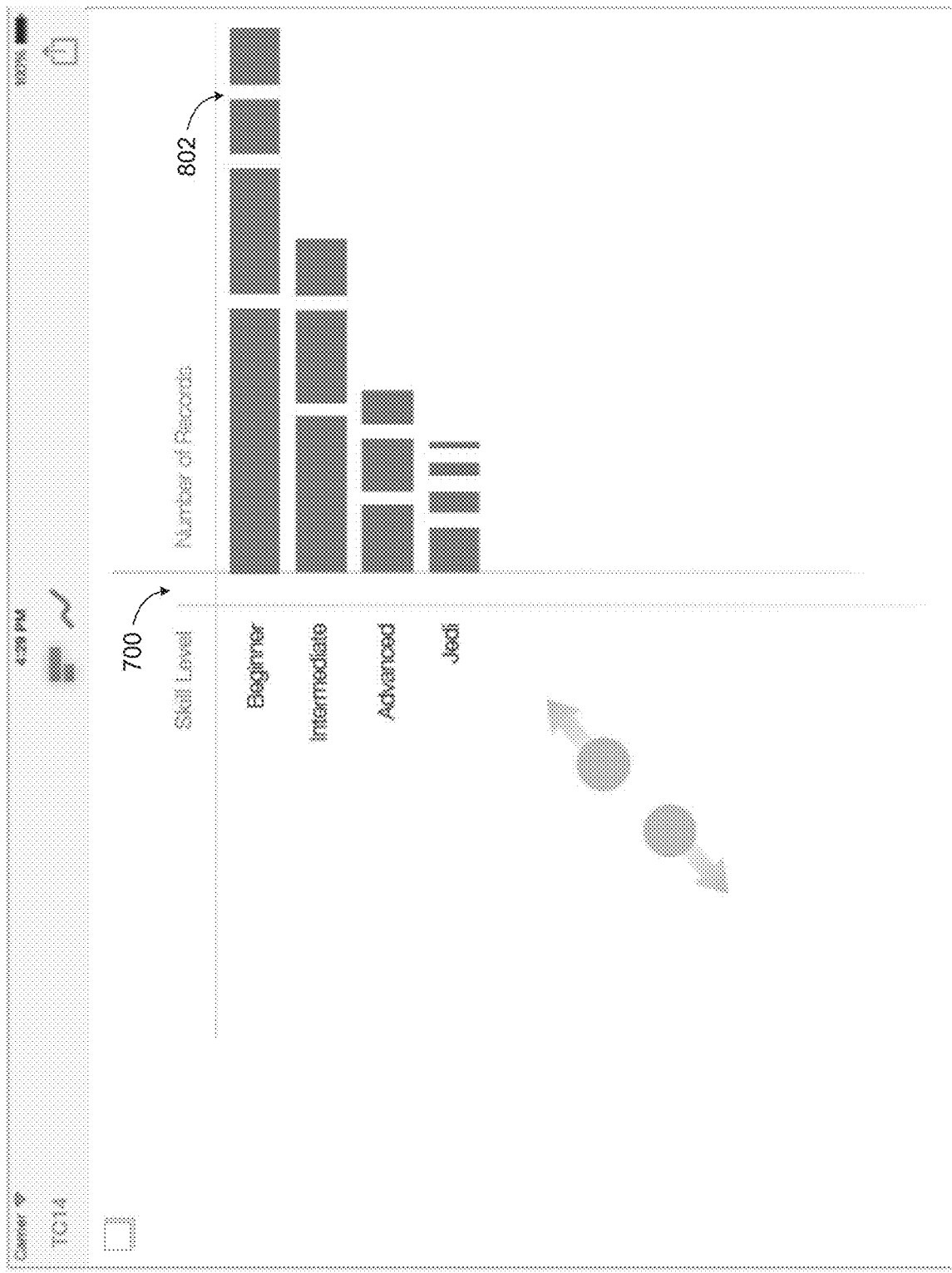
Figure 8E:
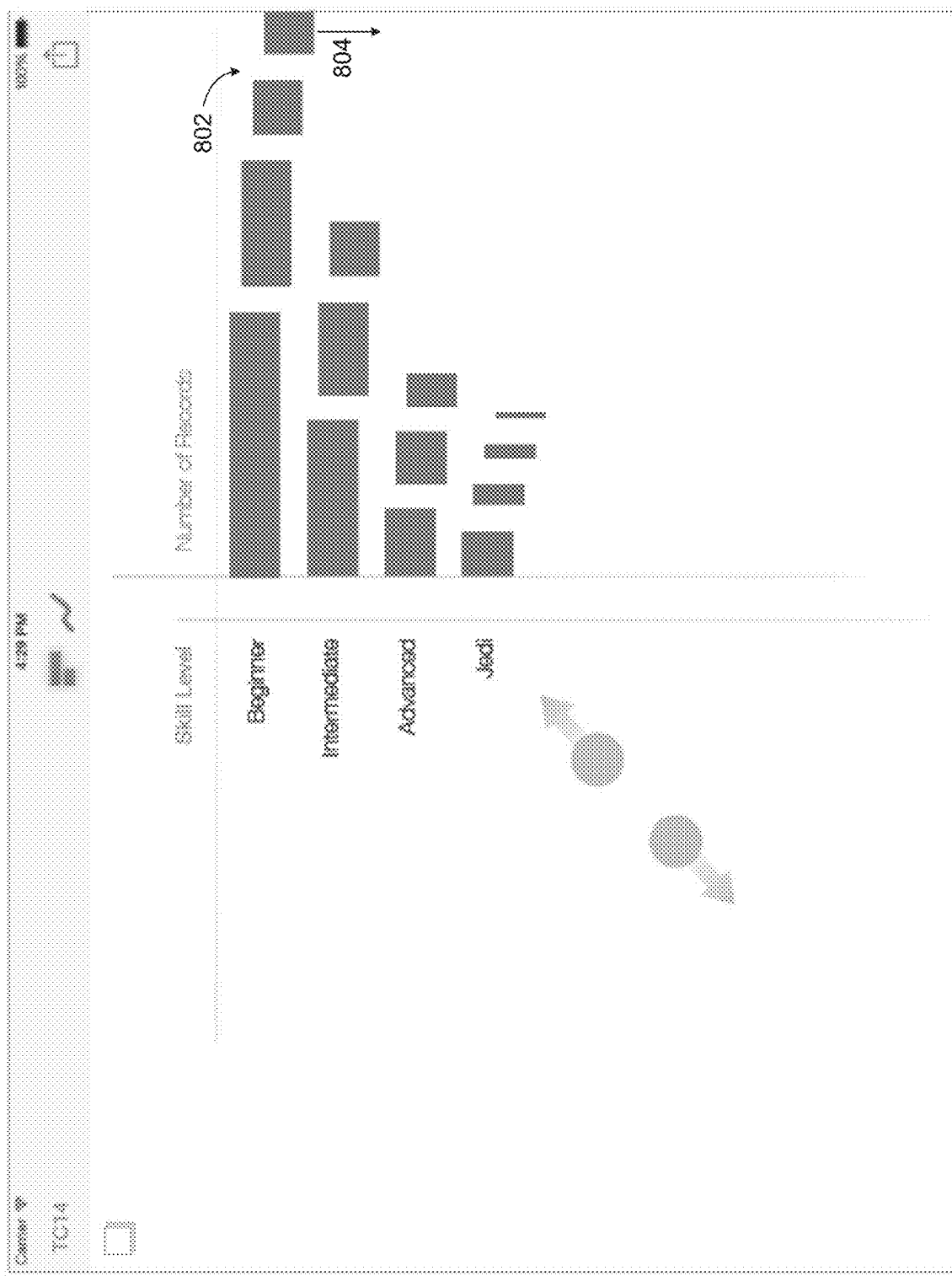

FIGS. 8A-8M illustrate an alternative animated transition when an additional dimension is added to an existing data visualization, in accordance with some implementations. As in the sequence of FIGS. 7A-7L, the process begins when a user moves two contact points away from each other in a region where dimensions are displayed (e.g., the dimension "Skill Level"). This opens up a new column 700 as before, but the horizontal bars initially split into distinct bars horizontally, leaving gaps, such as the gap 802 between the third and four splits of the top bar. As the contact points move further apart, the gaps grow wider, as illustrated by the gap 802 in FIG. 8D. At a certain point in the animation, the bars begin to move vertically downward 804 as well, as illustrated in FIG. 8E. In some implementations, the vertical motion occurs only after the horizontal splitting is done, but in other implementations, horizontal and vertical motion occur simultaneously.

Figure 8F:
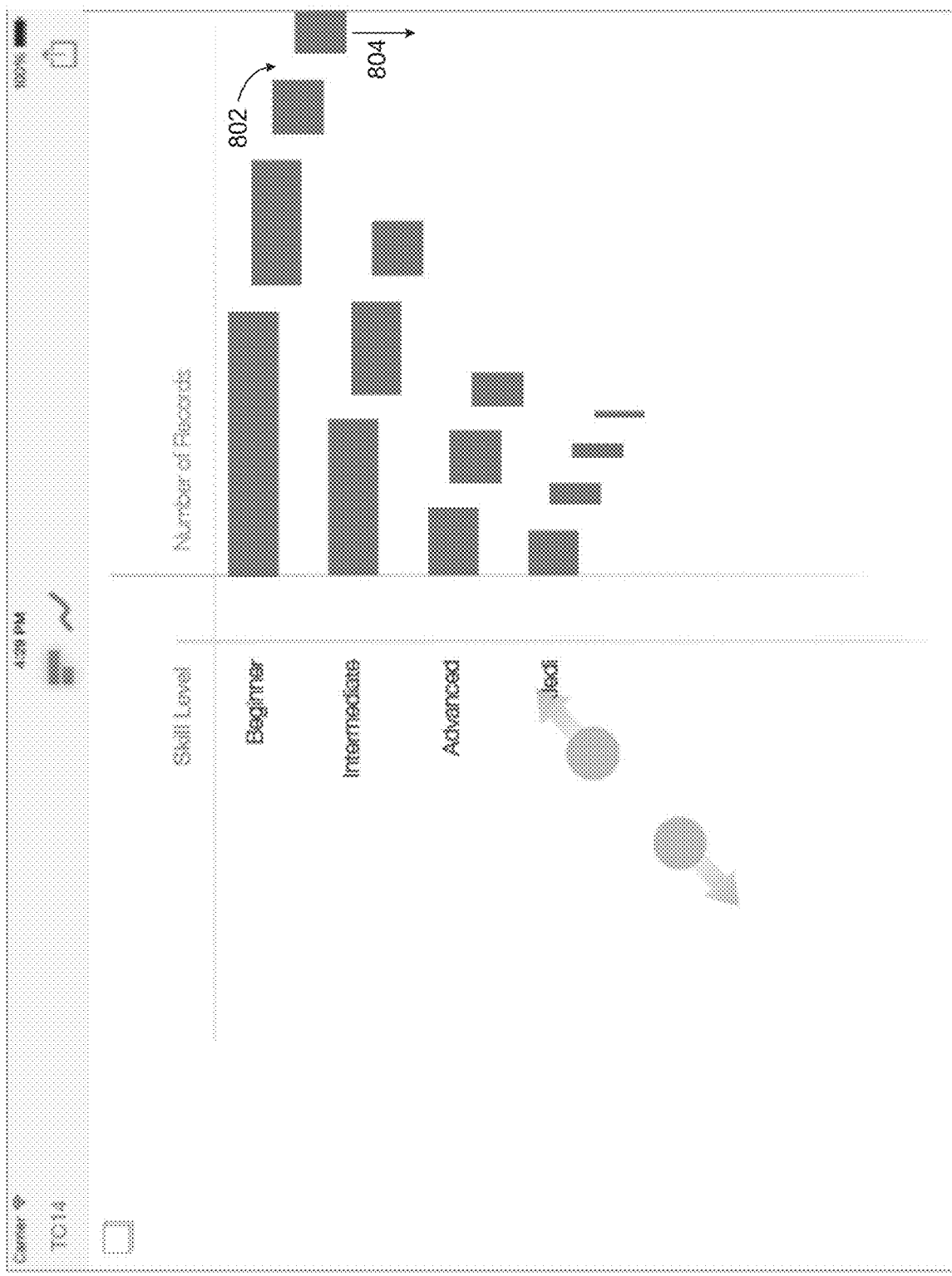
Figure 8G:
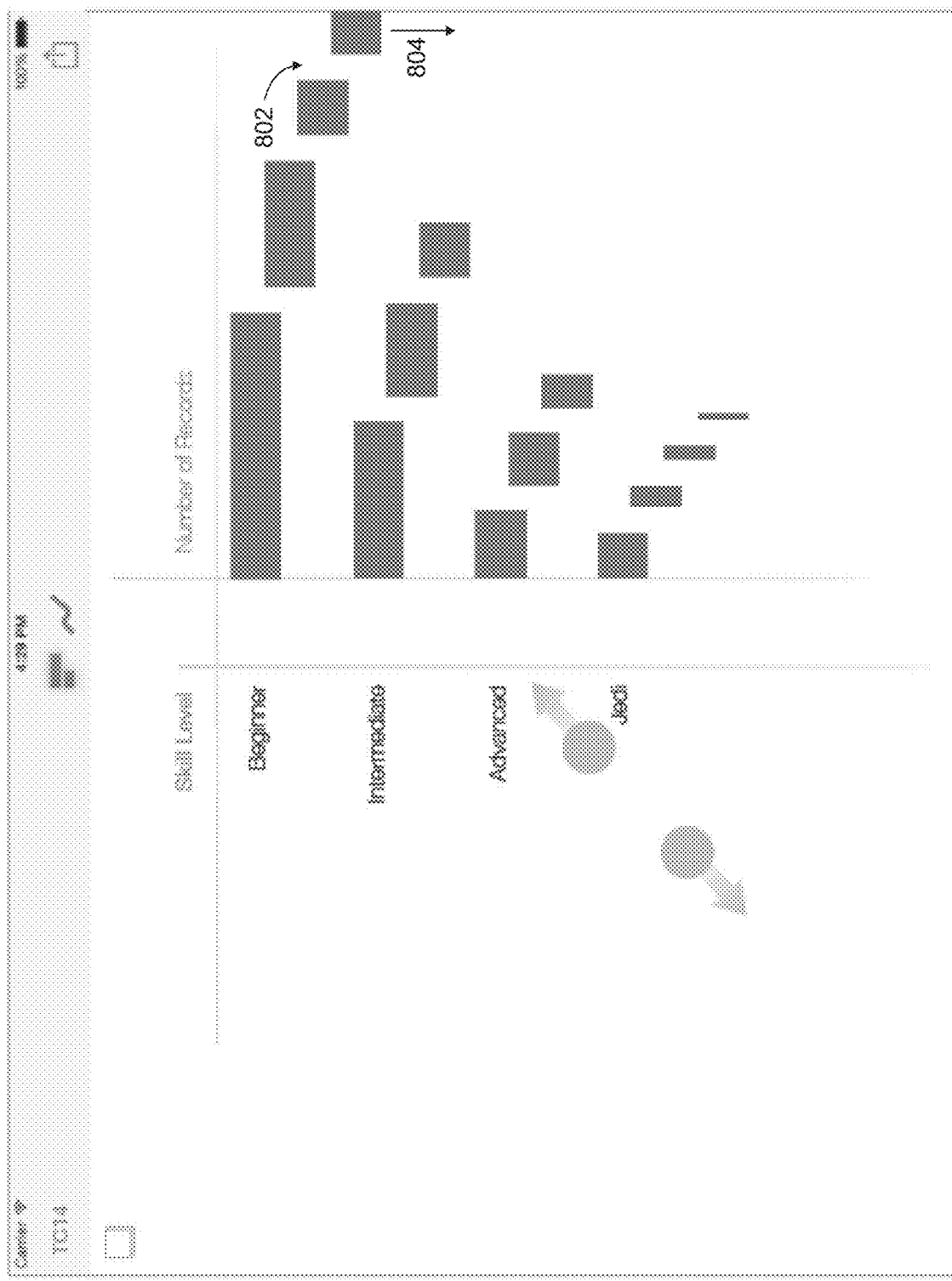
Figure 8H:
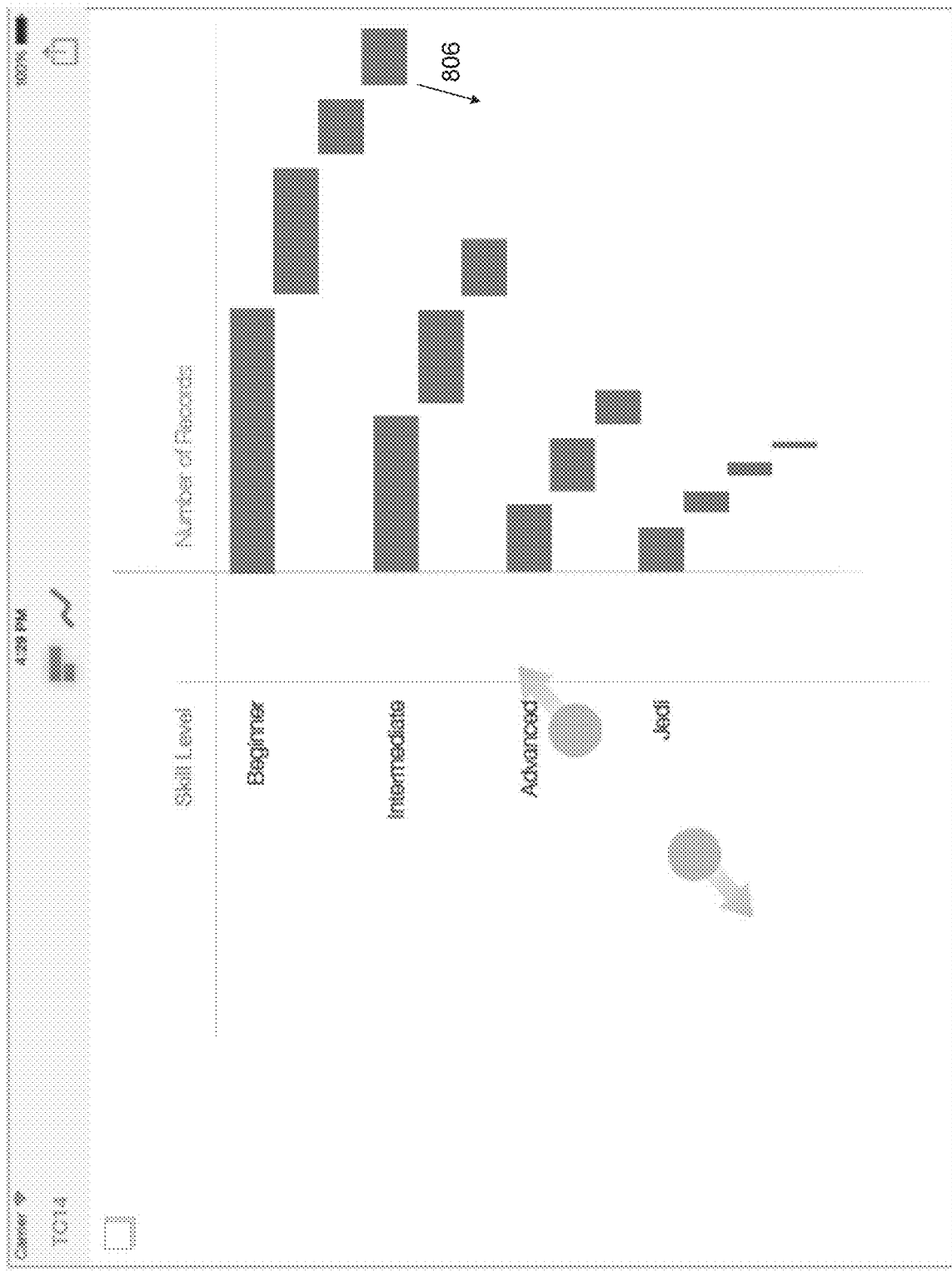
Figure 8I:
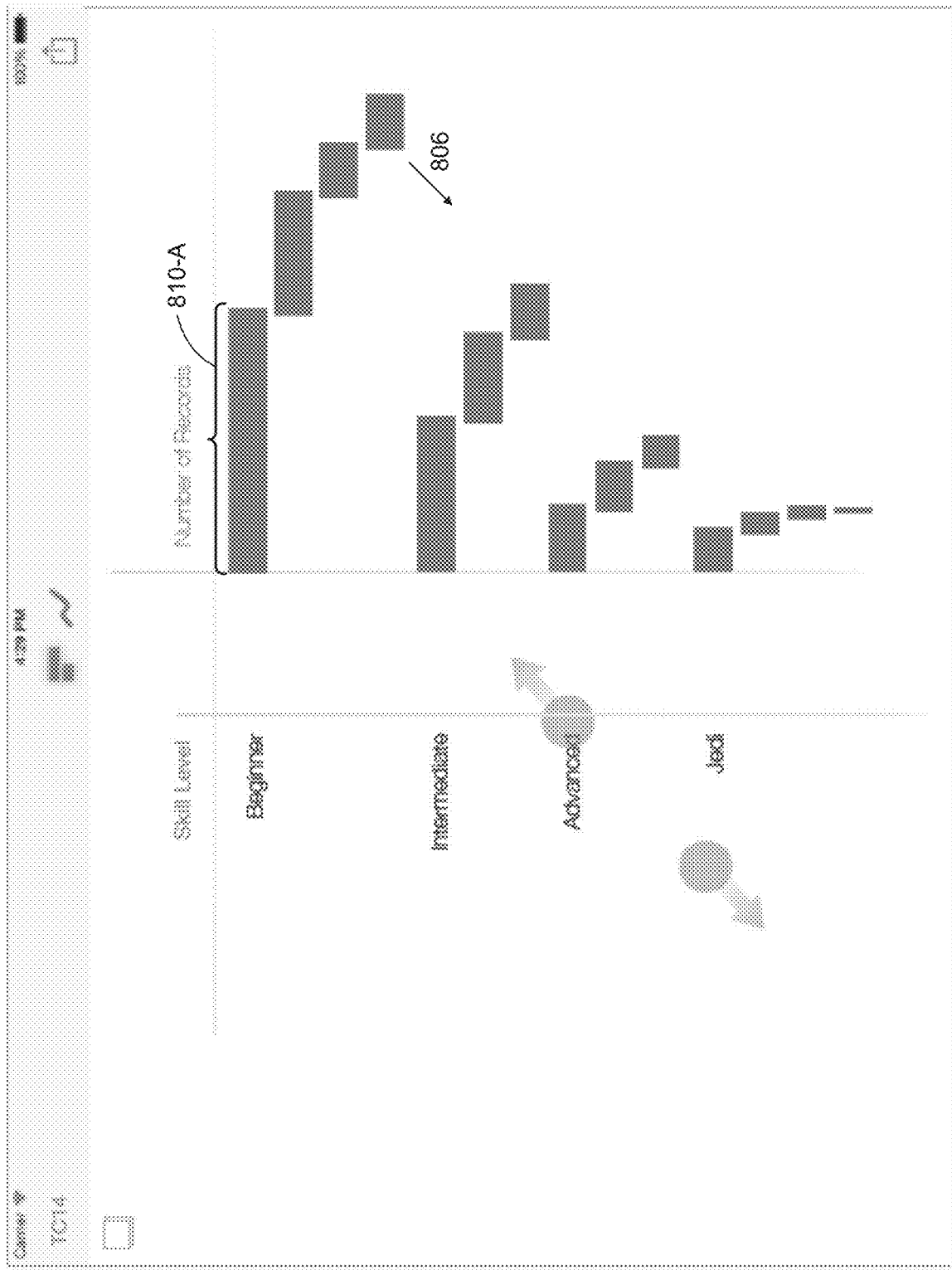
Figure 8J:
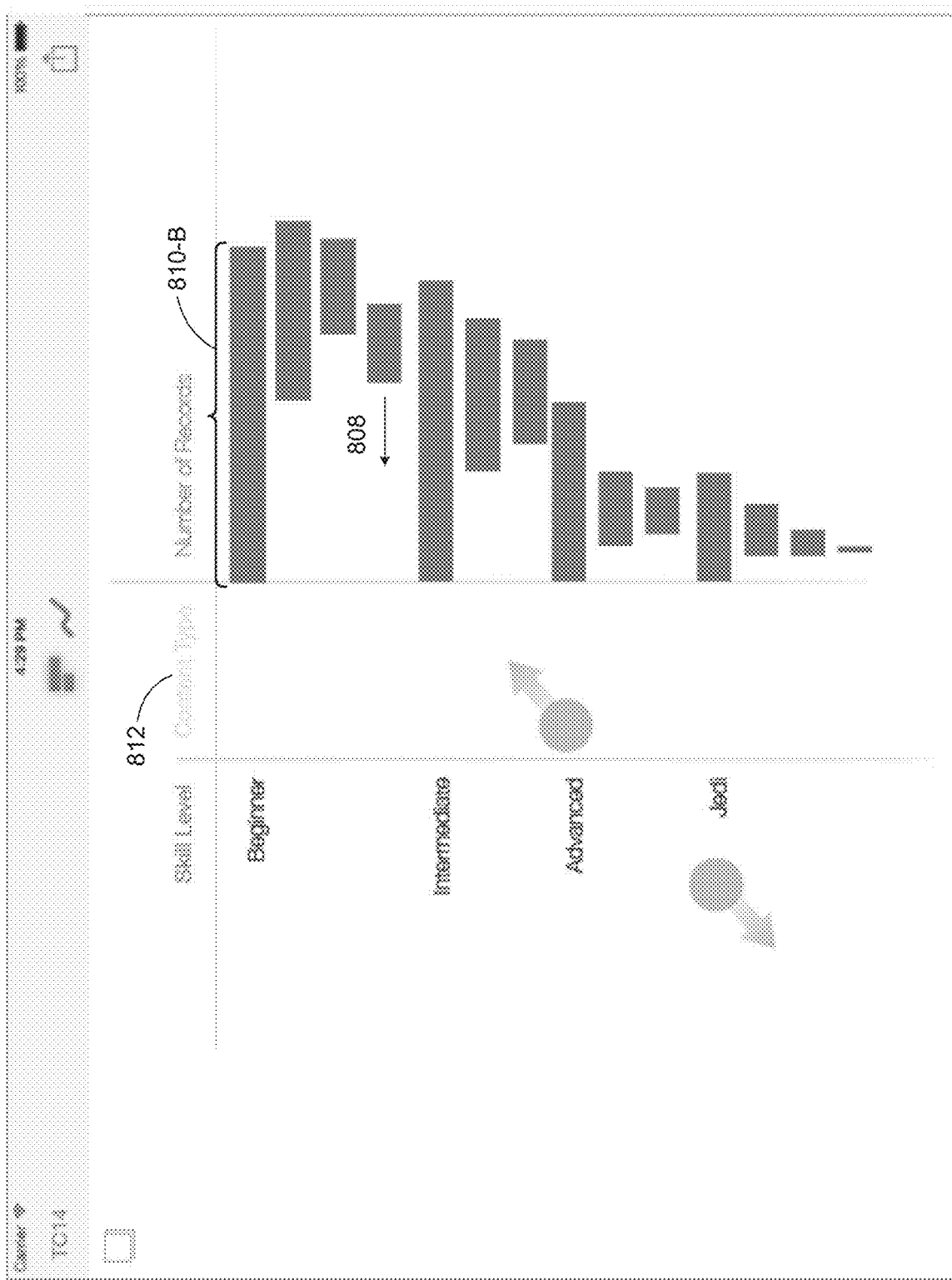
Figure 8K:
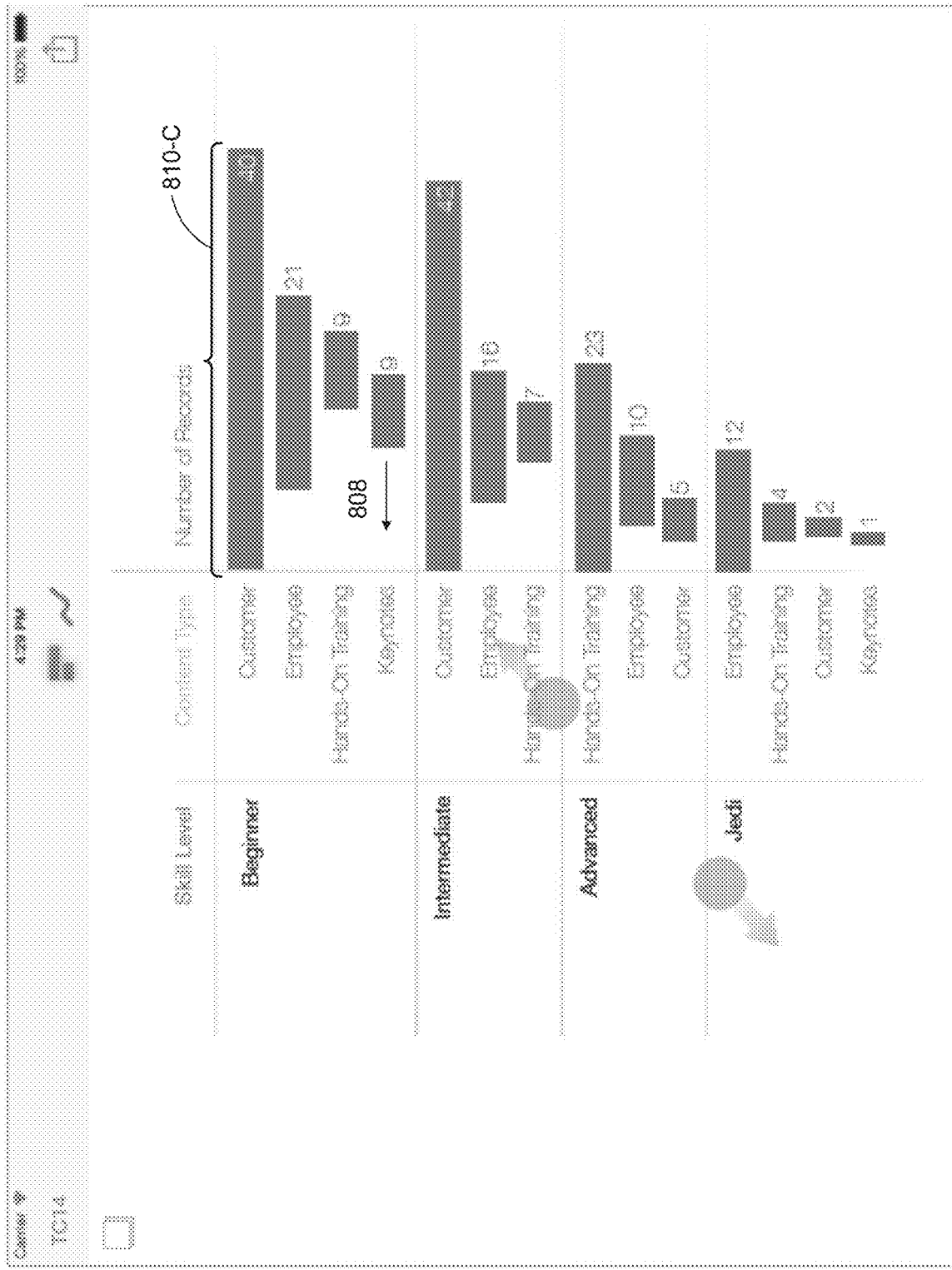
Figure 8L:
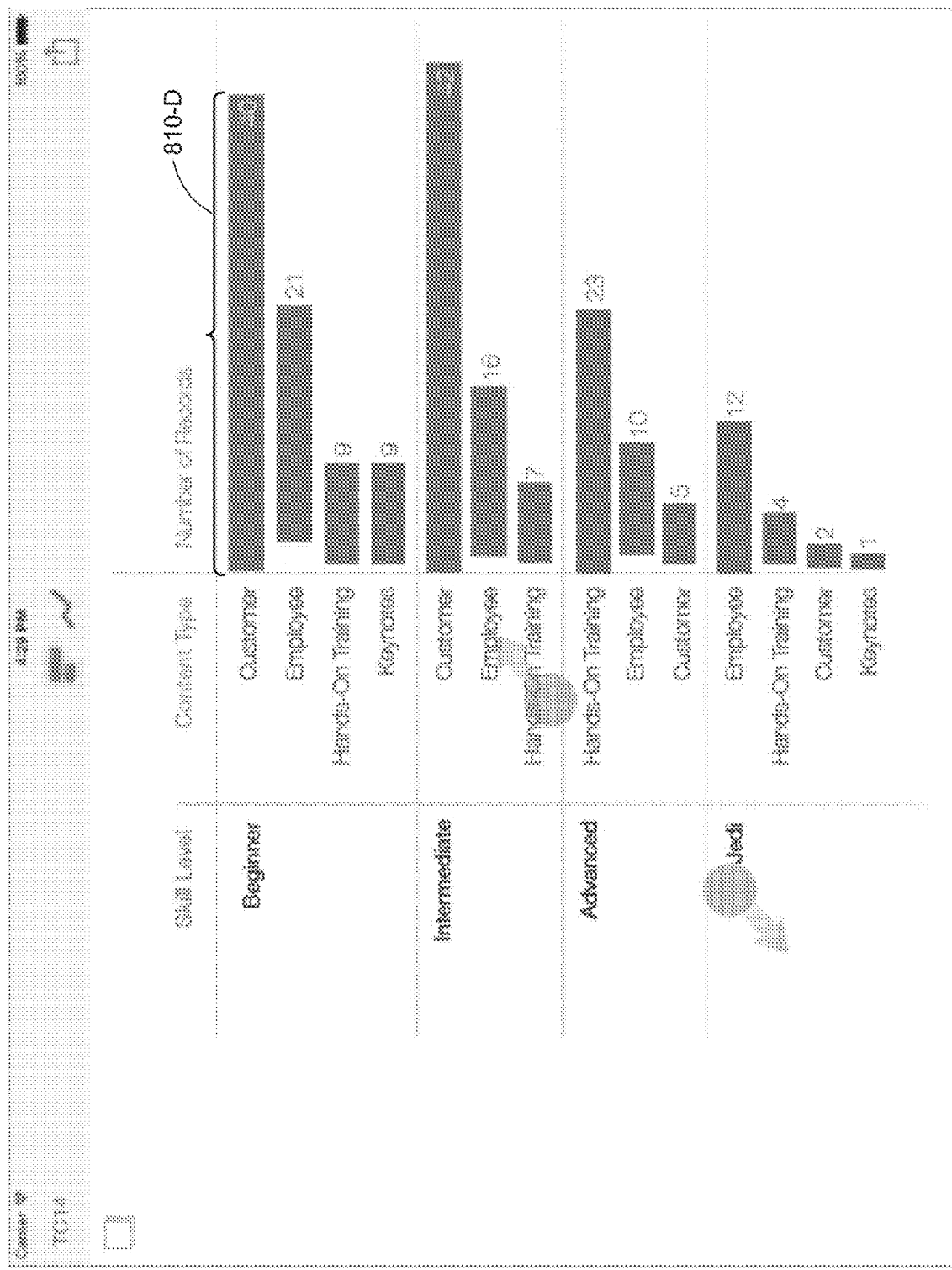
Figure 8M:
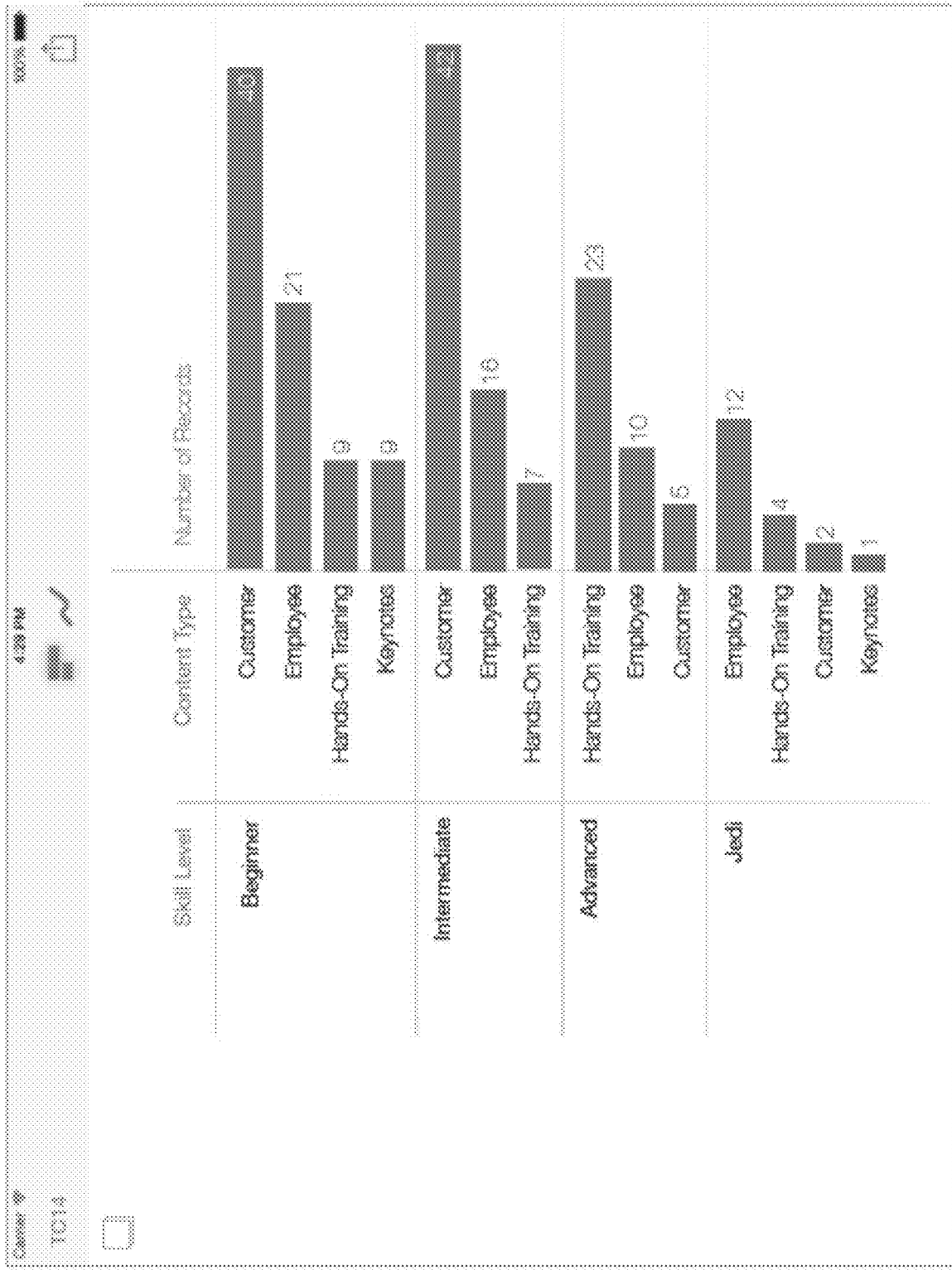

As illustrated in FIGS. 8F and 8G, in some implementations a portion of the animation includes just vertical motion 804. As illustrated in FIGS. 8H and 8I, at a certain point the motion of the bars in the animation proceed downward and to the left. In this animation, once the bars have moved sufficiently apart vertically, the bars also begin to expand. For example, the top bar expands from its original size 810-A in FIG. 8I, to a larger size 810-B in FIG. 8J, to an even larger size 810-C in FIG. 8K, to its final size 810-D in FIG. 8L. The expanded sizes utilize more of the available space on the screen. At some point in the animation, the new column header 812 appears, as illustrated in FIG. 8J. Typically, the column header 812 is initially dimmed, and shown brighter as the animation progresses.

As described above with respect to FIGS. 7A-7L, the new column header 812 may be selected in various ways, and may be swapped once it has been selected. One of skill in the art recognizes that various alternative animations similar to the ones illustrated in FIGS. 7A-7L and 8A-8M are possible based on the specific animations described here.

FIGS. 9A-9D illustrate a process of adding an additional measure to a data visualization based on an interaction gesture with an existing data visualization, in accordance with some implementations. In FIGS. 7A-7L and 8A-8M, a dimension was added to a data visualization based on a user interaction on the left side of the data visualization. The left side displayed a dimension, so opening up a new column 700 created space to insert another dimension. In FIGS. 9A-9D, in contrast, the user opens up a new column 906 on the right hand side of the data visualization, where the measures are being displayed. In this case, opening up a new column displays another measure.

Figure 9A:
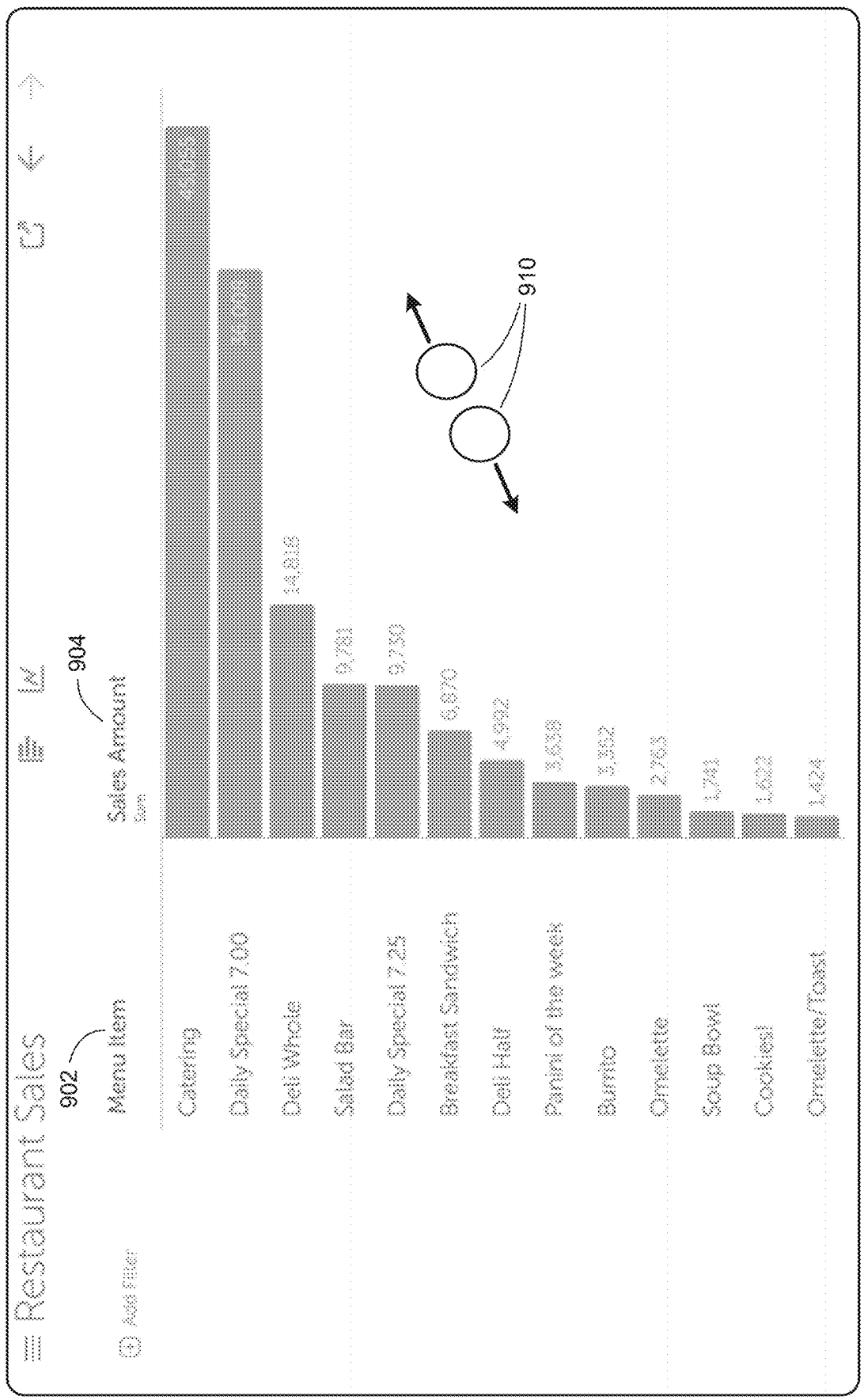
FIGS. 9A-9D illustrate a process of adding an additional measure to a data visualization based on an interaction gesture with an existing data visualization, in accordance with some implementations.
Figure 9B:
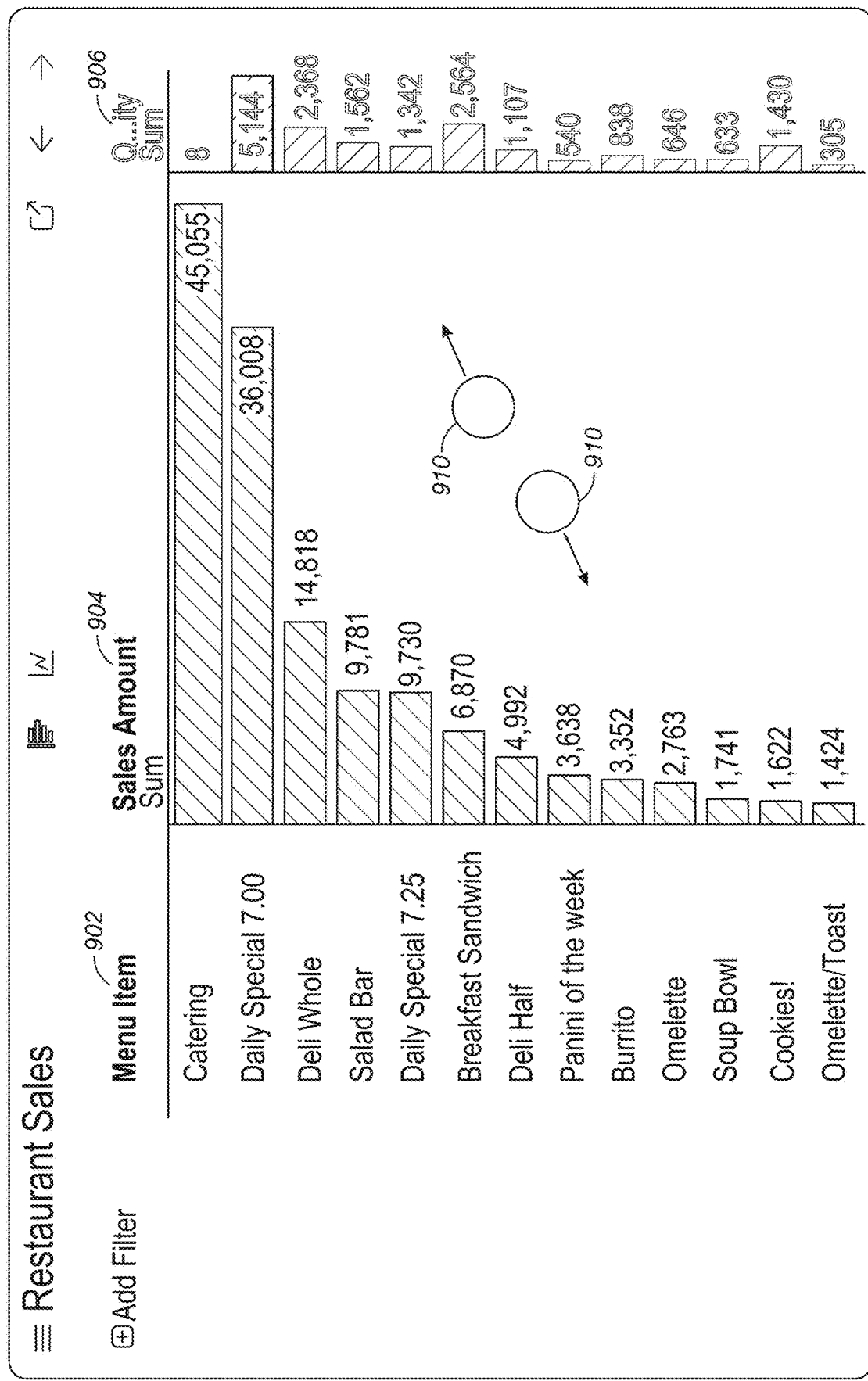
Figure 9C:
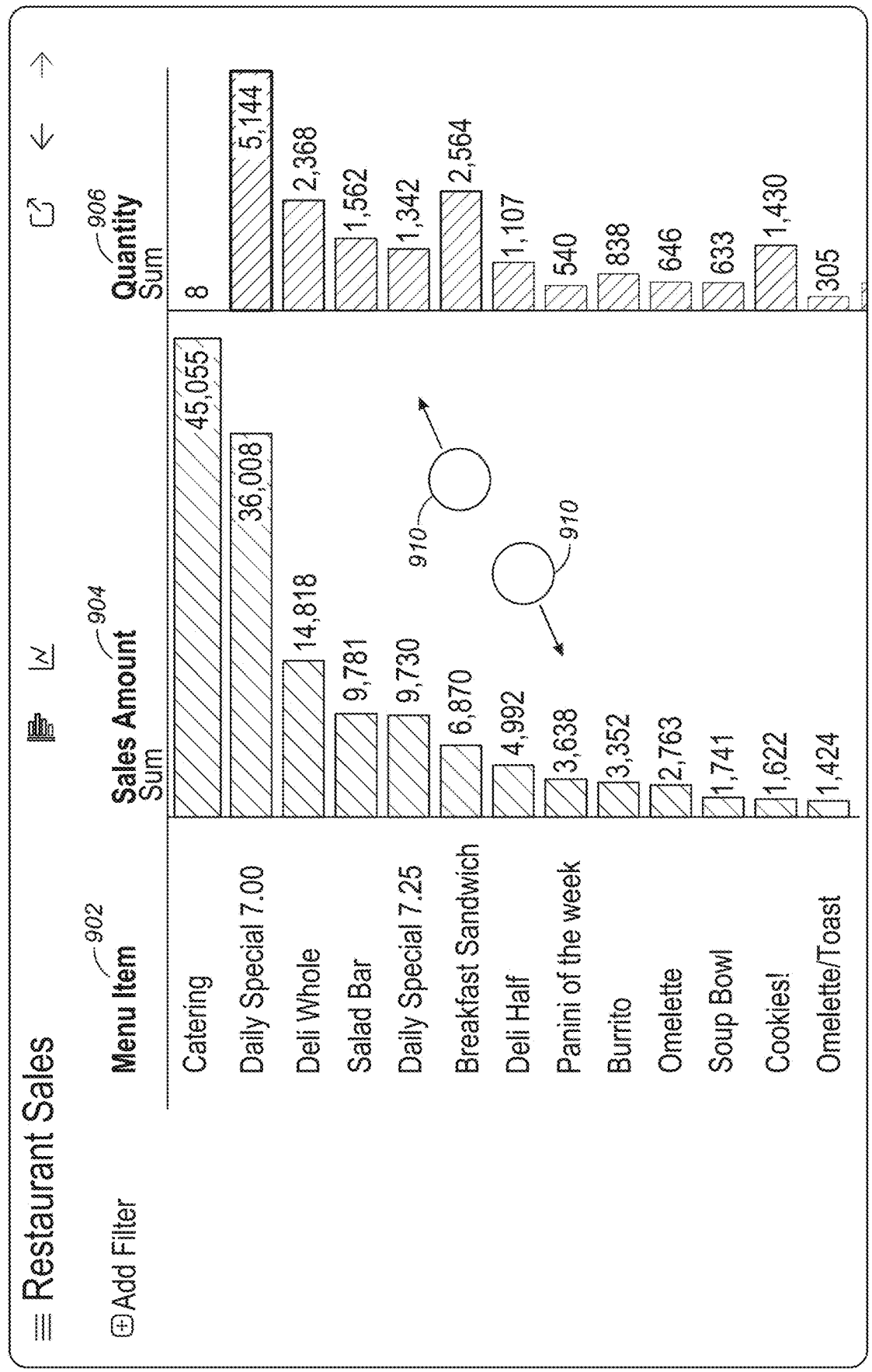
Figure 9D:
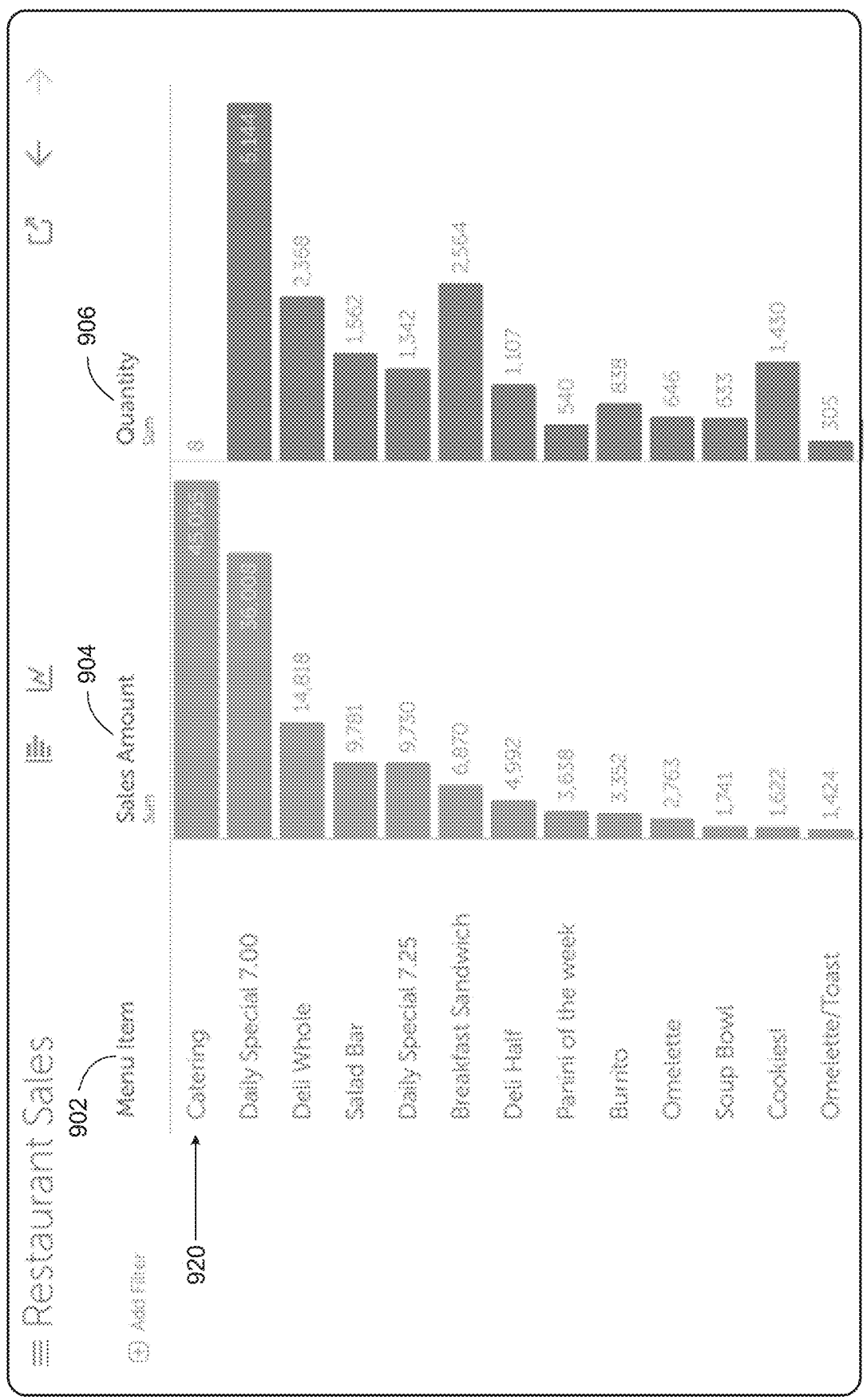

FIG. 9A displays a bar chart in which sales amount 904 is displayed for each of the menu items 902. The user establishes two contact points 910 on the right hand side of the data visualization (where the bars are currently displayed), and moves the contact points apart as illustrated by the arrows. As noted previously, this is sometimes referred to as an "unpinch" operation. As the contact points move apart, a new column 906 is displayed, which has data for another measure in the data set. The data visualization application 422 selects the measure in some way, which can include user preferences, prior selection by the user or a group of users, or other techniques. In some implementations, the new column 906 is shown initially dimmed. As the contact points move further apart, the new column becomes wider, and the visual marks (the bars here) in the new column get larger as the visual marks in the sales column 904 get smaller. When the gesture is complete, the data visualization lists the menu items 902 as before, but now shows a first column 904 for the Sales Amount and a second column 906 for the Quantity of sales. Having the two pieces of data can be very useful to compare the number of sales in each category (the quantity) versus the dollar value of those sales. For example, the first row 920 shows that the total sales dollars for catering exceed all of the other menu items, but there were only 8 catering events (which was too small to even show a bar).

Figure 10A:
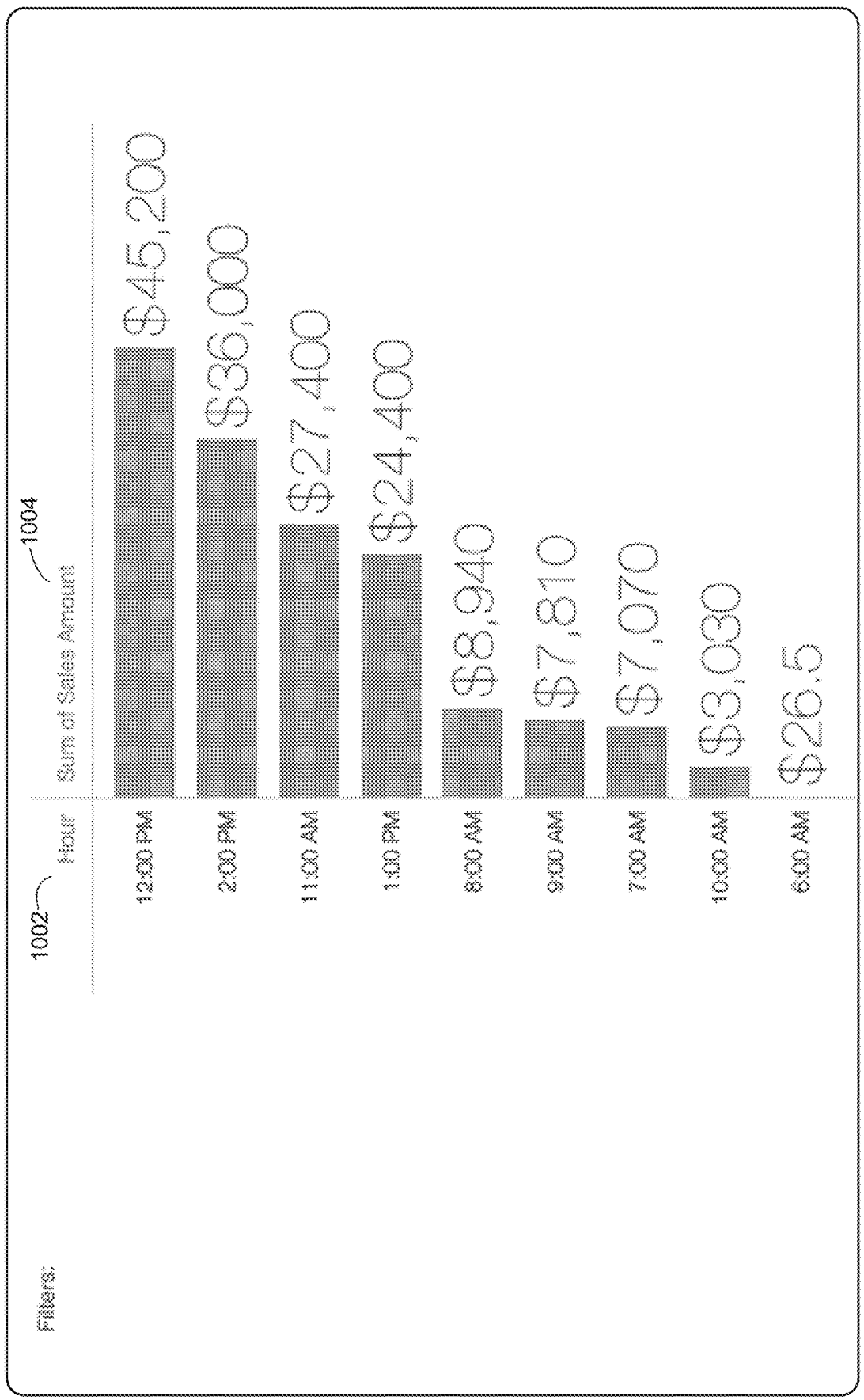
Figure 10B:
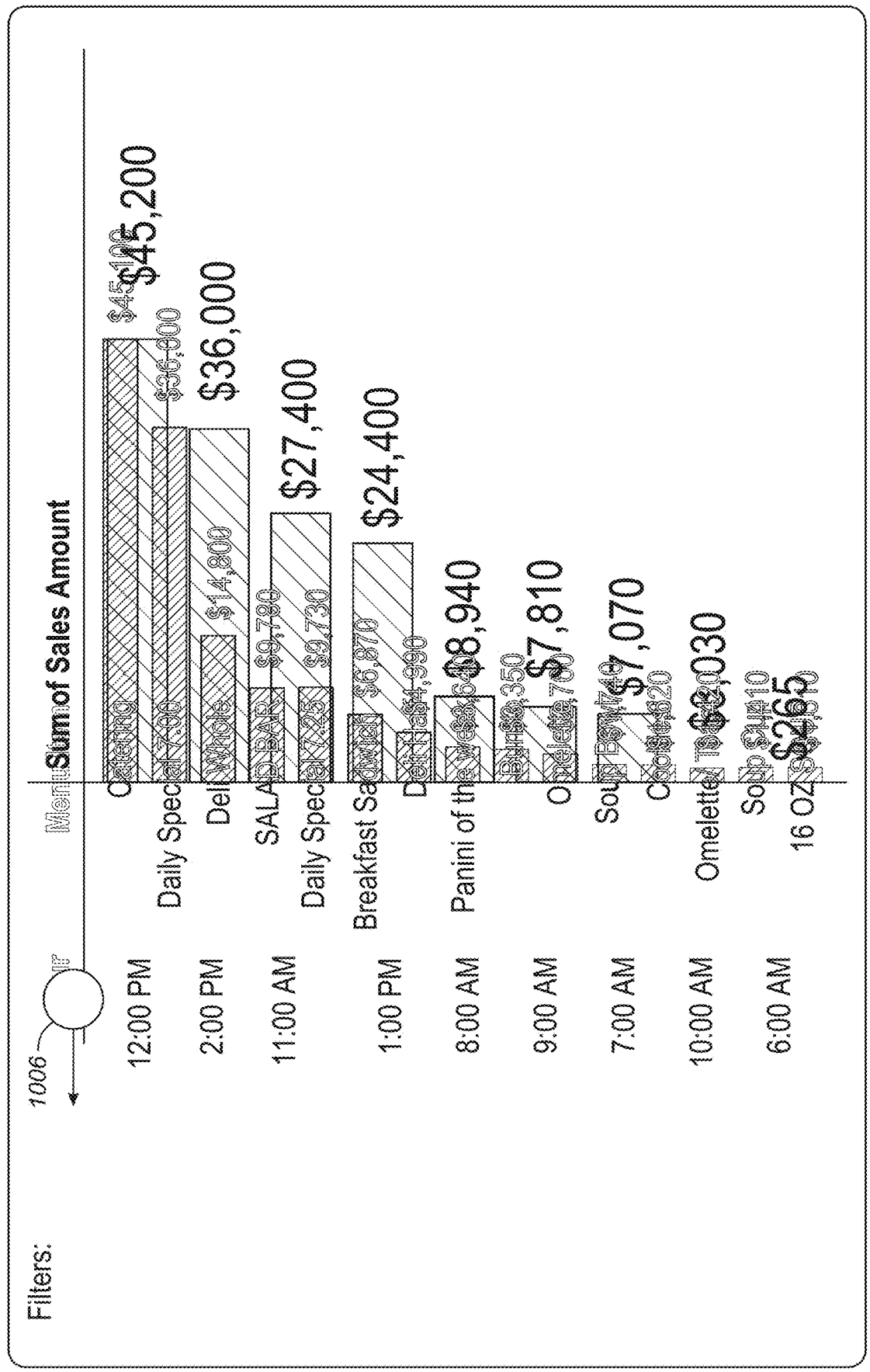

FIGS. 10A-10C illustrate an animated transition when selecting a different dimension for an existing data visualization, in accordance with some implementations. FIG. 10A shows a user interface including a chart with chart dimension 1002 (Hour) and measure 1004 (Sum of Sales Amount). FIG. 10B shows contact 1006 at a position corresponding to chart dimension 1002 and moving to the left. FIG. 10B further shows chart dimension 1002 (Hour) being replaced by chart dimension 1008 (Menu Item) via an animated transition. FIG. 10C shows a resulting chart with chart dimension 1008 (Menu Item) and measure 1004 (Sum of Sales Amount). FIGS. 10B and 10C also show measure 1004 (Sum of Sales Amount) updating via an animated transition to correspond to chart dimension 1008 (Menu Item).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at an electronic device with a display, one or more processors, and memory:
   displaying a first chart representing data from a data set, the chart comprising (i) a first region displaying labels corresponding to data values of a first data field in the data set, (ii) a second region displaying labels corresponding to data values of a second data field in the data set, and (iii) a third region displaying a plurality of visual marks, each visual mark representing aggregated data corresponding to a respective pair of data values for the first data field and the second data field;
   detecting a first user input at a first location;
   determining whether the first location is in the first region, the second region, or the third region;
   in response to the first user input, removing one or more of the visual marks from the first chart via an animated transition, wherein the one or more visual marks move in concert with movement of the first user input during at least a portion of the animated transition, including:
   in accordance with a determination that the first location is in the first region and a determination that the first location corresponds to a label for a first data value for the first data field, removing all of the visual marks in the first chart that correspond to the first data value;

in accordance with a determination that the first location is in the second region and a determination that the first location corresponds to a label for a second data value for the second data field, removing all of the visual marks in the first chart that correspond to the second data value; and in accordance with a determination that the location is in the third region and a determination that the location corresponds to a first visual mark, removing only the first visual mark from the first chart; and updating display of the first chart in accordance with removing the one or more visual marks.

2. The method of claim 1, wherein the first user input is a drag gesture or a swipe gesture that moves in a first predefined direction.

3. The method of claim 1, wherein updating display of the first chart includes displaying an indicium that the one or more visual marks have been removed.

4. The method of claim 1, wherein displaying the first chart includes displaying an indicium of a number of data rows represented in the first chart, and updating display of the first chart includes updating the indicium of the number of data rows represented.

5. The method of claim 1, further comprising:
after removing the one or more visual marks from the first chart, detecting a second user input at a second location; and
in response to detecting the second user input, returning the one or more visual marks to the first chart.

6. The method of claim 5, wherein the second location corresponds to display of an indicium that the one or more visual marks have been removed.

7. The method of claim 1, further comprising:
detecting a second user input at a second location;
determining that the second user input corresponds to a subset of the visual marks; and
removing from the first chart, via a second animated transition, all of the visual marks in the first chart except the subset of visual marks, in accordance with at least one characteristic of the second user input.

8. An electronic device, comprising:
a display;
one or more processors; and
memory storing one or more programs configured for execution by the one or more processors, the one or more programs including instructions for:
displaying a first chart representing data from a data set, the chart comprising (i) a first region displaying labels corresponding to data values of a first data field in the data set, (ii) a second region displaying labels corresponding to data values of a second data field in the data set, and (iii) a third region displaying a plurality of visual marks, each visual mark representing aggregated data corresponding to a respective pair of data values for the first data field and the second data field;
detecting a first user input at a first location;
determining whether the first location is in the first region, the second region, or the third region;
in response to the first user input, removing one or more of the visual marks from the first chart via an animated transition, wherein the one or more visual marks move in concert with movement of the first user input during at least a portion of the animated transition, including:
in accordance with a determination that the first location is in the first region and a determination that the first location corresponds to a label for a first data value for the first data field, removing all of the visual marks in the first chart that correspond to the first data value;
in accordance with a determination that the first location is in the second region and a determination that the first location corresponds to a label for a second data value for the second data field, removing all of the visual marks in the first chart that correspond to the second data value; and
in accordance with a determination that the location is in the third region and a determination that the location corresponds to a first visual mark, removing only the first visual mark from the first chart; and
updating display of the first chart in accordance with removing the one or more visual marks.

9. The electronic device of claim 8, wherein the first user input is a drag gesture or a swipe gesture that moves in a first predefined direction.

10. The electronic device of claim 8, wherein updating display of the first chart includes displaying an indicium that the one or more visual marks have been removed.

11. The electronic device of claim 8, wherein displaying the first chart includes displaying an indicium of a number of data rows represented in the first chart, and updating display of the first chart includes updating the indicium of the number of data rows represented.

12. The electronic device of claim 8, wherein the one or more programs further comprise instructions for:
after removing the one or more visual marks from the first chart, detecting a second user input at a second location; and
in response to detecting the second user input, returning the one or more visual marks to the first chart.

13. The electronic device of claim 12, wherein the second location corresponds to display of an indicium that the one or more visual marks have been removed.

14. The electronic device of claim 8, wherein the one or more programs further comprise instructions for:
detecting a second user input at a second location;
determining that the second user input corresponds to a subset of the visual marks; and
removing from the first chart, via a second animated transition, all of the visual marks in the first chart except the subset of visual marks, in accordance with at least one characteristic of the second user input.

15. A non-transitory computer-readable storage medium storing one or more programs configured for execution by an electronic device having a display, one or more processors, and memory, the one or more programs comprising instructions for:
displaying a first chart representing data from a data set, the chart comprising (i) a first region displaying labels corresponding to data values of a first data field in the data set, (ii) a second region displaying labels corresponding to data values of a second data field in the data set, and (iii) a third region displaying a plurality of visual marks, each visual mark representing aggregated data corresponding to a respective pair of data values for the first data field and the second data field;
detecting a first user input at a first location;

determining whether the first location is in the first region, the second region, or the third region;

in response to the first user input, removing one or more of the visual marks from the first chart via an animated transition, wherein the one or more visual marks move in concert with movement of the first user input during at least a portion of the animated transition, including:

in accordance with a determination that the first location is in the first region and a determination that the first location corresponds to a label for a first data value for the first data field, removing all of the visual marks in the first chart that correspond to the first data value;

in accordance with a determination that the first location is in the second region and a determination that the first location corresponds to a label for a second data value for the second data field, removing all of the visual marks in the first chart that correspond to the second data value; and in accordance with a determination that the location is in the third region and a determination that the location corresponds to a first visual mark, removing only the first visual mark from the first chart; and updating display of the first chart in accordance with removing the one or more visual marks.

16. The computer-readable storage medium of claim 15, wherein the first user input is a drag gesture or a swipe gesture that moves in a first predefined direction.

17. The computer-readable storage medium of claim 15, wherein updating display of the first chart includes displaying an indicium that the one or more visual marks have been removed.

18. The computer-readable storage medium of claim 15, wherein displaying the first chart includes displaying an indicium of a number of data rows represented in the first chart, and updating display of the first chart includes updating the indicium of the number of data rows represented.

19. The computer-readable storage medium of claim 15, wherein the one or more programs further comprise instructions for:

after removing the one or more visual marks from the first chart, detecting a second user input at a second location; and in response to detecting the second user input, returning the one or more visual marks to the first chart.

20. The computer-readable storage medium of claim 19, wherein the second location corresponds to display of an indicium that the one or more visual marks have been removed.

* * * * *